(12) United States Patent
Huart et al.

(10) Patent No.: US 6,561,336 B1
(45) Date of Patent: May 13, 2003

(54) FRICTION CLUTCH BEARING AN ELECTRIC MACHINE ROTOR, IN PARTICULAR FOR A MOTOR VEHICLE

(75) Inventors: David Huart, Paris (FR); Michel Graton, Paris (FR); Cédric Plasse, Garches (FR); Roger Abadia, Neuilly-Plaisance (FR); Fabrice Tauvron, Athis-Mons (FR); Pierre Faverolle, Paris (FR); Dokou Antoine Akemakou, Vitry sur Seine (FR); Gilles Lebas, Asnières (FR)

(73) Assignee: Valeo Equipements Electriques Moteur, Creteil (FR)

( * ) Notice: Subject to any disclaimer, the term of this patent is extended or adjusted under 35 U.S.C. 154(b) by 0 days.

(21) Appl. No.: 09/744,670

(22) PCT Filed: Jul. 28, 1999

(86) PCT No.: PCT/FR99/01864

§ 371 (c)(1),
(2), (4) Date: Jan. 29, 2001

(87) PCT Pub. No.: WO00/06897

PCT Pub. Date: Feb. 10, 2000

(30) Foreign Application Priority Data

Jul. 28, 1998 (FR) .............................. 98 09639
Sep. 3, 1998 (FR) .............................. 98 11174
Apr. 16, 1999 (FR) .............................. 99 05287

(51) Int. Cl.⁷ .......................... F02N 11/04; F02N 11/08

(52) U.S. Cl. .............................. 192/70.25; 123/179.28; 290/47; 192/91 A; 192/99 S

(58) Field of Search .............................. 290/22, 32, 47; 180/165; 192/70.25, 91 A, 99 S; 123/179.28

(56) References Cited

U.S. PATENT DOCUMENTS

| 4,346,773 A | * | 8/1982 | Hofbauer et al. ............ 180/165 |
| 4,626,696 A | * | 12/1986 | Maucher et al. ......... 123/179.22 |
| 4,699,097 A | * | 10/1987 | Tanaka et al. .......... 123/179.28 |
| 4,894,570 A | * | 1/1990 | Kaneyuki .............. 123/179.25 |
| 4,898,038 A | * | 2/1990 | Kitamura ............... 123/179.28 |
| 4,958,095 A | * | 9/1990 | Uchida et al. ........... 123/41.31 |
| 4,959,595 A | * | 9/1990 | Nishimura .................... 290/46 |
| 5,788,039 A | * | 8/1998 | Carpi et al. .................. 192/112 |
| 5,934,430 A | * | 8/1999 | Kolomeitsev et al. ...... 192/84.6 |

FOREIGN PATENT DOCUMENTS

| DE | 3320950 A1 | * | 12/1984 |
| DE | 4323601 | | 1/1995 |
| EP | 0311688 | | 4/1989 |
| EP | 0544092 | | 6/1993 |
| FR | 2 604 229 A1 | * | 3/1988 |

OTHER PUBLICATIONS

Patent Abstract of Japan, Pub. No. 63309768, Pub. Date Dec. 16, 1988.

* cited by examiner

Primary Examiner—Rodney H. Bonck
(74) Attorney, Agent, or Firm—Liniak, Berenato and White

(57) ABSTRACT

The invention concerns a friction clutch comprising a flywheel (3) with a front end designed to be fixed to a motor vehicle crankshaft (11) and a rear end in the form of a reaction plate (4) with a central recess (39) externally defined by a friction surface and a friction disc coupled with a central hub designed to be interlocked in rotation with the input shaft of a movement gear box comprising a clutch housing, the flywheel (13) bearing between its front and rear ends the rotor (6) of a rotating electric machine (2) comprising a fixed stator borne internally by a strut designed to be interlocked with at least one of the vehicle engine-clutch housing (14) block (62). The invention is applicable to a motor vehicle.

46 Claims, 33 Drawing Sheets

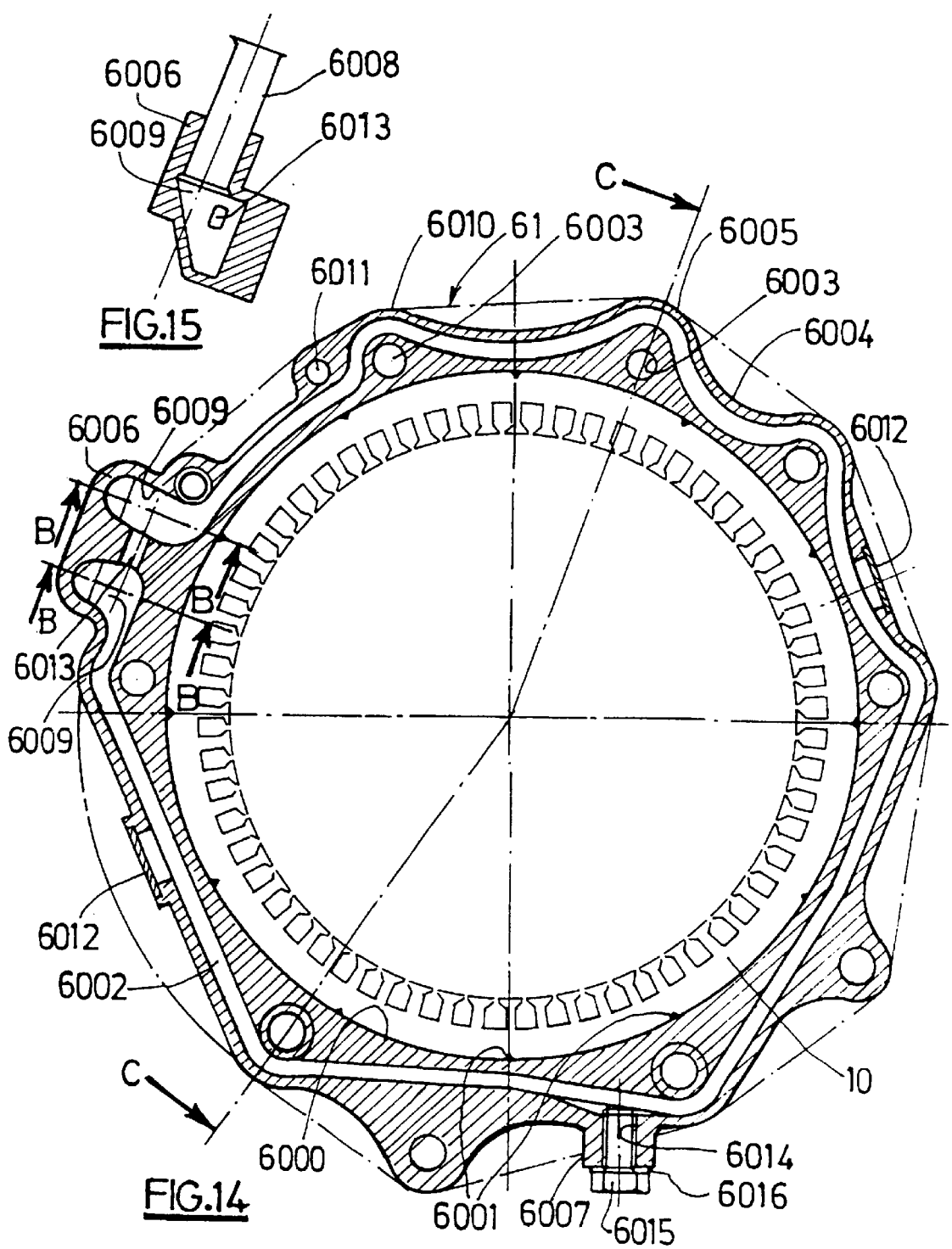

FRICTION CLUTCH BEARING AN ELECTRIC MACHINE ROTOR, IN PARTICULAR FOR A MOTOR VEHICLE

The invention relates to a friction-clutch device equipped with a rotational-drive flywheel.

The object of the invention is, more particularly, in a motor vehicle, to allow automatic stopping and restarting of the internal-combustion engine when the vehicle is at rest for a short period—vehicle waiting at red lights, for example—so as to save fuel. Such a clutch device is known because of the document FR-A-2 604 229.

In this document, the clutch device is made up essentially of a conventional friction clutch and of an auxiliary clutch with electromagnetic coupling, arranged between an element integral in rotation with the reaction plate of the friction clutch and an inertial flywheel mounted rotating coaxially with the drive shaft, by means of a ball bearing mounted on an axial spacer interposed between the crankshaft of the engine of the vehicle and the reaction plate.

Referring to FIG. 1 of this document, it is seen that the electric motor driving the inertial flywheel is spaced away radially from the friction clutch, which increases the radial bulk. Moreover, the electromagnetic clutch relies on a plate integral in rotation with the reaction plate while being movable axially with respect to it.

Hence the object of the present invention is to reduce the radial bulk of the clutch device while dispensing with the presence of a plate-type electromagnetic clutch.

According to the invention, a clutch device as indicated above including, on the one hand, a drive flywheel featuring a front extremity for fixing it to a drive shaft, consisting of the output shaft of an internal-combustion engine of a motor vehicle including an engine block, and a rear extremity in the form of a hollow-shaped reaction plate with a central recess delimited externally by a friction face, and, on the other hand, a friction disc comprising at least one friction lining for contact with the friction face of the reaction plate, the said lining being integral with a support coupled to a central hub intended to be integrated in rotation with a driven shaft consisting of the input shaft of a motion gearbox comprising a clutch bell housing at least partly surrounding the reaction plate and [sic] characterised in that the drive flywheel, between its front and rear extremities, carries the rotor of a rotating electric machine comprising a fixed stator coaxial with the rotor, and in that the stator is carried internally by a spacer intended to be integrated with at least one of the engine-block/clutch bell-housing elements.

By virtue of the invention, the radial bulk of the electric-machine/friction-clutch assembly is reduced, since the electric machine is adjacent to the reaction plate and is partly carried by the drive flywheel.

By virtue of the invention, the electric machine is adjacent to the engine block while the reaction plate and the rest of the clutch are accommodated in the usual way within the clutch bell housing. This arrangement makes it possible to modify the engine block and the clutch bell housing of a conventional motor vehicle as little as possible while having a reduced radial bulk due to the fact that the electric machine is offset axially with respect to the friction disc. The rest of the clutch, especially the clutch mechanism, remains unchanged.

The input shaft of the gearbox may be unchanged with respect to that of a conventional vehicle.

In a variant, this shaft may be elongated so as to be centred by means of the crankshaft.

By virtue of the invention, the drive flywheel carries the rotor of an electric machine which makes it possible to dispense with the presence of a plate-type electromagnetic clutch, and the axial bulk is reduced especially because of the absence of a transmission belt.

The electric machine is configured to form a starter for the internal-combustion engine as well as an alternator.

The drive flywheel, called motor flywheel, features very high inertia. The internal-combustion engine, or heat engine, of the vehicle can be cut off at red lights, for example. The flywheel, and thus the heat engine, can easily and rapidly be restarted by the electric machine then playing the role of a starter. It is thus possible to save fuel. Thus the electric machine forms an alternator/starter. It also makes it possible to filter the vibration and to avoid stalling of the heat engine by operating as an electric motor.

For further details on such a machine, refer to the document WO 98/05882.

In one embodiment, the support of the friction lining is coupled elastically to the hub by means of a torsion damper which includes a first guide washer integral with the support and of a second guide washer.

A web linked in rotation, after taking up any play, is interposed between the two guide washers. The second guide washer is installed in the central recess of the reaction plate.

The support may be separate from the first guide washer, being secured to it, for example, by distance rods linking the two guide washers together in such a way that the support is placed next to the first guide washer.

In a variant, the support is in a single piece with the first guide washer.

In one embodiment, the torsion damper penetrates into the central recess of the reaction plate for a reduction in the axial bulk.

In one embodiment, the declutching device of the clutch is of the concentric type in order to reduce the axial bulk between the clutch and the bottom of a bell housing surrounding the friction clutch.

Advantageously, additional bearing means are interposed between the engine flywheel and a carrier piece integral with the spacer fixedly carrying the stator. This results in the possibility of guaranteeing a precise and small gap between the stator and the rotor.

These bearing means may consist of a smooth bearing or of a ball bearing with at least one row of balls. This ball bearing may be instrumented especially in order to measure the speed of rotation of the drive flywheel and thus of the crankshaft.

This carrier piece partly envelops the stator and the rotor and thus advantageously forms a shield avoiding any contamination in the electric machine. This piece is integral, or is affixed integrally onto the spacer.

The drive flywheel may be a single piece with the reaction plate, for reasons of cost.

In a variant, the drive flywheel is in several pieces or parts and, in addition to the reaction plate, includes a tube or a pedestal or a shaft for fixing it onto the drive shaft.

Thus the two pieces of the flywheel may be of two different materials in order to adjust the inertia of the flywheel.

Moreover, it is easily possible to balance the flywheel dynamically, for example by removing material from the outer periphery of the reaction plate.

Furthermore, the dust given off by the friction of at least one of the friction linings which the friction-clutch device includes does not risk contaminating the electric machine since the machine is situated to the front of the reaction plate.

The reaction plate preferably features a skirt at its outer periphery on which is fixed the cover of a friction clutch.

By virtue of this arrangement, no dust coming from the friction linings can soil the electric machine.

This result can also be achieved with the carrier piece when it is adjacent to the reaction plate and partly envelops the rotor and the stator.

This piece constitutes a thermal screen thus sheltering the electric machine.

It will be appreciated that the placing of the second guide washer, in a general way of the friction damper, in the recess of the reaction plate displaces the centre of gravity of the assembly consisting of the electric machine and the friction clutch towards the drive shaft and thus towards the electric machine. By virtue of this arrangement, bearing means can be mounted on the drive flywheel and carry the stator of the machine by way of a carrier piece. Thus, these bearing means will be close to the centre of gravity of the assembly, and thus sheltered. The balancing of the assembly can be carried out easily by adding or removing material to the reaction plate very close to the centre of gravity.

It will be appreciated that the torsion damper may have the configuration desired for damping vibration. It may be thicker and, in addition to the web and the two guide washers, include auxiliary webs in order to increase the angular range of movement between the hub and the friction lining or linings.

The friction clutch may reach high temperatures in service, such that it is appropriate to provide cooling means in order to protect the friction-clutch device as a whole and thus to increase its lifetime.

Advantageously, therefore, the engine flywheel carries means for cooling the electric machine such as fins carried by the reaction plate.

In another embodiment, cooling means are provided in order to cool the stator of the electric machine in order to enhance the lifetime and the performance thereof. It is thus possible to cool the stator directly using piercings formed in it.

Advantageously, the piercings are formed in a single-piece spacer/stator assembly which makes it possible to preserve the mechanical strength of the stator.

Thus, in a variant, the spacer is in a single piece with the stator and the assembly [lacuna] composed of two series of packs of metal plates, one of which forms a spacer.

In a variant, the stator can be cooled by means of external spacer [sic].

Needless to say, these various cooling means can be combined together, for example, a cooling fluid in one embodiment passes through piercings formed in the metal plates of the stator in order to penetrate into a cooling chamber formed in the thickness of the spacer in combination with fins carried by the engine flywheel.

Means for emptying the cooling chamber of the spacer are installed at its low point.

The said emptying means are preferably installed at the lowest point of the said chamber, thus making it possible to empty the complete cooling circuit of the internal-combustion engine of the vehicle.

In one embodiment, the carrier piece of the stator features recesses into which penetrate projections of the engine block in order to reduce the bulk.

The spacer, especially when it consists of two series of packs of metal plates, makes it possible to cool the electric machine by carrying an inlet and outlet duct allowing a flow of air within the electric machine, between the inlet and outlet duct.

One of the ducts may be equipped with an electric-motor/turbine-disc assembly allowing forced air circulation.

The spacer does not need to be centred with respect to the engine block when this spacer is integral with a carrier piece serving to support the abovementioned bearing means. In this case, the clutch bell housing is centred by the spacer, for example, by means of a centring ring passing through the spacer and carried by the engine block.

It will be seen that it is possible to cool the electric machine without impinging on the clutch bell housing or the engine block, especially when the spacer carries an inlet and outlet duct.

The drive flywheel also makes it possible to add material easily and thus to balance the out-of-balance masses of the crankshaft, especially when the heat engine is of three-cylinder type.

The spacer thus makes it possible to perform a large number of supplementary functions. It is also possible to reduce the axial bulk by equipping the friction clutch with a wear-take-up mechanism.

The description which will follow illustrates the invention with regard to the attached drawings, in which:

FIG. 14 is a sectional view along the line A—A of FIG. 13.

FIG. 15 is a sectional view along the line B—B of FIG. 14.

FIGS. 29, 30, 31, 32 and 33 are views in perspective of the air inlet and outlet ducts.

In the figures, the common elements will be allocated the same reference numbers.

Figure 1:
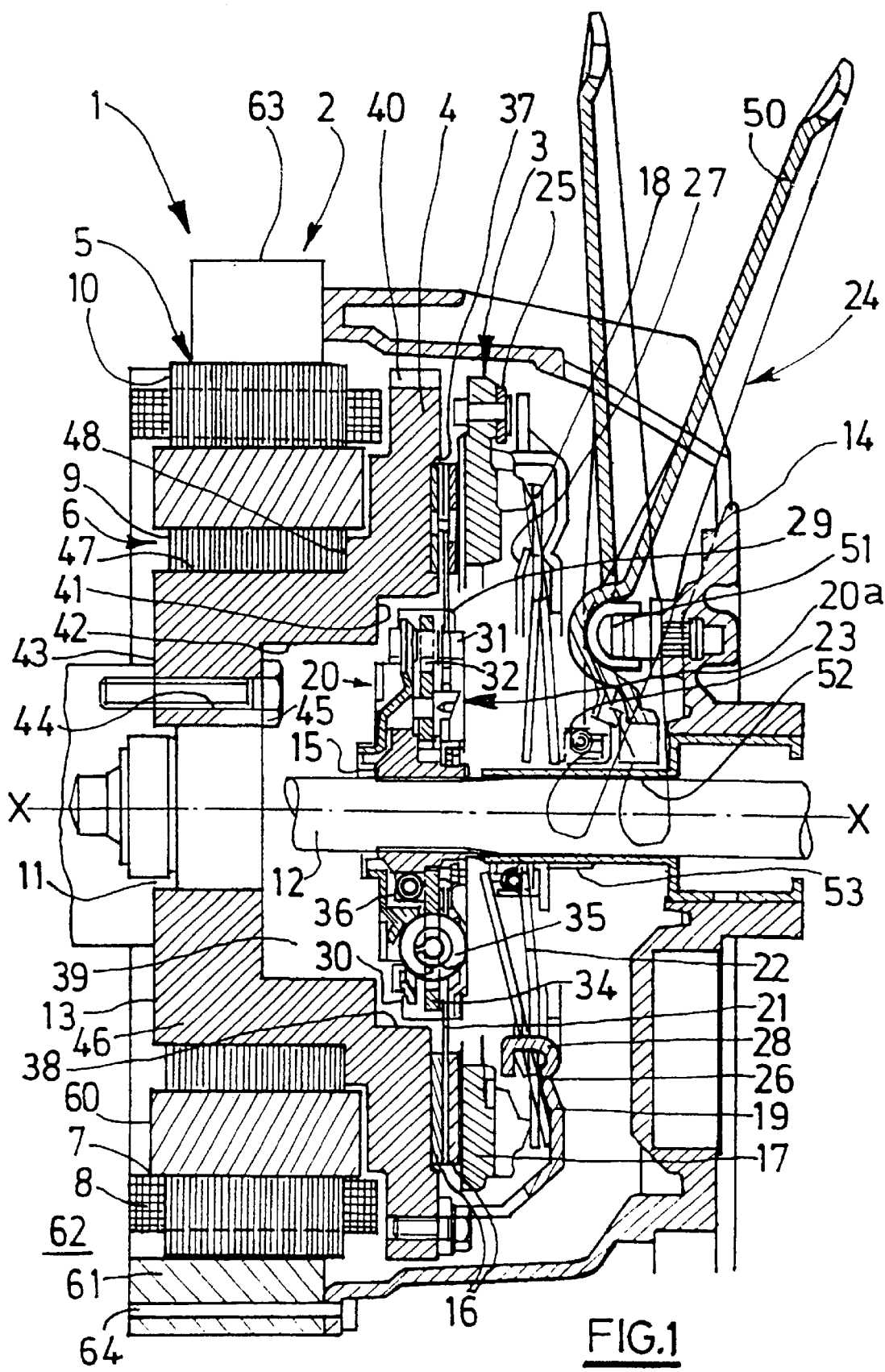
FIG. 1 is a view in axial section of an electric-machine/friction-clutch assembly according to the invention.

In these figures is represented an assembly 1 for cutting off and starting an internal-combustion engine.

This assembly 1 includes a rotating electric machine 2 and a friction clutch 3 including a reaction plate 4 made of mouldable material, here cast iron.

In a variant, the reaction plate is of aluminium-based mouldable material and features a coating for co-operating with a friction lining 16 described below.

The electric machine 2 includes a stator 5 and a rotor 6 mounted coaxially, and radially one on top of the other with a gap 7 formed between the stator 5 and the rotor 6.

In the figures, the stator 5 surrounds the rotor 6, but, needless to say, in a variant, the rotor 6 may surround the stator 5 equipped with windings of electrical wires the ends of which, called chignons, can be seen at 8.

The rotor 6 and the stator 5 each feature a pack of metal plates, 9 and 10 respectively, here made of soft iron.

Furthermore, the rotor 6 is equipped with a squirrel cage 60 made of copper or of aluminium, such that the electric machine is of the asynchronous type.

The metal plates are of annular shape and are insulated, for example, by oxidation in contact with one another. In a variant, insulants separate the metal plates from one another.

The packs of metal plates 9 and 10 form a crown of axial orientation.

In a known way, the metal plates of the stator 5 feature notches for the abovementioned windings or coils to pass through.

These windings are linked via a connector 63 to a control and power electronics box or unit driven by a computer receiving information originating from sensors, measuring the rotational speeds of a drive shaft 11 especially, consisting of the output shaft, called crankshaft, of an internal-combustion engine and of a driven shaft 12 forming the input shaft of a motion gearbox, as well as of a displacement sensor, measuring the displacement of the clutch release bearing described below, for example.

The assembly 1 is interposed between the shafts 11 and 12.

The clutch 3 constitutes a cut-off and starting element. When the clutch is engaged (let in), the engine torque is transmitted from the drive shaft 11 to the driven shaft 12.

When the clutch is disengaged (declutched), cut off occurs such that the driven shaft 12 is no longer driven by the drive shaft 11. The reaction plate 4 constitutes the rear extremity of a drive flywheel 13 of annular shape, featuring, at the front, a front face fixed onto the end of the drive shaft 11.

According to one characteristic, the flywheel 13, usually called engine flywheel, carries the rotor 6 of the electric machine 2 between its front and rear extremities.

The flywheel 13/rotor 6/clutch 3 assembly constitutes a friction-clutch device; the flywheel 13 constituting the input element of the clutch 3 and the support of the rotor 6 of the electric machine 2.

The electric machine 2 here makes it possible to start the internal-combustion engine. To do that, it is necessary to pass through the coil of the stator a slaved electric current with frequency and current strength determined by electronic control by the computer receiving information on the starting condition of the vehicle. In this case, the electric machine 2 turns faster than a conventional starter.

The electric machine 2 also constitutes an alternator when the internal-combustion engine is turning. This machine, here of asynchronous type forming [sic] an electric motor. It may be of any type, namely, for example, of radial- or axial-flux type, asynchronous, synchronous with magnets in the gap or buried magnets, with flux commutation with magnets alone or hybrid magnets—de-excitation by a coil at the stator—with terminals and without brushes, variable reluctance, single and double excitation, transverse flux with Vernier effect. The machine makes it possible to filter the vibration generated by the said internal-combustion engine. In makes it possible to accelerate the heat engine and to prevent it stalling. It makes it possible to brake the engine and to deliver greater power than the conventional alternators.

The electric machine 2 also makes it possible to facilitate gear-changing by synchronising the shafts 11 and 12, the machine braking or accelerating the shaft 11.

According to another characteristic, the machine 2 makes it possible to stop the internal-combustion engine at red lights and then to start it again, saving fuel, due to the high inertia of the flywheel 13 equipped with the rotor 6. For example, with neutral engaged and ignition key in vehicle running position, the engine is cut off after two seconds and started up again as soon as the gear ratio is changed.

For further details on such a machine, refer to the document WO 98/05882.

Hence, on FIG. 1, a toothed crown ring can be seen at 40, formed on the outer periphery of the reaction plate 4 and associated with a radial sensor, not visible on all the figures, in order especially to pick up the rotational speed of the electric machine 2. Here, as regards an application for a motor vehicle, the drive shaft 11 is the crankshaft of the internal-combustion engine of the vehicle, while the driven shaft 12 is the input shaft of the gearbox integral with a clutch bell housing 14, also called clutch casing, forming a fixed casing. The input shaft 12 passes through the back of the bell housing 14 surrounding, in large measure, the clutch 3 mounted so as to rotate about an axis X—X aligned with that of the shafts 11 and 12. The rotor 6 is thicker than the reaction plate 4 forming, with the flywheel 13, the input element of the friction clutch, and thus of the friction-clutch device. The output element of this clutch consists of at least one central hub 15 splined internally in order to be linked in rotation with the driven shaft 12 splined externally to do so at its extremity. The hub 15 is coupled rigidly or elastically with at least one friction lining 16 intended to be clamped between the reaction plate 4 and a pressure plate 17 under the action of clutching means 18 with an axial action acting on the pressure plate 17 and bearing on a cover 19 integral with the reaction plate 4, here by being screwed on.

The friction lining 16 and the hub 15 belong respectively to the outer periphery and to the inner periphery of a friction disc 20 including at least one support 21 carrying the friction lining 16 and coupled to the hub 15. The support 21 can be embedded in the lining 16.

Two friction linings 16 are preferably provided, being fixed on either side of the support 21, and axially elastic in the region of the linings 16 for progressive clamping of the linings 16 between the plates 4, 17, and in order to give assistance during disengaging of the clutch.

Such a support is described, for example, in the document FR-A-2 693 778. The fixing of the linings 16 can therefore be achieved by riveting; in a variant, the linings are fixed by bonding onto the central bearing region of a tripod blade which makes it possible to reduce the thickness of the friction linings and thus the axial bulk.

This also makes it possible to reduce the inertia of the disc 20 and to wear out the linings 16 further.

The friction faces of the lining or linings 16 are therefore normally clamped between the plates 4, 17 in such a way that the clutch is normally engaged. To disengage the clutch, it is therefore necessary to provide declutching means 22 in order deliberately to counteract the action of the clutching means 18 so as to release the friction lining or linings 16 and disengage the clutch. These declutching means 22 are controlled by a declutching release bearing 23 acting in a thrust mode or by traction on the inner extremity of the declutching means 22. The release bearing belongs to a declutching device 24.

Figure 4:
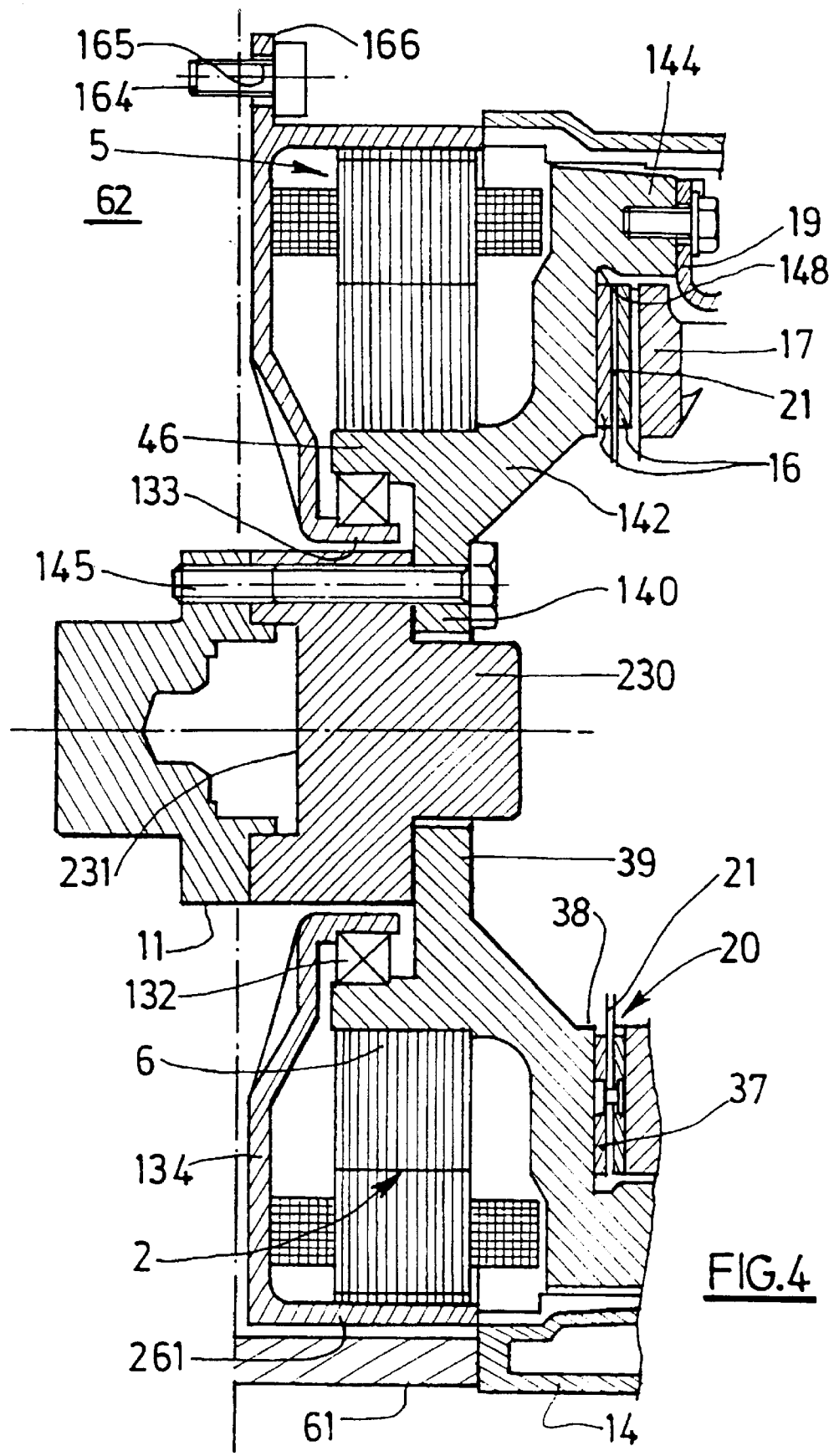
FIGS. 4 to 6 are views similar to FIG. 1 without the central part of the friction disc for respectively a fourth, a fifth and a sixth embodiment example.

The friction clutch 3 therefore includes a reaction plate 4, possibly in 2 parts for forming a damping flywheel or a flexible flywheel, which is keyed in rotation onto the crankshaft 11 and which, at its outer periphery, supports a cover 19, here by screws, to which is attached, with axial mobility, at least one pressure plate 17; several plates 17 and several friction discs 20 possibly being provided as can be seen, for example, in FIG. 4 of the document FR A 1 280 746.

Figure 18:
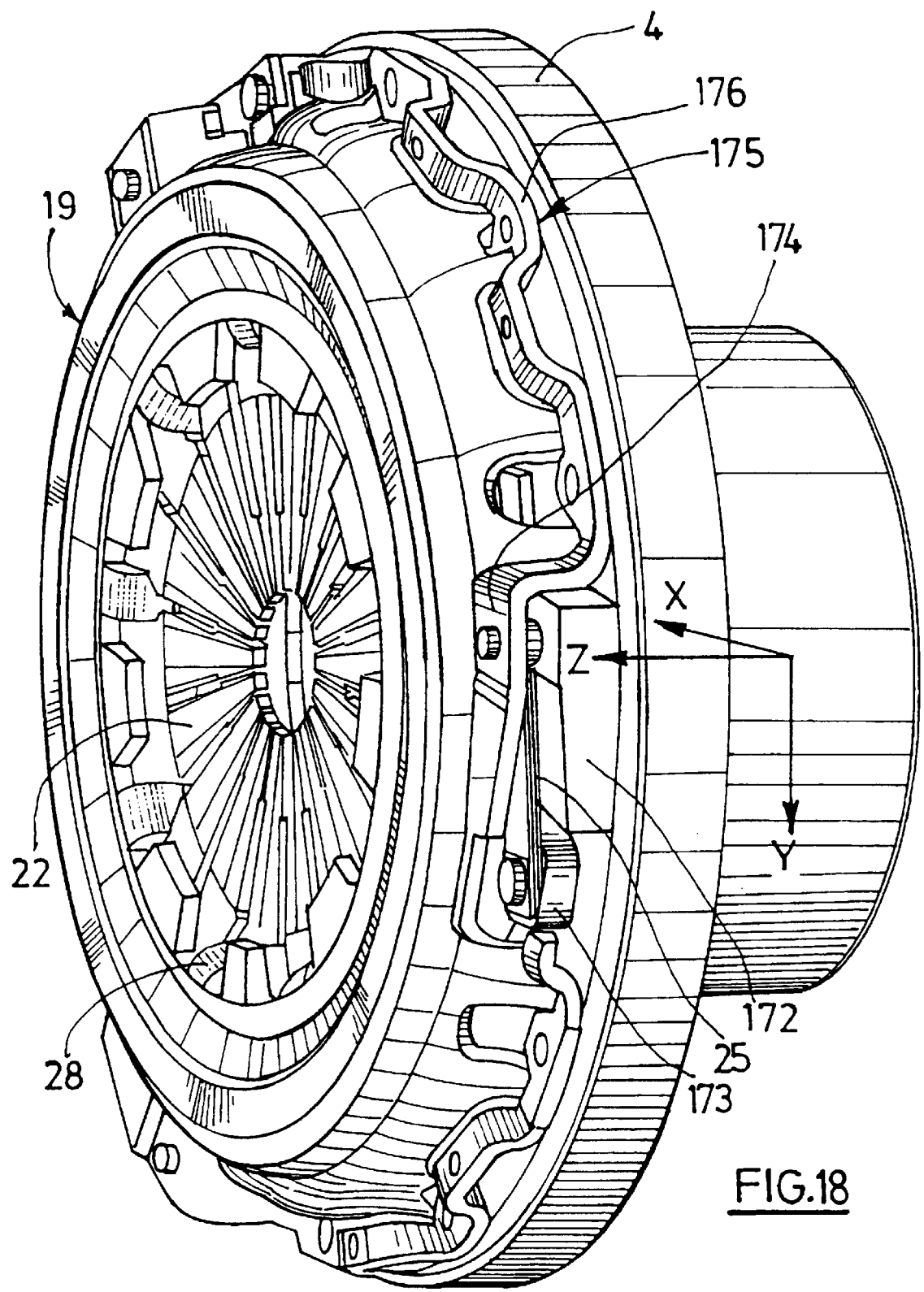
FIG. 18 is a view in perspective of the electric-machine/clutch assembly without the rotor and the stator of the electric machine.

The pressure plate 17 is integral in rotation with the cover 19 and therefore with the reaction plate 4, while being able to move with respect to it by way of axially elastic lugs 25, here tangential, which can be seen better in the document FR A 1 280 746 and in FIG. 18.

Clutching means 18 act between the back of the cover 19, here of hollow shape, and the pressure plate 17. These clutching means-bear on the back of the cover 19 and on a bossing, not referenced, of the pressure plate, in order to clamp the friction linings 16 between the plates 4 and 17.

The declutching means 22 may consist of declutching levers associated with helical springs as described in the document FR A 1 280 746. In a variant, they may be two Belleville washers mounted in series and subjected to the action of declutching levers forming the declutching means.

In the figures represented, the clutching means 18 and the declutching means 22 belong to the same piece of annular shape called diaphragm, featuring a peripheral part of annular shape 18 forming a Belleville washer extended by a central part segmented into radial fingers 22 by blind slots, not visible in the figures, the bottoms of which form orifices widened at the inner periphery of the Belleville washer 18 of the diaphragm.

In the figures, the diaphragm 18, 22, is mounted so as to pivot at the inner periphery of its Belleville washer 18 with the help of a primary support 26 carried by the bottom of the cover 19 and of a secondary support 27 carried by assembling means 28 passing through the widened orifices of the diaphragm. Here, the primary support 26 is formed by stamping of the back of the cover while the secondary support 27 belongs to a circlip ring carried by lugs 28 passing through the widened orifices of the diaphragm 18, 22 and forming the abovementioned assembling means, as described in the document FR A 2 585 424 to which reference can be made for further details.

In a variant, the assembling means may include lugs or distance rods as described in FIGS. 7 to 15 of the document FR A 2 456 877.

Thus, in clutch-engaged position, the diaphragm bears on the primary support 26 and on the bossing which the pressure plate 17 has on its back. To disengage the clutch, action is applied by the use of the clutch release bearing 23, in the figures represented, by pushing on the inner ends of the fingers of the diaphragm in order to make the diaphragm pivot, which then bears on the secondary support 27 formed at the outer periphery of the circlip ring.

During this operation, the load exerted by the diaphragm 18, 22 on the pressure plate 17 reduces, then cancels out, the lugs 25 exerting an action of returning the plate towards the back of the hollow-shaped cover 19 so as to release the friction linings 16.

In these figures, the outer periphery of the Belleville washer 18 bears on the bossing of the pressure plate. In a variant, the structures are reversed such that the outer periphery of the Belleville washer 18 bears on the cover 19, while the inner periphery of the Belleville washer 18 bears on the bossing of the pressure plate 17, as can be seen, for example, in the document FR-A 2 606 477, the clutch then being of the pulled type, the release bearing 23 then acting by pulling on the clutch in order to disengage it.

In the light of this latter document, it is seen that the clutch 3 can be equipped with a wear-take-up device in order to compensate for the wear on the friction linings 16. The pressure plate 17, by virtue of the lugs 25, forms a subassembly in one piece with the cover 19 and the diaphragm 18, 22. This subassembly is called clutch mechanism and is intended to be fixed, here by screwing, onto the reaction plate 4 as can be seen in the figures; the cover 19 having the overall shape of a hollow plate with an outer radial rim for fixing to the plate 4 and a centrally holed back.

The friction disc 20 is, in the figures, of the elastic type, that is to say that the support 21 is coupled elastically to the hub 15 by way of a torsion damper 20a here with elastic elements 35, 36 with circumferential action in the form of coil springs. More precisely, the support 21 is placed beside a first guide washer 29 integral with a second guide washer 30 via distance rods 31. These distance rods 31 also serve here for fixing the disc-shaped support 21, for example of the type described in the document FR-A 2 693 778. The distance rods 31 pass axially through apertures 32 formed in a web 34. The first 29 and the second 30 guide washer are arranged on either side of the web 34 integral in rotation with the hub 15, here after taking up an angular play. This angular play is determined by clearance-fit meshing means acting between the periphery of the inner web 34 and the outer periphery of the hub 15, teeth of the web 34 penetrating, with clearance, into notches of. the hub 15 and vice versa.

The springs 35, with circumferential action, are mounted in windows, not referenced, formed face-to-face in the web 34 and the two guide washers 29, 30. Springs 36, of lesser stiffness than the springs 35, elastically couple the web 34 to the hub 15 as described in the document FR-A 2 726 618 to which reference should be made for further details. This document also describes the axially acting elastic means and the friction means acting between the first guide washer 29 and the web 34.

Between the web 34 and the second guide washer 30 a bearing is provided, acting between the hub 15 and the second guide washer 30, the said bearing being integral in rotation with the web 34 and serving to accommodate the spring 36. Needless to say, the disc 20 may have another shape, for example that described in FIGS. 1 to 4 of the document FR-A-2693778. The web 34 may be integral with the hub 15.

As emerges from the description, the reaction plate 4 features a friction face 37 on its back for contact with the adjacent lining 16 of the friction disc 20. The friction linings 16 are intended to be clamped between this friction face 37 and the one which the pressure plate 17 has, face-to-face with it. This friction face 37 internally delimits a central recess 39 such that the flywheel 13 is centrally of hollow shape. According to one characteristic, the second guide washer 30 penetrates inside this recess 39, radially under the face 37, for reducing the axial bulk. Hence, the second guide washer 30 is further from the pressure plate 17 and from the cover 19 than the first guide washer 29 is. This washer 30 is placed in the recess 39.

The friction disc 20 therefore features, at its outer periphery, at least one friction lining 16 integral with a support 21 coupled elastically by a torsion damper 20a to a central hub 15. The damper 20a penetrates into the recess 39 delimited externally by the friction face 37.

In the embodiment of FIG. 1, the declutching device 24 includes a declutching fork 50 mounted so as to pivot on the back of the bell housing 14 with the aid of a ball joint 51 integral with the bell housing 14. The upper end of the fork is shaped to receive the extremity of a cable linked to the declutching pedal. The control of the declutching release bearing 23 is thus of manual type, this declutching release bearing 23 including, in a known way, a ball bearing one of the rings of which is rotating and is configured for local contact with the inner extremities of the fingers 22 of the diaphragm 18, 22. The other ring of the bearing is fixed and bears against the flange which a sleeve 53 features, subject to the action of the inner fingers of the declutching fork 50. The sleeve 53 slides along a guide tube 52 integral with the bell housing 14. The guide tube 52 is traversed by the shaft 12 coming into engagement with the hub 15. In this figure, the various inclinations of the fork 50 are seen during the declutching operation, the diaphragm visible 18, 22 being flat, overall, in clutch-engaged position. In the upper part of FIG. 1, the clutch is engaged, while in the lower part, the clutch is disengaged. Here, the inner ring of the bearing of the release bearing 23 is rotating while the outer ring of the said bearing is fixed and features a radial rim in contact with the transverse flange of the sleeve 53 under the action of an axially acting elastic washer forcing the rim of the outer ring into contact with the said flange. The release bearing can thus move radially with respect to the flange and is of the self-centring type, a radial clearance existing between the radial rim of the outer ring and the sleeve 53.

By virtue of the invention, the release bearing 23 can come as close as possible to the first guide washer 29 which makes it possible to reduce the axial bulk.

The recess 39 of FIG. 1 is stepped internally in staircase shape. Thus, this recess is delimited externally by a first annular portion of axial orientation 38 being connected at the rear to the friction face 37, and at the front to an annular shoulder of radial orientation 41. A second annular portion of axial orientation 42 is connected at the rear to the said shoulder 41 and at the front to the transverse rear face of a fixing bush 43 the inner periphery of which is in intimate contact with the outer periphery of the crankshaft 11. The second portion 42 therefore has a diameter which is less than that of the first portion 38. The flywheel 13 is single-piece and therefore features, at the front, at its inner periphery, the bush 43 provided with holes 44 for screws 45 for fixing the flywheel 13 to the crankshaft 11 to pass through. The front face of the bush 43 is in contact with the crankshaft 11. The front extremity of the flywheel 13 is therefore intended to be fixed to the shaft 11.

The screws 45 are accommodated inside the second portion 42. Radially above the fixing bush 43, the flywheel 13 is thickened so as to form a sleeve 46 of axial orientation. This sleeve is delimited internally by the portion 42 and the bush 43 and externally by a cylindrical bearing surface 47 serving for mounting the pack of metal plates 9 of the rotor 6.

Thus the reaction plate 4 extends in radial projection with respect to the inner periphery of the rotor 6 and is offset axially with respect to the rotor 6.

The bush 43/sleeve 46 assembly is stirrup-shaped in cross section, the bush 43 extending radially towards the X—X axis and constituting the centrally holed back delimiting the recess 39.

The mounting bearing surface 47 is delimited to the rear by a shoulder 48. Radially, beyond the sleeve 46, the drive flywheel 13 is extended by the reaction plate 4 equipped at its periphery with the toothed crown ring 40. This reaction plate 4 is of decreasing thickness, going from its inner periphery to its outer periphery, such that an axial clearance exists between the squirrel cage 60 and the reaction plate 4 as well as between the chignons 8 and the reaction plate 4. The decreasing thickness of the reaction plate 4 is defined in order to avoid any interference with the rotor 5 and the stator 6. The plate 4 is therefore provided with a clearance notch for the chignons 8.

The pack of metal plates 9 of the rotor 6 is mounted by hooping onto the mounting bearing surface 47 of axial orientation until it comes into abutment against the shoulder 48. The pack of metal plates 9 is therefore heated up and subsequently cooled for fixing onto the bearing surface 47.

In a variant, the pack of metal plates 9 is fixed by a grooving device and keys onto the bearing surface 47.

In a variant, the pack of metal plates 9 is fixed by splines acting between the pack of metal plates 9 and the bearing surface 47.

In a variant, the pack of metal plates is welded to the bearing surface 47.

In a variant, the pack of metal plates 9 is fixed by means of screws passing through the pack of metal plates 9 and the shoulder 48 so as to be screwed into the reaction plate 4, the heads of the screws bearing on a fixing ring in contact with the front extremity of the front pack of metal plates.

In a variant, the sleeve 46 features, at its outer periphery, a frustoconical bearing surface while the pack of metal plates 9 features a complementary bearing surface, at its inner periphery. The pack of metal plates 9 is therefore fixed by conical mating.

In a variant, the pack of metal plates 9 is mounted on the bearing surface 47 and is in contact at one of its extremities with the shoulder 48. At its other extremity, this pack is fixed by screws mounted into the thickness behind the outer surface (FIG. 26) between the bearing surface 47 and the inner periphery of the pack of metal plates 9.

In all cases, the rotor 6 is integral, both axially and rotationally, with the single-piece flywheel 13 in FIG. 1; the said flywheel 13 being obtained by moulding, here from cast iron, so that this flywheel 13 with its rotor 6 exhibits high inertia. Moreover, angular indexing of the rotor 6 with respect to the flywheel 13 can be carried out.

The rear extremity of the flywheel 13 consists of the reaction plate 4 delimited by the friction face 37.

The stator 5 is fixed in a similar way to the rotor 6 on a spacer 61. The outer periphery of the rotor 5 is fixed, for example, onto the inner periphery of the spacer 61 by hooping, in a variant by splines, in a variant by welding, in a variant by screws fitted into the thickness behind the outer surface in the same way as the pack of metal plates 9, etc., and is indexed in terms of angle. For further details on the screw fitting into the thickness behind the outer surface, refer to FIG. 26 where the screws will be seen at 160 and 161.

The spacer 61 has an annular shape and is notched to allow the connector 63 linked to the extremities of the windings to pass through. Another connection device coming from the abovementioned control device, also forming a power device, is coupled to the connector 63, seen better in FIG. 25, to supply the windings of the rotor 5.

The spacer 61 is interposed between the free extremity of the bell housing 14 and the engine block 62. The bell housing 14, at its free extremity, features a radial rim for supporting the heads of fixing screws 64 passing through the spacer 61 and being fixed onto the engine block 62.

Figure 21:
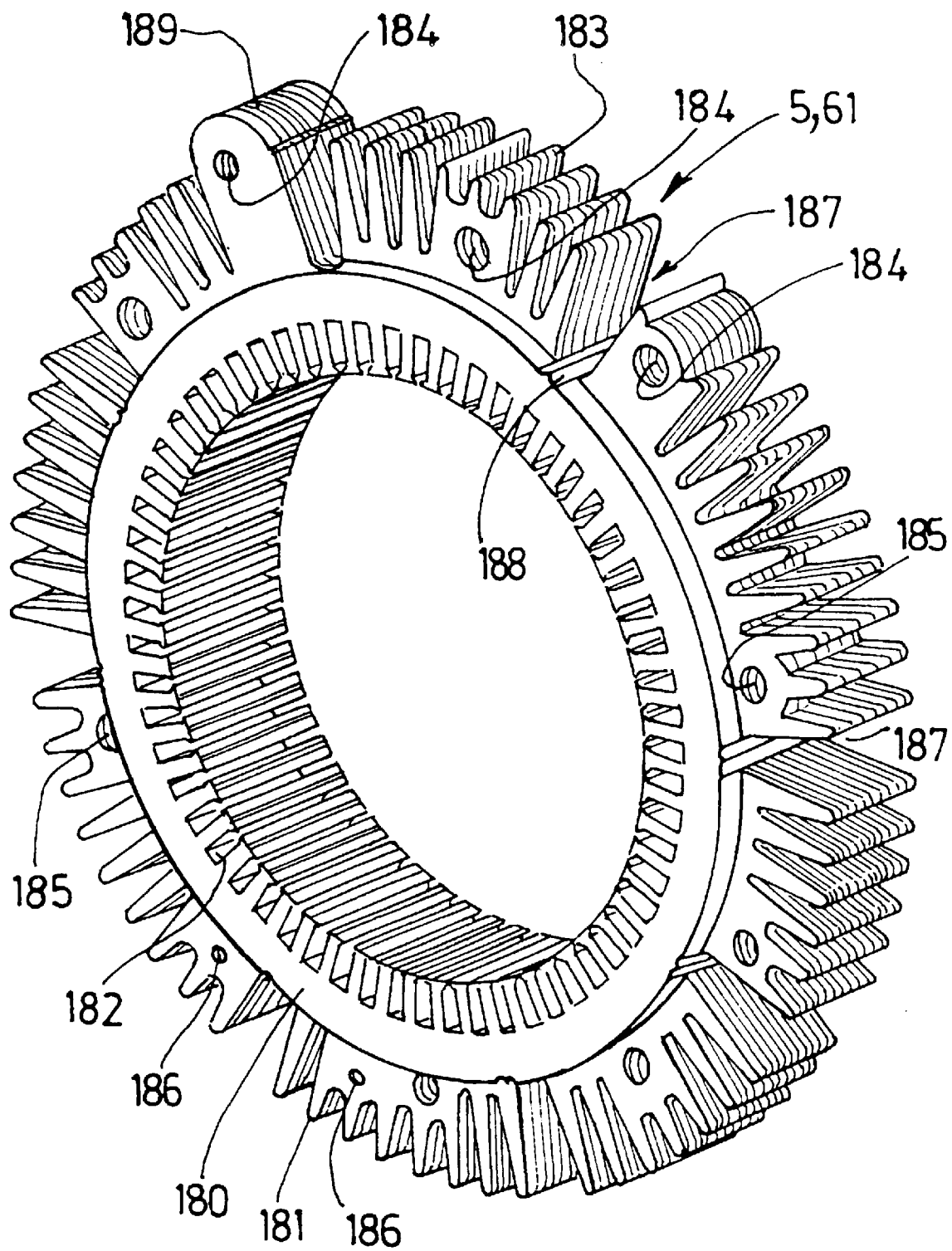
FIG. 21 is a view in perspective of a single-piece spacer with the metal plates of the stator for yet another embodiment example.
Figure 22:
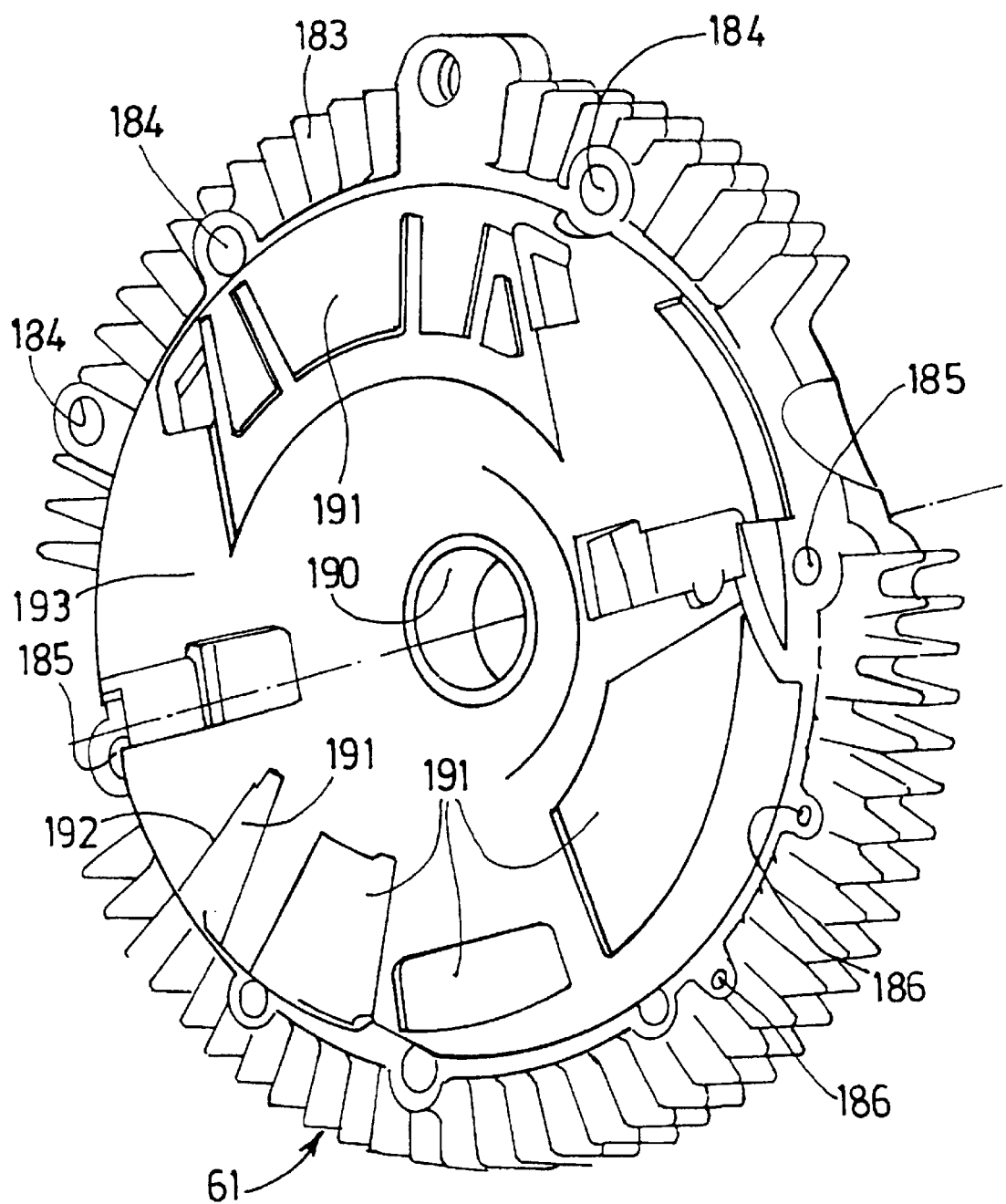
FIG. 22 is a view along the arrow 22 of FIG. 23 of the support flange alone.

The spacer 61 is equipped with cooling fins, seen better at 183 in FIGS. 21 and 22.

It will be noted in FIG. 1 that the second guide washer 30 is accommodated in the space delimited by the segment 38 and the shoulder 41; only the inner extremity of the second guide washer 30 penetrates slightly deeper into the stepped recess 39.

Figure 2:
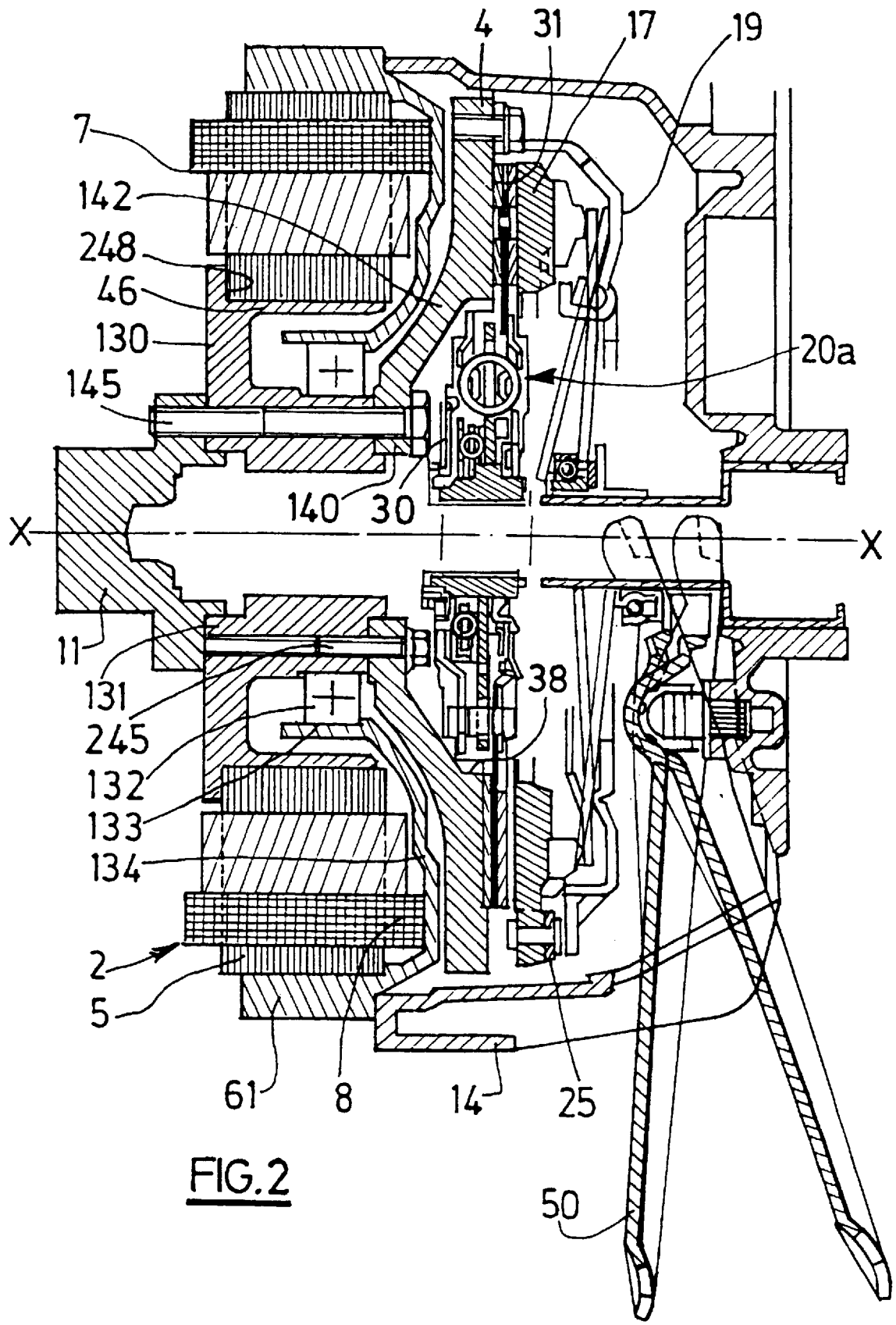
FIGS. 2 and 3 are views similar to FIG. 1, for 2 other embodiment examples.

Needless to say, in a variant, as represented in FIG. 2, the drive flywheel 13 is in several pieces or parts, namely, a reaction plate 4 of hollow shape and an annular spacer 130, 131, 46 overall of U-shaped cross section. This spacer is interposed between the plate 4 and the crankshaft 11, being centred by the said crankshaft. The spacer 130, 131, 46 centres the reaction plate 4 at its rear extremity. To do this, the spacer is recessed to the rear. The first branch of the U, namely the inner or lower branch closest to the X—X axis, is overall a form of inner tube 131 provided with piercings for a first series of fixing screws 145 to pass through, the heads of the screws bearing on the reaction plate and the body passing through the reaction plate 4 and the inner tube 131 so as to be screwed into the crankshaft.

The inner tube 131 features a second series of piercings of smaller diameter than that of the first series of piercings for screwing in a second series of screws 245 fixing the reaction plate 4 to the spacer 130.

The outer, or upper, branch 46 of the spacer 130, 131, 46 consists of the sleeve 46 serving for mounting the rotor 6 in the same way as in FIG. 1.

The sleeve is therefore delimited by a shoulder 248 which here is turned towards the reaction plate 4. The back 130 of the U of the spacer 130, 131, 46 extends overall transversely and links together the two branches 46, 131 of annular shape and of axial orientation.

The spacer 130, 131, 46 includes an upper, rotor-support branch and a lower fixing branch constituting the spacer proper.

The inner tube 131, at its outer periphery, carries bearing means 132. These bearing means consist, for example, of a ball bearing, in a row of balls, in a variant with two rows of balls.

In a variant, the bearing means 132 include two ball bearings.

The inner ring of the ball bearing or ball bearings is therefore pushed into the inner periphery of the inner tube 131 while the outer ring of the ball bearing or ball bearings 132 is pushed into the inside of an annular skirt 133 belonging to the periphery of a carrier piece 134 carrying, at its outer periphery, the spacer 61 onto which is fixed the stator 5 of the electric machine 2 in the same way as in FIG. 1.

The carrier piece 134 follows the shape of the reaction plate 4 overall, while being adjacent to it at a distance. This piece has a tortuous shape because of the presence of the chignons 8.

The skirt 133, of axial orientation, penetrates into the cavity delimited by the branches 46, 131 of the spacer 130, 131, 46.

The carrier piece 134 is in a single piece with the skirt 133 and the spacer 131, being moulded integrally with it. This piece 134 is based on aluminium, for example. The same goes for the spacer 130, 131, 46.

The carrier piece 134 partly envelops the stator 6 and the rotor 5 and thus forms a shield-shaped mask preventing any contamination of the electric machine 2. The piece 134 is here integral with the spacer 61.

The reaction plate 4 is of cast iron as in FIG. 1. Thus, it is possible to alter the inertia of the drive flywheel given that the spacer 130, 131, 46 is lighter than a cast-iron piece. Needless to say, if desired, this spacer may be of cast iron. The reaction plate, as in FIG. 1, features a friction face 37 delimited internally by a first annular portion of axial orientation 38.

The reaction plate 4, at its inner periphery, features a ring 140 of overall axial orientation connected by an inclined portion internally of frustoconical shape 142 to the reaction plate 4 proper. The series of screws 145, 245, feature heads bearing on the ring 140. By virtue of the frustoconical part 142, it is possible to accommodate the second guide washer 30 of the torsion damper 20a within the central recess of the reaction plate 4 delimited by the ring 140 and the portions 142, 38.

By virtue of the inclined portion 142, any interference between the friction disc 20 and the heads of the screws 145, 245 is avoided.

It will be appreciated that, by comparison with FIG. 1, there is a precise and small gap 7 by virtue of the bearing means 132 and the carrier piece 134.

Thus, the gap between the rotor and the stator remains independent and insensitive to all the disturbances relating to the operation of the heat engine: shaking, vibration, play, etc.

Figure 5:
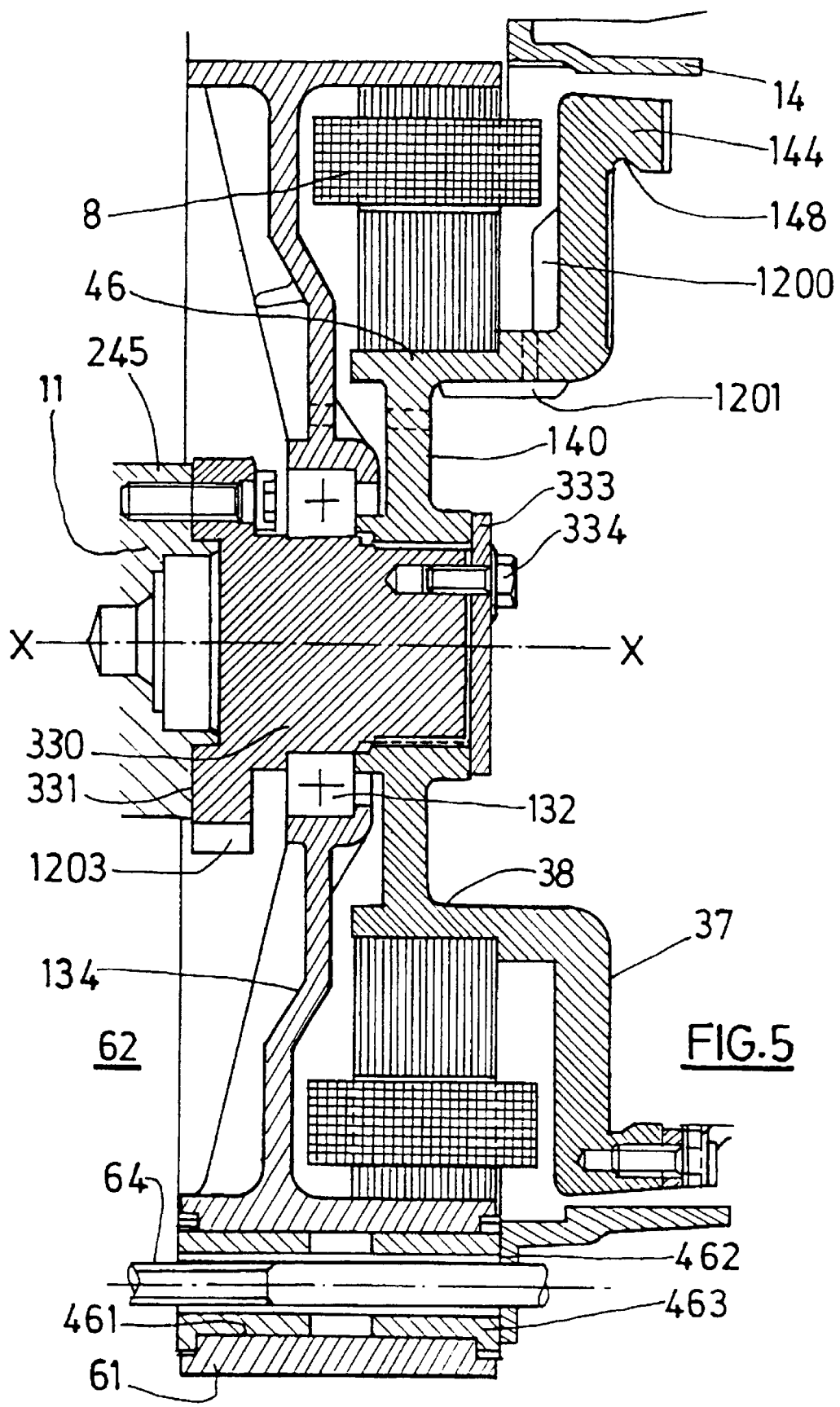
Figure 23:
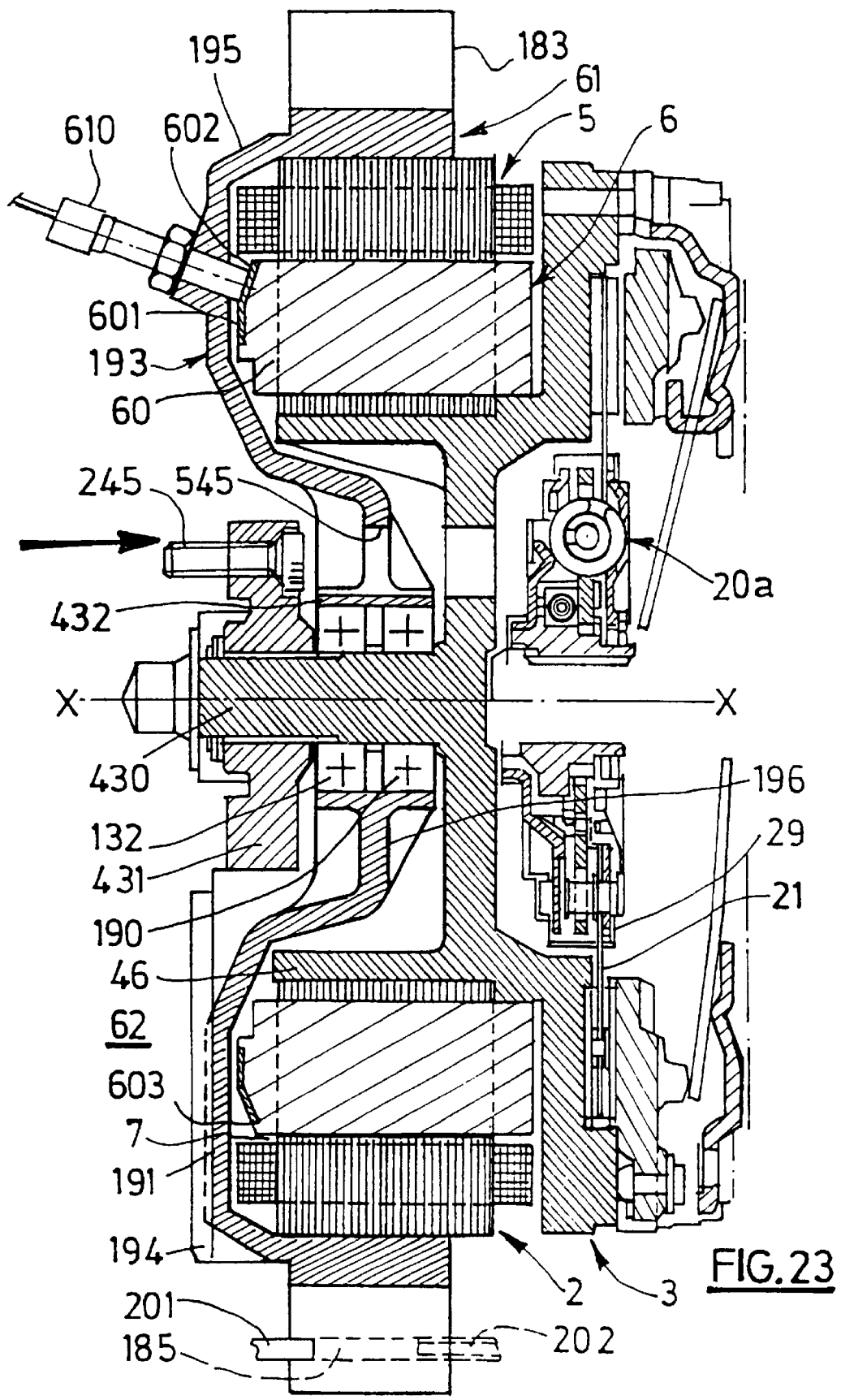
FIG. 23 is a view similar to FIG. 1 for yet another embodiment example.
Figure 37:
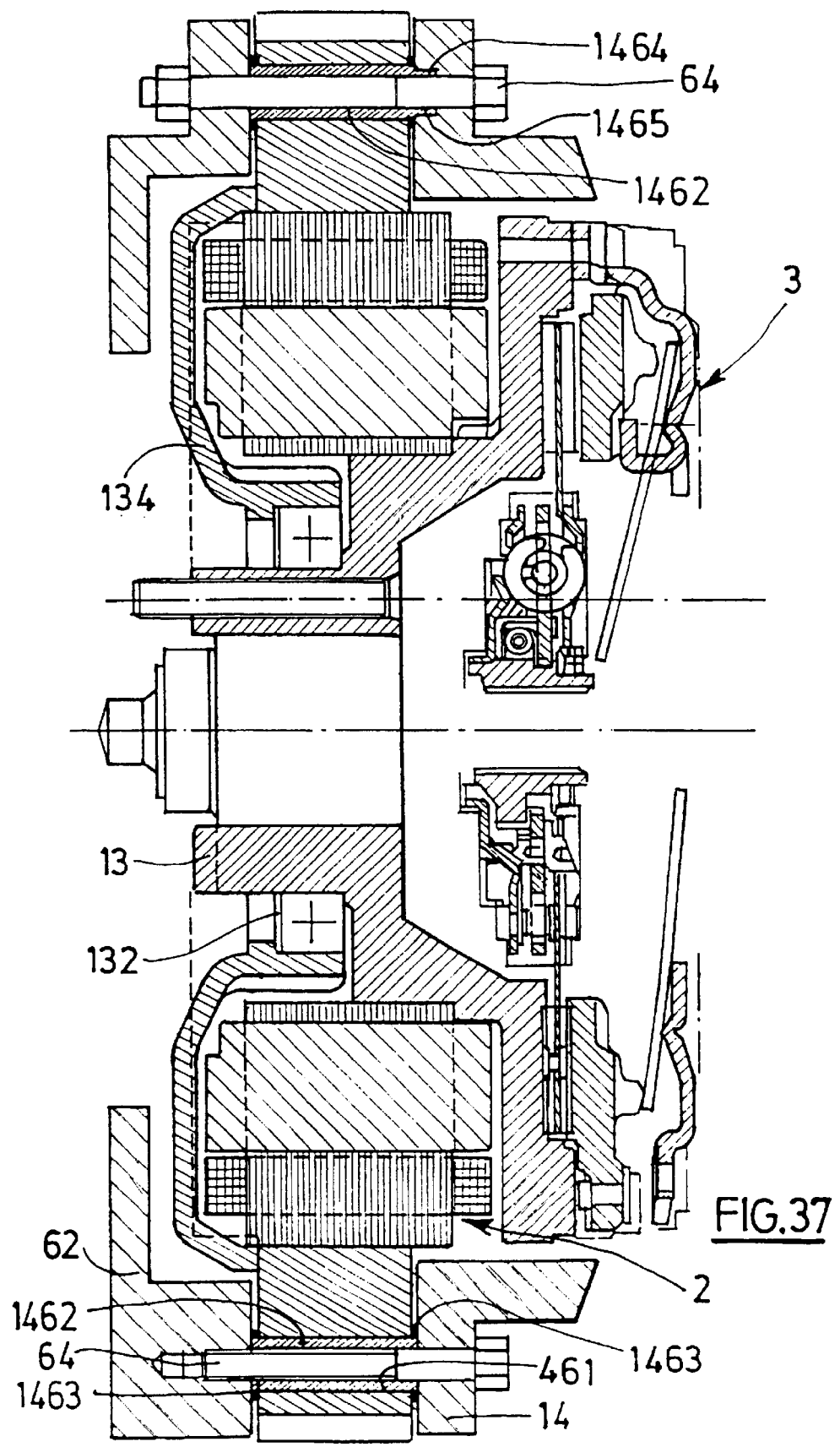
FIG. 37 is a view similar to FIG. 23 in yet another embodiment.
Figure 38:
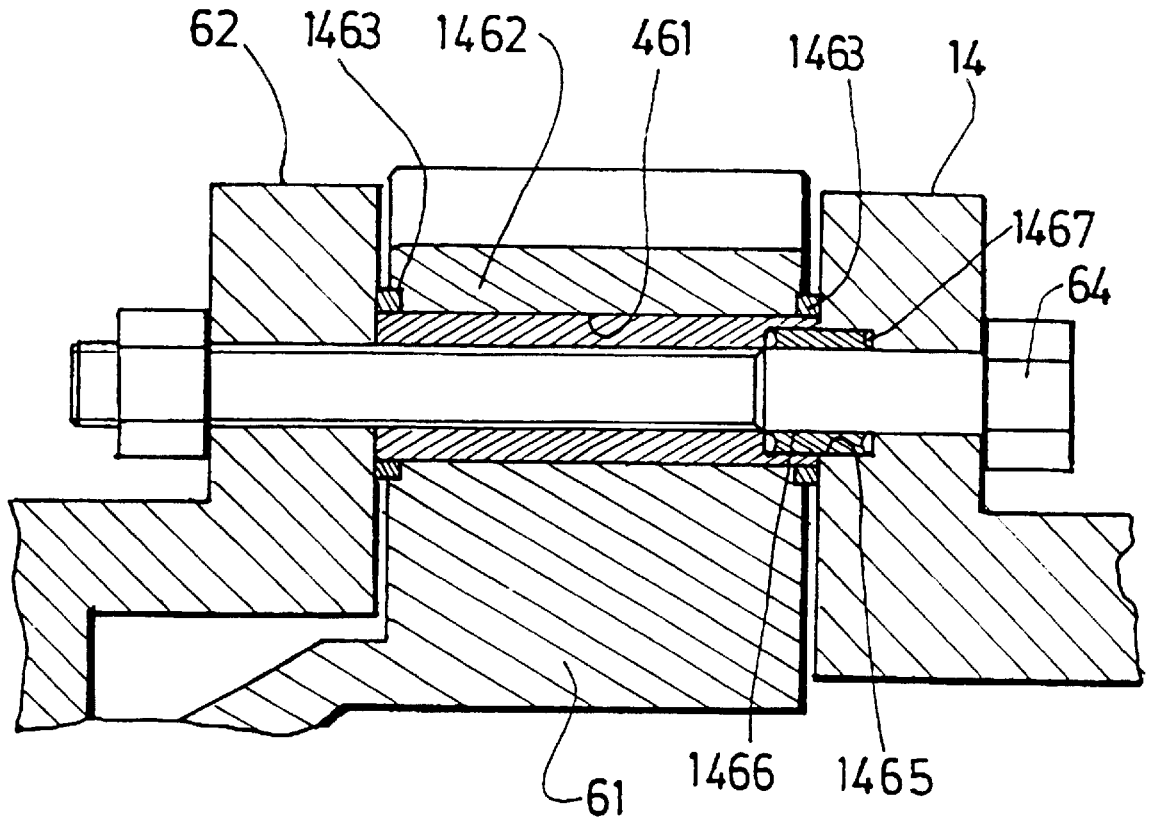
FIG. 38 is a sectional view of a method of fixing the spacer.

If the static stiffness is too great, the solution set out in FIG. 5 or in FIGS. 23, 37 and 38 will be preferred. By virtue of the bearing means 132, the spacer is centred by the crankshaft 11 in such a way that the presence of centring pins between the engine block of the vehicle and the spacer is not vital; centring means existing between the bell housing 14 and the spacer 61.

By virtue of the two series of screws 145, 245, it is possible, in a first manufacturing stage, to manufacture the machine 2 equipped with the spacer 130, 131, 46. Then, to fix the reaction plate by the use of screws 145 and finally to fix the flywheel 13 onto the crankshaft by the use of the screws 145 [sic]. Next, after insertion of the disc 20, the clutch mechanism 17, 25, 19, 18, 24 is fixed.

In a variant, and so as to increase the inertia of the clutch mechanism 17, 18, 19, 24, 25, a cast-iron cover 19 could be used.

Figure 3:
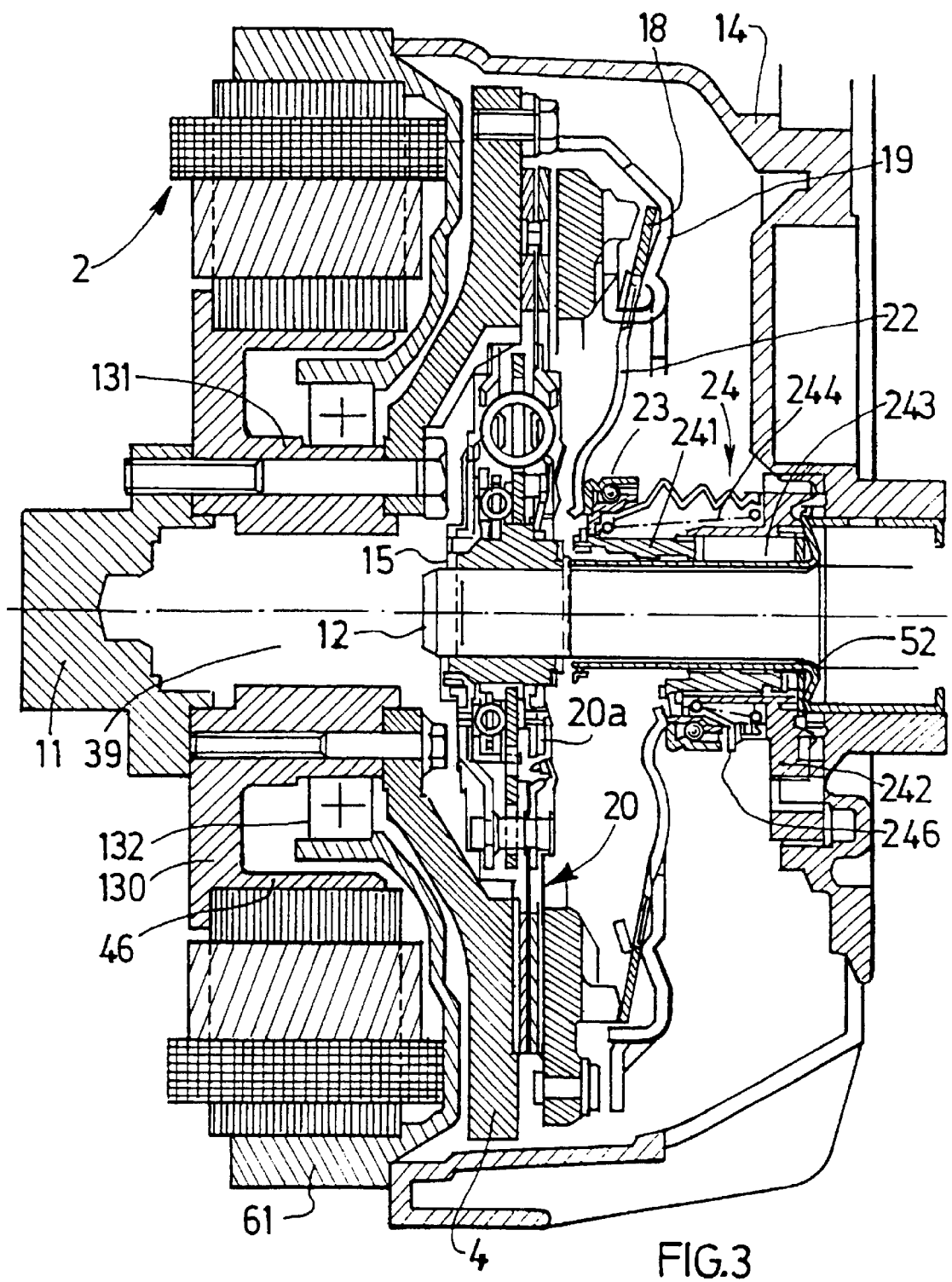

Needless to say, as represented in FIG. 3, it is possible further to reduce the axial bulk by dispensing with the declutching fork 50. In this case, the declutching device 24 is of the concentric type, since it is traversed centrally by the driven shaft 12. The declutching device 24 may be of the cable-controlled type as described in U.S. Pat. No. 5,141,091. In this case, the declutching release bearing 23 is carried by a driven piece fixed in rotation and moveable in translation for example by means of elastic lugs linking a flange of the driven piece to a housing integral with the bell housing 14. The driven piece is in a nut-and-bolt relationship with a driving piece fixed in translation and moveable in rotation for example by means of a ball bearing acting between the fixed housing and the driving piece which, at its periphery, carries a pulley for winding the control cable operated via the clutch pedal.

In a variant, as represented in FIG. 3, the declutching device 24 is of the hydraulic type as described in the document FR-A-2,730,532. In this case, the declutching release bearing 23 is carried by a piston 241 moveable axially with respect to the guide tube 52 integral, for example by crimping, with an outer body 242 fixed onto the clutch bell housing 14, for example with the aid of lugs as described in the document FR-A-2,730,532. The outer body 242 surrounds the guide tube and defines, with it, a blind annular cavity 243 of axial orientation, the back of which consists of a radial rim which the guide tube features at its rear extremity. This radial rim is fixed, for example by crimping, onto the outer body 242 equipped with a supply inlet for control fluid, such as oil, linked to a piercing, not visible, opening out in the cavity 243 in the region of its back. The supply inlet can be seen better in FIGS. 16 and 17, and features a through-channel. The piston 241 penetrates into the cavity 243 and, leaktightly with it, delimits a variable-volume chamber. A pre-loading spring 244 acts between the body 242 and the front extremity of the piston 241 in order to keep the release bearing 23 constantly pressing against the extremities of the fingers 22 of the diaphragm 18, 22. Protective bellows 246 are also provided, surrounding the spring 244. By comparison with FIG. 1, the outer ring 23 of the bearing is rotating while the inner ring of the bearing is fixed. For further details, refer to the document FR-A-2,730,532. It is seen that the distance between the back of the bell housing 14 and the cover 19 is reduced because of the absence [lacuna] fork 50. This is because, in FIGS. 1 and 2, it is necessary to provide additional space for the angular movements of the fork. The declutching device 24 thus forms the hydraulic receiver of a hydraulic control the transmitter of which is actuated either manually by the declutching pedal or semi-automatically by an electric-motor actuator controlled according to predetermined programmes for changing gear ratio by an electronic computer receiving information especially from sensors measuring the speed of rotation of the shafts 11 and 12, as well as the movement of the declutching release bearing 23 of the plate 17.

These sensors can be used to control the electric machine 2. Needless to say, in a variant, the reaction plate 4 features a crown ring 40 as in FIG. 1 allowing a sensor to measure the speed of rotation of the drive shaft 11. The sensor may be of the optical type, so as not to be disturbed by magnetic phenomena.

The sensors may be placed at any appropriate site and thus serve both for control of the electric machine 2 and for control of the abovementioned electric-motor actuator, the electronic computer being common to the electric machine 2 and to the electric-motor actuator.

It is evident that the electric machine thus makes it possible to synchronise the rotational speeds of the shafts 11 and 12 by accelerating or by braking the shaft 11, so that it is possible to use gearboxes without a synchronisation device with a positive-coupling device which can be shifted with slight effort. It results therefrom that the gearbox can be controlled by low-force actuators for changing and/or selecting ratios.

The changing of gear ratio is thus easier and faster since the speed of the two shafts is synchronised.

With the vehicle stopped at red lights, neutral engaged, the movement of the release bearing, as well as the changing of gear ratio, supply, via sensors, information for re-starting the heat engine.

Needless to say, as can be seen in FIG. 4, the sleeve 46 may be a single piece with the reaction plate 4 and extend axially in the direction of the crankshaft 11. The bearing means 132 act between the inner periphery of the sleeve 46 and the outer periphery of the skirt 133 of the carrier piece 134 carrying the stator 5 while the hub 46 carries the rotor 6 at its outer periphery, in the abovementioned way. It is seen that, by comparison with FIG. 3, the structures have been reversed, the carrier piece 134 being turned round so as to extend in the vicinity of the casing 62 of the heat engine.

It will be noted that, in FIGS. 2 to 4, the bearing means 132 extend above the fixing screws 145. In this FIG. 4, the spacer 230 consists of a shaft passing through the central aperture of the ring 140 via a centring nose, at the front, the shaft 230 is recessed at 231 for centring it via the crankshaft 11. As in FIG. 3, the second guide washer, not represented, penetrates into the central recess of the pressure plate delimited by the ring 140 and the portions 142, 38. It will be noted that the portion 38 is shorter than in FIGS. 2 and 3 while the portion 142 is more inclined. In FIGS. 2 and 3, the carrier piece 134 forms a dust catcher and thermal screen since it extends in the immediate vicinity of the reaction plate 4 and envelops the rotor and the stator. Thus, the particles, especially metallic particles, originating from the friction linings 16 of the friction disc 20 do not risk contaminating the electric machine 2, thus guaranteeing good efficiency.

The central recess 39 of the flywheel 13 therefore consists of the central recess of the reaction plate 4 delimited externally by the friction face 37 for contact with the lining 16.

In FIG. 4, the reaction plate features, at its outer periphery, an annular skirt of axial orientation 144 surrounding the friction linings 16 in such a way that the dust from the linings 16 does not come to contaminate the electric machine 2.

Furthermore, a groove 148 is provided at the inner periphery of the skirt 144 in order to catch the dust. This groove is connected to the friction face 37 of the reaction plate by a vertical side face and exhibits, in section, a back in the shape of a circular arc extended by an inclined side face. Needless to say, the groove 148 may be of any other shape. Nevertheless, it will be appreciated that the inclined side face directs the impurities towards the pressure plate 17. The impurities are driven by centrifugal force into the groove 148 constituting an anti-contamination groove.

Needless to say, in FIG. 1, the plate 4 may be equipped with such a skirt 144 with groove 148.

All combinations are possible. It will be noted that, in FIG. 4, the spacer 61 is separate from the carrier piece 134.

The carrier piece 131 is fixed directly onto the engine block 62 by the use of fixing screws 164 passing, with radial clearance, through piercings 165 formed in lugs 166 which the carrier piece features beyond its outer periphery, because of the presence of the bearing means 132.

The spacer 61 is separate from the carrier piece which, at its outer periphery, carries an annular skirt 261 for mounting the stator 5, for example by hooping in the manner described above.

The spacer 61 is hollowed for the passage of the lugs 166 distributed, for example, regularly at 120 degrees. The number of lugs depends on the applications.

Needless to say, the bearing means 132 can be installed over the same circumference as the fixing screws 245 as visible in FIG. 5. In this case, the sleeve 46 still belongs to the reaction plate the inner ring 140 of which is widened at its base in order to feature splines and to mesh with a shaft 330 featuring lugs 331 for fixing it with the aid of screws 245 [lacuna] the crankshaft 11. The rear extremity of the shaft is splined so as to interact with the splines of the ring 140. Thus, the reaction plate 4 is linked in rotation to the shaft 330. The ring 140 is keyed axially by a washer 333 fixed by screws 334 on the end of the shaft 330. On the other end, the ring 140 is keyed axially by the inner ring of the ball bearing constituting the bearing means 132. This bearing is interposed axially between the ring 140 and the heads of the screws 245. The carrier piece 134 of the stator 5 carries spacers 61 and has a much straighter shape than in FIG. 4. It will be noted in FIGS. 4 and 5 that the carrier pieces 134 can be ribbed in order to stiffen them, which is not easy in FIGS. 2 and 3. In FIG. 5, the ribs are of greater amplitudes than in FIG. 4. It will be noted that the fixing elements 64 are mounted elastically in the through-holes 461 of the spacer 61, in order to avoid excess stiffness during the movements of the crankshaft, more precisely, the fixing elements 64 are surrounded by a split pin 462 which is itself surrounded by two shouldered bearing pads 463 made, for example, of an elastomer such as rubber, placed at the extremities of the through-holes 461. A certain degree of freedom therefore exists between the fixing elements 64, here in the form of a stud, and the sole 61 in such a way that the carrier piece is not clamped and is centred onto the shaft 330 by the ball bearing 132 with a small and precise gap being created. Needless to say, this type of elastic mounting is applicable in FIGS. 1 to 3.

Needless to say, it will be noted that the central recess of the reaction plate 4 in which the second guide washer 30 of the friction disc 20 is accommodated is delimited here by the ring 140 and the annular portion of axial orientation 38.

Thus, the torsion damper 20*a* may be thicker. It is even possible to mount two torsion dampers in parallel as described, for example, in the document U.S. Pat. No. 3,101,600. It is thus possible to obtain large angular ranges of movement.

Figure 6:
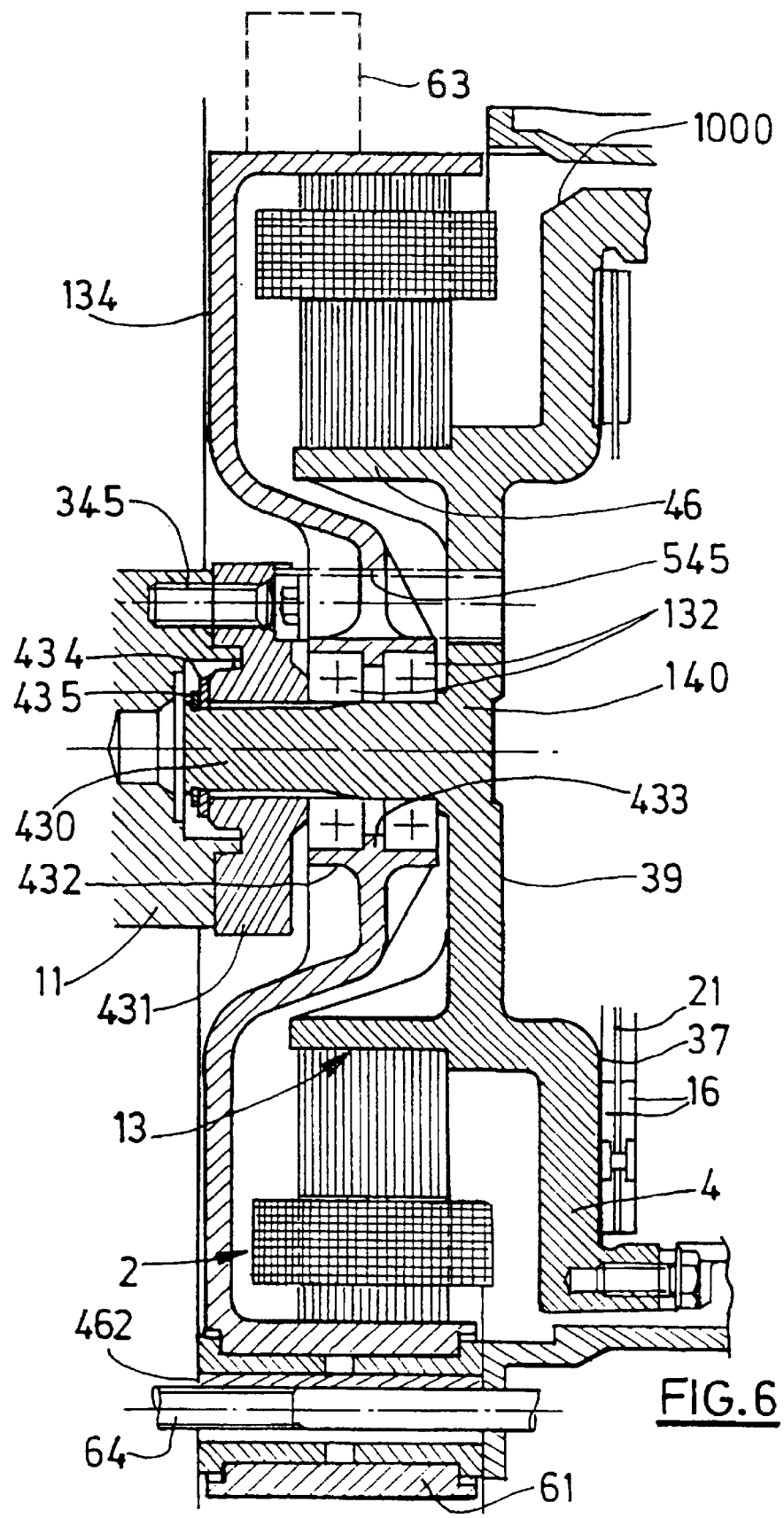

In FIG. 6, in which the structures have been reversed with respect to the structure of FIG. 5, such that the splined link is situated to the front and not to the rear, more precisely, in this embodiment, the ring 140 extends radially a little further radially inwards in the direction of the X—X axis so as centrally to feature a shaft 430 the front extremity of which is splined in order to come into engagement with splines present within a fixing pedestal 431 fixed by screws 345 to the crankshaft 11 of the engine. The carrier piece 134 is integral with the spacers 61 as in FIG. 5 with an elastic mounting between the spacers and the fixing elements 64. The bearing means 132 are installed axially between the ring 140 and the pedestal 431 and consist of two ball bearings. The carrier piece 134 features a bush 432 at its inner periphery by which it is mounted onto the outer rings of the bearings 132 with an intermediate collar 433 for separating the two ball bearings 132. The bush 432 is provided with piercings 545 radially above the bearings 132 for access with the aid of tools to the heads of the fixing screws 345. Thus, the tools for fixing the screws pass through the carrier piece 134 and the ring 140. Needless to say, as described in the document FR-A-2 718 208, the fixing tools may also pass through the friction disc. To do that, it is sufficient to equip the friction disc with a raised pre-damper. It will be noted that, in FIGS. 2 and 3, the torsion pre-damper is of the type described in the document FR-A-2 718 208. This pre-damper therefore includes a web fixed onto the hub 15 and two guide washers arranged on either side of the web and assembled together by clipping with the aid of lugs serving for rotational driving of the pre-damper with the web 34.

Needless to say, by comparison with this document FR-A2718208, the second guide washer has to be mounted in the recess of the reaction plate, that is to say the friction disc 20 has to be turned over.

In this case, it is obviously necessary to provide through-holes in the diaphragm for the tool or tools for fixing the screws to pass through, given that the said fixing tools may belong to a screwdriver or else be individual tools.

The screws or other fixing elements can be mounted in captive fashion in the machine. To do that, the heads of fixing screws may have a diameter greater than that of the abovementioned through-holes in the diaphragm, in the friction disc.

In this case, a module can be formed comprising the reaction plate 4, the friction disc 20 and the clutch mechanism comprising the plate 17, the diaphragm 18, 22 and the cover 19 as a unit.

This unit module can be balanced easily, for which reason a balancing chamfer can be seen at 1000 in FIG. 6, formed at the outer periphery of the reaction plate 4. Thus, it is possible to remove more or less material at the desired sites in order, here dynamically, to balance the friction-clutch/electric-machine assembly since, in FIG. 6, it is possible to produce the electric machine 2/friction clutch 3 assembly, pedestal 431 then finally, using screws 345, to screw the assembly onto the crankshaft 11.

Needless to say, the tool or tools for fixing the screws 345 may not pass through the friction [lacuna] and the clutch mechanism. In this case, a drive flywheel 13/electric machine 2 and pedestal 431 subassembly can be produced, which can be balanced dynamically then mounted on the crankshaft 11 by the use of screws 345. Next, the friction disc 20 is put in place then the clutch mechanism is fixed, knowing that it can be balanced dynamically in a known way, for example by piercing the pressure plate 17 at the desired sites and or adding balancing rivets fixed for example onto the peripheral rim of the cover.

It will be noted that, in FIG. 6, the pedestal 431 is keyed axially, on the one hand, at the rear on the shaft 430 by the ball bearing 132 farthest from the ring 140 and, on the other hand, at the front, on the shaft 430, by a washer 434 held in place by a circlip 435 engaged in the free extremity of the shaft 430.

In a general way, in FIG. 6, it is possible to produce at least one electric-machine 2/drive-flywheel 13/pedestal 431 subassembly which is mounted in a single move on the crankshaft. This subassembly, in a variant, possibly comprising [sic] the friction clutch 3, in the abovementioned way.

In all the figures, balancing of the electric-machine 2/drive-flywheel 13 assembly can be carried out by removing material, for example from the reaction plate, or from the spacer 130, 131, 46 or from the shaft 330 or, in a general way, from any other piece rotating around the axis X—X and integral in rotation with one of the shafts 11 and 12, for example, material can be removed from the pressure plate 17.

Needless to say, the reverse can be carried out, that is to say some material can be added at the desired sites on any piece rotating around the axis X—X is [sic] integral in rotation with one of the shafts 11 or 12. It is possible, for example, to add balancing rivets to the cover 19, to the reaction plate 4, to the spacer 130, 131 and 46, to the sleeve 46.

Balancing is therefore done by adding or removing mass on the flywheel 13 or on the clutch mechanism 35 17, 18, 22, 19, and the out-of-balance of the heat engine can be corrected, especially in the case of three cylinders, by removing or by adding material.

The balancing can therefore lead to the presence of an out-of-balance on the electric-machine 2/friction-clutch 3 assembly in order to correct the out-of-balance of the heat engine. The heat-engine/friction-clutch device 2, 3 assembly equipped with the electric machine is therefore balanced.

In a general way, it will be noted that the bearing means 132 of FIGS. 2 to 6 are configured so as to be brought close to the centre of gravity of the rotating parts, that is to say of the assembly 1. Hence, in FIG. 6, the bearing means consisting of the two ball bearings are installed radially below the rotor 6 and the stator 5, and this can be done in a way which is symmetric overall with respect to the axis of radial symmetry of the rotor and of the stator. In this figure, these bearing means are installed radially below the friction face 37 of the reaction plate 4.

It will be noted that, in this FIG. 6, the rotor 6 is fixed to its inner periphery radially below the friction linings.

The same goes for the other figures. Needless to say, in a variant, the rotor 6 can be fixed radially at the linings 16, between the inner and outer periphery thereof. It is sufficient, in FIG. 2, for example, to increase the radial size of the back 130.

In FIGS. 2 and 3, the bearing means 132 are installed radially below the rotor 5 and the stator 6 while being offset axially towards the reaction plate with respect to the axis of radial symmetry of the rotor 6 and of the stator 5.

In FIG. 4, the bearing means 132 are still installed radially below the rotor 6 and the stator 5, while being offset axially in the direction opposite to the reaction plate 4 with respect to the axis of radial symmetry of the rotor 6 and of the stator 5.

The same is true in FIG. 5, in which this offset is more marked, the bearing means 132 being offset axially overall with respect to the rotor 6, this time in the opposite direction to the reaction plate 4.

All this depends on the shape of the central recess of the flywheel 13 and therefore of the reaction plate 4.

It will be appreciated that the location of the second guide washer 30 within the central recess of the reaction plate 4 offsets the centre of gravity of the assembly 1 towards the bearing means 132.

The hollow shape of the reaction plate 4 is beneficial since the inner periphery of the reaction plate 4 is closer to the rotor 6 than is the friction face 37 of the said plate, such that the centre of gravity of the assembly is shifted towards the electric machine.

Needless to say, material can removed in the region of the front face of the reaction plate 4 which is turned towards the chignons 8. It is for this reason that the reaction plate 4 of FIGS. 1 and 4 features a variable thickness at its outer periphery and facing the chignons 8.

Thus, the chignons penetrate into a notch or recess of the engine flywheel. In a variant, recesses can be provided in the casing 62 of the heat engine.

Needless to say, the flywheel 13 can be shaped to mark the speed and or the position of the rotor 6 by the use of one or more sensors. For example, the toothed crown ring 40 may be associated with two sensors, one radial, the other of axial orientation, in order to mark the speed and or the position of the rotor.

These sensors can be carried by the bell housing 14. In a variant, at least one of these sensors is carried by the stator 5 or the carrier piece 134. One of these sensors, of radial orientation, for example, serves for the injection control of the internal-combustion engine and the other, for example of axial orientation, serves for the control of the electric machine which may be of any type.

In a variant, the information sensor belongs to the bearing means 132. These bearing means then advantageously consist of one or more ball bearings which are instrumented in order to form a sensor of the rotational speed of the drive flywheel. The wires of these instrumented ball-bearing-type sensors are then advantageously supported by the carrier piece 134 so as to join up with the connector 63 of the electric machine 2.

The ball bearing may be of the type described in the document FR-A 2,599,794 and include a magnetic-field sensor carried by the fixed ring of the bearing and at least one multi-pole magnetised ring carried by the rotating ring with a gap present.

It is therefore advantageous for these sensors to be carried by the fixed part of the electric machine 2.

Needless to say, depending on the electric machines, the sensors can also be used to measure the speed or the position of the rotor.

Needless to say, arrangements can be provided for cooling the electric machine 2.

For example, in FIG. 5, fins 1200 are provided on the front face of the reaction plate 4, facing the rotor 6. These fins are installed above the chignons 8, while advantageously being inclined in the fashion of the vanes of a fan.

Needless to say, in a variant, as can be seen at 1201 in FIG. 5, the fins originate from the portion 38. Advantageously, holes are formed in the carrier piece and in the ring 140 and in the portion 38 of the reaction plate 4 in order to produce a circulation of air as can be seen in dotted lines in FIG. 5.

In a variant, the shaft carries fins referenced as 1203. Needless to say, the fins can be produced at the outer periphery 431 of the pedestal 430 as represented in FIG. 6.

In FIGS. 2 and 3, the fins could originate from the back 130 of the spacer 130, 131, 46. The fins may be formed at the extremities of the pack of metal plates 9.

The fins may be on the casing of the machine. The cooling, if it is done by air, can be forced (air-flow from the outside into the machine or conversely) or by internal ventilation, or by natural convection.

Figure 7:
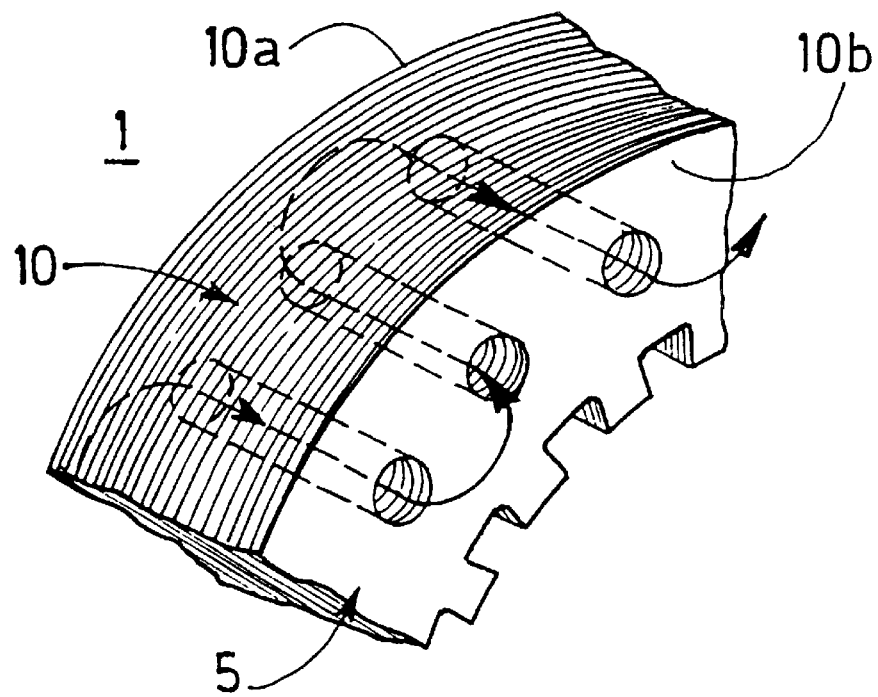
FIG. 7 is a partial view of a device for cooling the stator.
Figure 8:
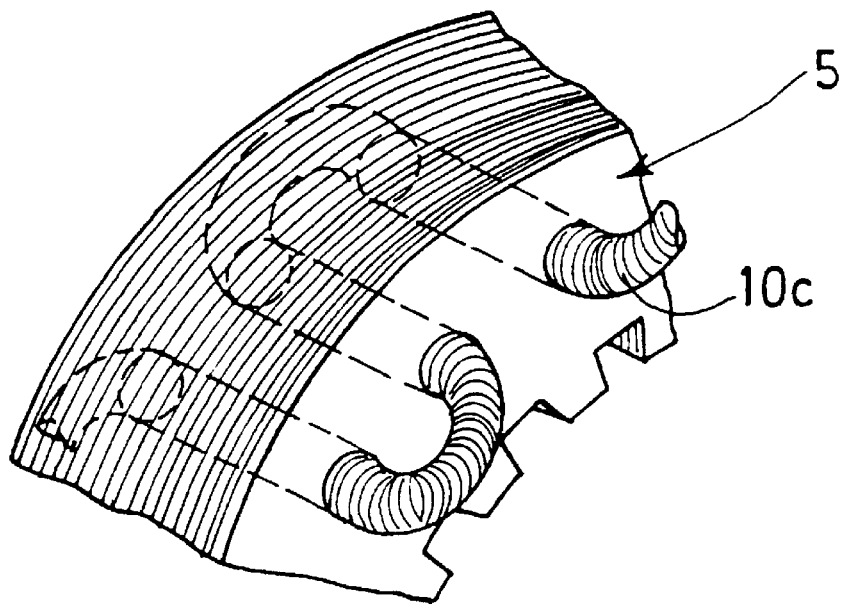
FIG. 8 is a view similar to FIG. 7 in another embodiment example.

In a variant, as can be seen in FIGS. 7 and 8, the stator 8 can be cooled by the use of a heat-carrying fluid.

Thus, in FIG. 7, the metal plates 10 of the stator 6 are pierced.

The pack of pierced metal plates 10 is then delimited advantageously by two flanges 10a, 10b having a shape making it possible to transport the heat-carrying fluid from one face to the other of the stator by passing through the holes formed in the stator.

In a variant, as represented in FIG. 8, the end flanges are dispensed with and replaced, for example, by overmoulded, bent hoses 10c, made of aluminium, for example.

Advantageously, the spacer is of the same type as in FIG. 21, the same pack of metal plates forming a spacer. In this case, two series of metal plates are provided, identical at their inner periphery, the piercings being formed in the outermost series of metal plates.

Advantageously, the chignons are also overmoulded, so protecting their varnish by giving them a coat of a resin loaded with heat-carrying elements.

Needless to say, in order to control the majority of electric machines, it is necessary to index the position of the rotor with respect to the stator, as well as the position of the sensors with respect to the rotor.

Figure 9:
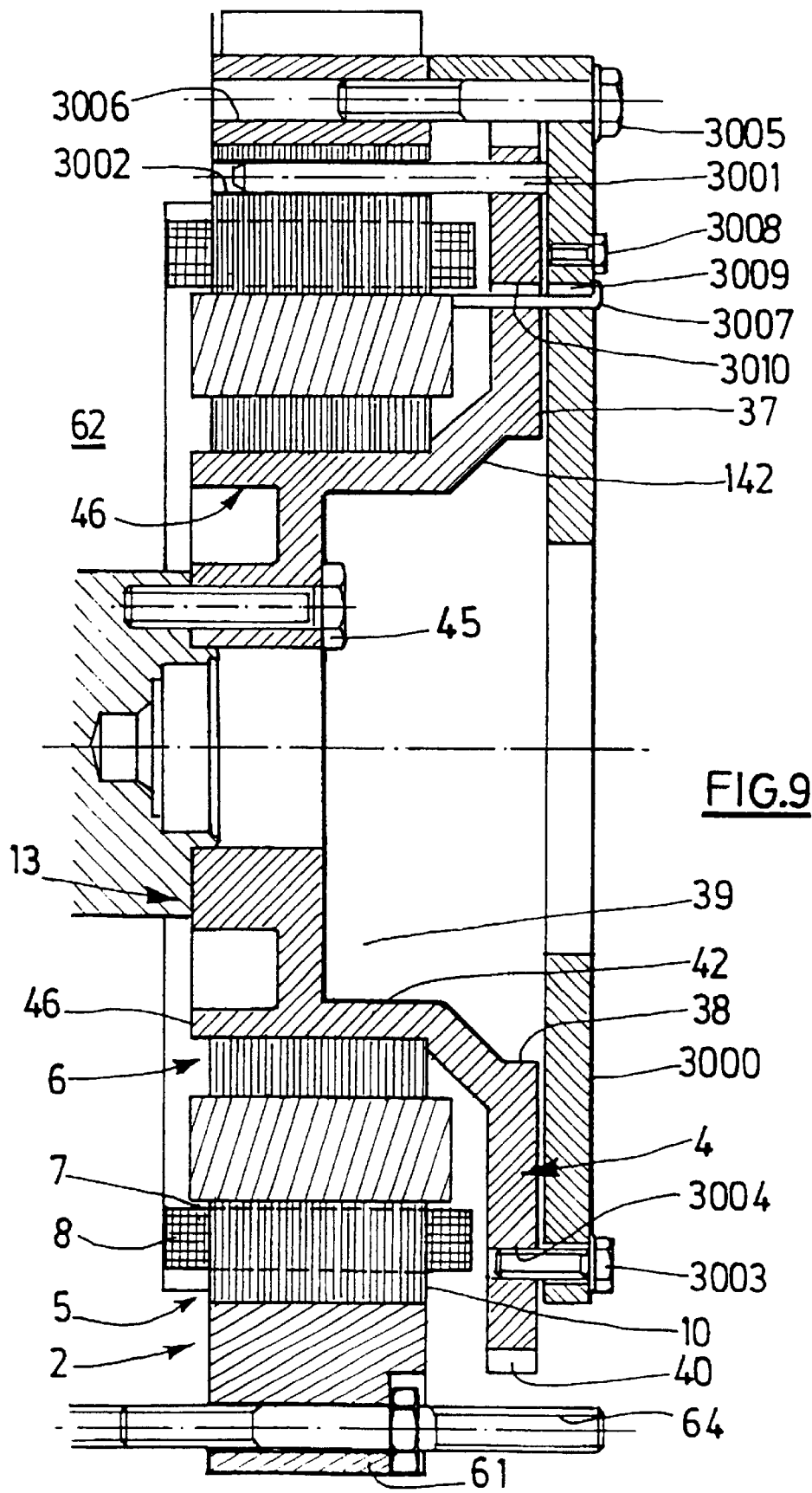
FIG. 9 is a view in axial section of an engine flywheel similar to that of FIG. 1 equipped with a removable mounting plate.

In FIG. 9, the flywheel 13 of FIG. 1 has been represented, forming a subassembly with the machine 2. This subassembly is delivered as represented in FIG. 9.

When the electric machine 2 is operating in motor mode, especially in starter mode in the abovementioned way, it is necessary to know the position and/or the speed of the rotor with respect to the stator.

Hence, recourse is had to a removable mechanism plate 3000 carrying at least one gauge rod 3001, projecting axially and penetrating, with centring, into a hole 3002 formed in the pack of metal plate [sic] 10 of the stator 6 beyond the chignons 8. The mechanism plate is fixed to the reaction plate 4 using screws 3003 each screwed into a tapping 3004 of the reaction plate 4 and bearing, by their head, on the rear face of the mechanism plate 3000.

By virtue of the gauge rod 3001, the stator 6 is indexed in rotation with respect to the rotor 5 knowing that the mechanism plate 3000 is screwed, using screws 3005, into tapped holes 3006 present on the spacer 61 carrying the pack of metal plates 10 of the stator 6, in the abovementioned way.

Furthermore, the mechanism plate 3000 carries shims 3007 fixed to the rear face of the mechanism plate 3000 using screws 3008. The shims 3007 pass through a passage 3009 of the mechanism plate and a passage 3010 of the reaction plate 4 so as to be interposed between the inner periphery of the stator 5 and the outer periphery of the rotor 6.

Thus the gap 7 is kept rigid while having indexing of the rotor 6 with respect to the stator 5. The gap thus obtained is constant and depends on the width of the shims 3007.

Hence, the subassembly is mounted on the casing 62 of the engine block by the use of screws 45 and of studs 64 replacing the screws 64 of FIG. 1. Next, the screws 3003 and 3005 are unscrewed in order to remove the mechanism plate equipped with the gauge rod 3001 and with the shims 3007. Next, the friction disc 20 is accommodated in the central recess of the reaction plate and, finally, the clutch mechanism is fixed onto the reaction plate 4. It will be noted that, in all the figures, the hub 15 extends to a major extent into the central recess 39 of the flywheel 13.

After mounting, the mechanism plate 3000 with the gauge rods 3001 and the shims 3007 is recovered by the manufacturer of the machine. This solution presents numerous advantages, since, in addition to the guarantee of the constant gap, transport of the rotor/stator assembly is also facilitated, thus allowing delivery of the machine in a single piece.

In a variant, the use of the mechanism plate 3000 is dispensed with by producing a constant gap by optical setting carried out by means of jacks acting radially, for example on the portion 42 of the reaction plate 4.

It will be noted that, in FIG. 9, the reaction plate 4 features an inclined portion 142 connecting the portions 42 and 38 together. Thus, the central recess of the flywheel 13 may have all the appropriate shapes resulting from the different figures.

Figure 11:
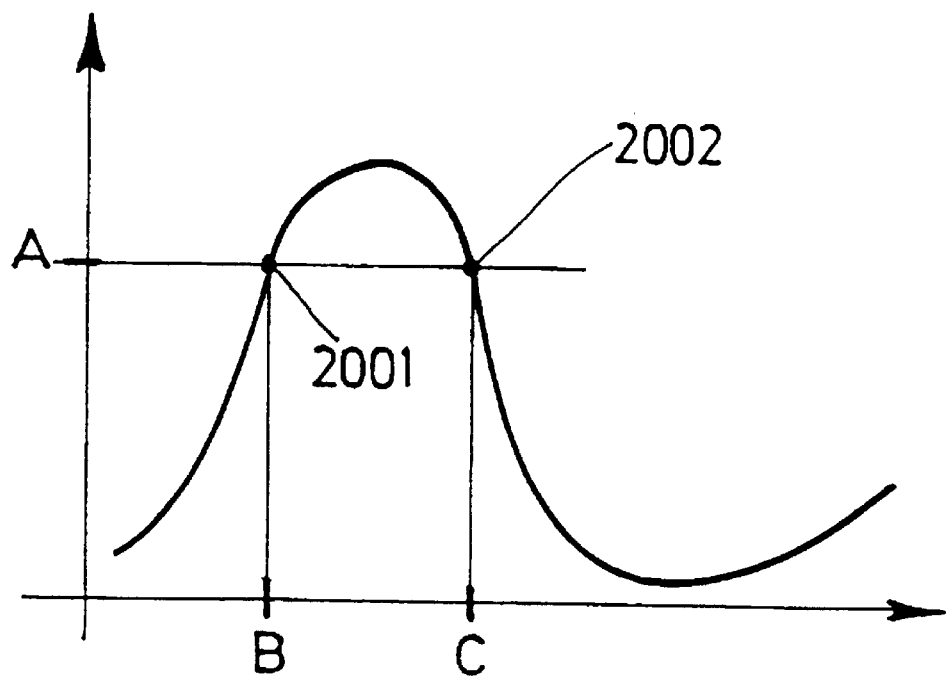
FIG. 11 is a view of the characteristic curve of the diaphragm brought down to the level of the declutching release bearing.

Needless to say, it is also possible, as represented in FIG. 11, to provide a force sensor 2000, integrated into the concentric-type declutching device (24), as represented in FIG. 3, or into any other elastic element varying continually in the control of movement, independently of the clutching or braking effort.

Thus, the position of the clutch-release bearing 23 is picked up outside the hydraulic fluid by the conversion of the force information from the pre-load spring 244 into relative or absolute position information as required.

Thus, the digital or analogue signal delivered by the force sensor 2000 is processed by a computer, outside or inside the said sensor, in order to determine the relative or absolute position of the clutch-release bearing 23.

Thus, this force sensor 2000, associated with the pre-load spring independent of the clutching or braking force, makes it possible, as represented in FIG. 11, to distinguish the two positions B and C which the clutch-release bearing 23 may take up.

It is seen in FIG. 11 that this force sensor 2000 makes it possible easily to distinguish the two points B and C which represent the same clutching or braking force represented by point A of FIG. 11 in which the clutch or braking forces have been represented on the Y axis and the movements on the X axis.

This characteristic curve is due here to the well known characteristic curve of a diaphragm.

Advantageously, the position sensor 2000 is placed directly under the pre-load spring 244, that is to say between the rear extremity of the pre-load spring 244 and the outer body 242.

Figure 10:
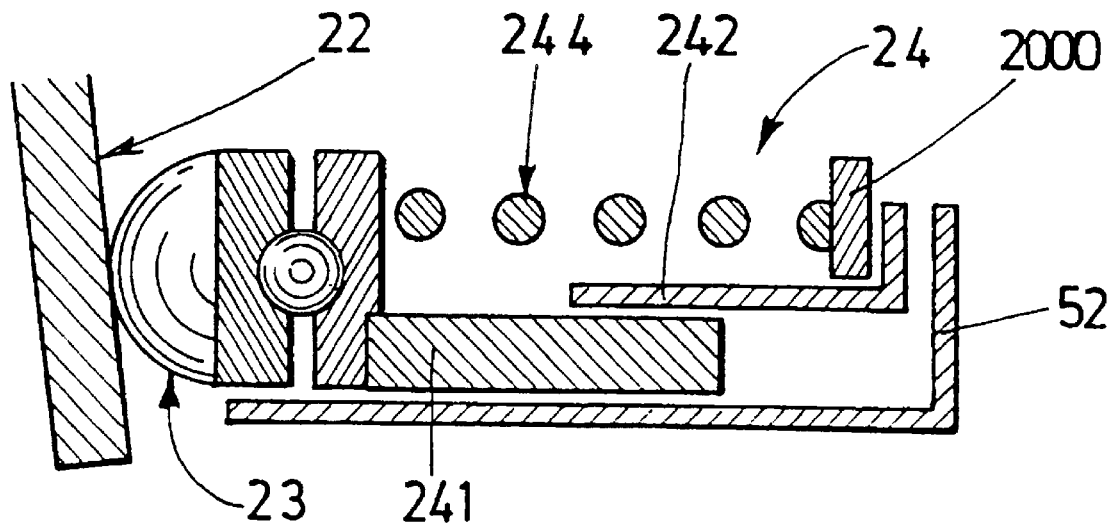
FIG. 10 is a diagrammatic half-view of the concentric-type declutching device equipped with a force sensor.

Advantageously, an intermediate shim, not represented in FIG. 10, will be placed between the force sensor 2000 and the pre-load spring 244.

This shim may consist of the protection bellows 246 which are thus immobilised.

Needless to say, the present invention is not limited to the embodiment examples described; in particular, the support 21 may be in a single piece with the first guide washer 29.

A single guide washer may be provided as disclosed in the document FR-A2390617. In all cases, the hub 14 penetrates to a major extent into the recess 39 and extends asymmetrically with respect to the support 21 of the linings 16. The torsion damper 20a thus extends to a major extent within the recess 39.

In a general way, the support 21 is coupled elastically to the hub 15 by a torsion damper 20a penetrating into the central recess 39 of the flywheel 13 and thus of the reaction plate 4 for reducing the axial bulk of the subassembly 1. Thus, the elastic elements 4 may consist of spiral springs acting between the support and the hub. The elastic elements may consist of blades or else blocks of elastomer material interposed in this case between the hub and a collar integral with the support 21.

Needless to say, the structures can be reversed. Hence, in FIG. 12, the pedestal 431 can be replaced by a flange 431a featuring, at its outer periphery, the sleeve 46 and the shoulder 48. This flange is traversed by the screws 345 as in FIG. 6. The piece 134 is, in this case, close to the reaction plate 4. The direction of the carrier piece 134 has therefore been reversed.

Here, the shaft 430a is frustoconical and the flange 431a centrally features a hub 431b with an internal bore of frustoconical shape for mounting, in a complementary fashion, on the frustoconical outer periphery of the shaft 430a. A nut 431c, mounted on the extremity of the shaft 430a, makes it possible to lock the complementary cones.

The flange 431a is thus linked in rotation to the shaft 430a.

Figure 12:
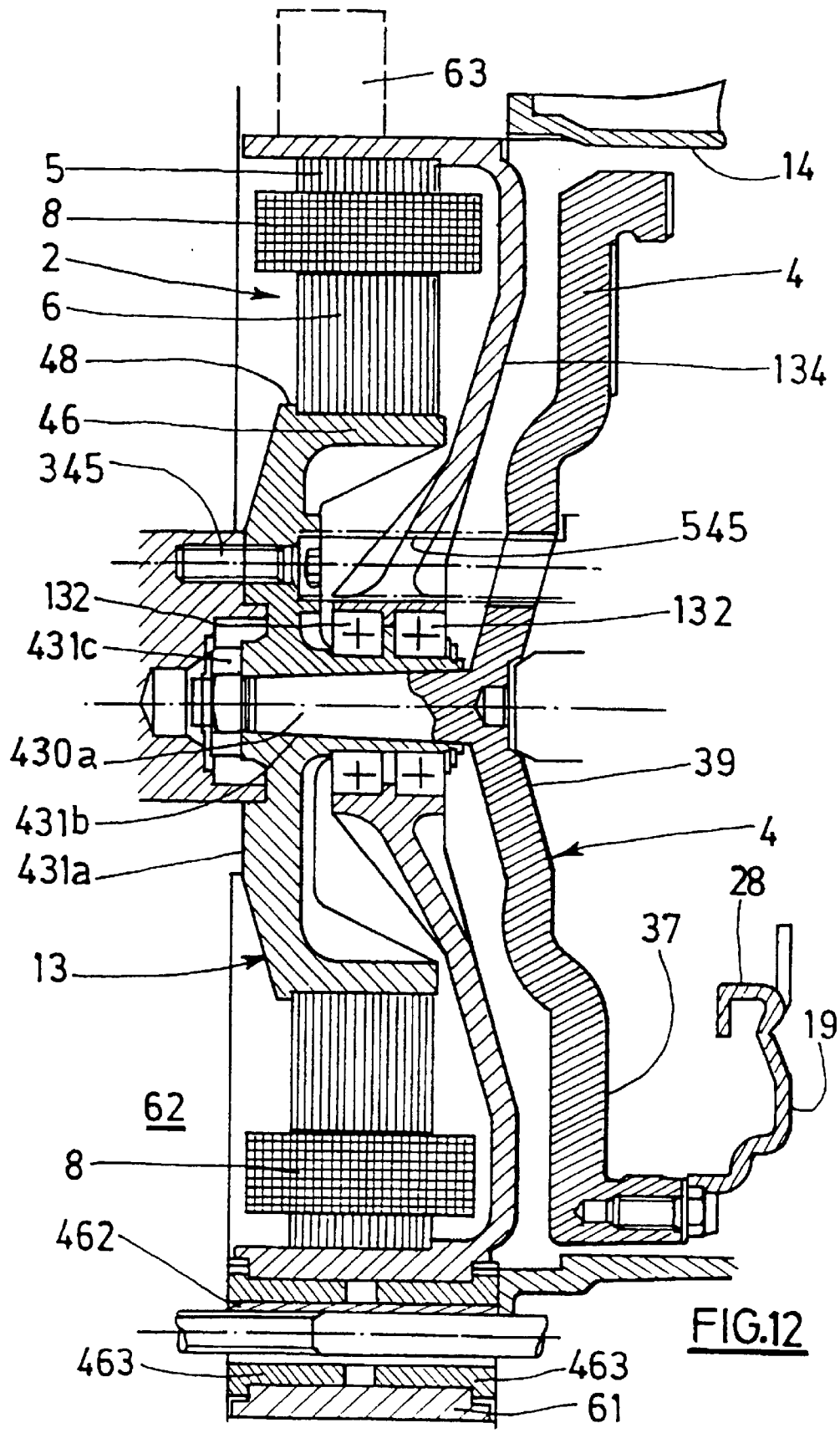
FIG. 12 is a view similar to FIG. 6 in another embodiment example.

It can be seen, in the light of this description, that the piece 134 of FIG. 12 can be replaced by a web originating from the sleeve 431b, for example, by moulding.

The sleeve 46 may be separate from the flange 431a and be secured to the engine casing 62, the bearing means 132 being dispensed with, obviously, as well as the spacer 61.

Hence the web would carry the rotor while the sleeve 48 would carry the stator in such a way that the rotor would surround the stator.

Hence, the rotor can extend radially beyond the friction linings 16 without increasing the radial bulk.

Needless to say, the carrier piece 134 of the stator and the bearing means 132 can be retained, the said carrier piece then being adjacent to the internal-combustion engine, the rotor being carried, raised up, by the web. This web is then installed axially between the reaction plate 4 and the carrier piece. It advantageously has a sinuous shape and features, at its outer periphery, a shouldered sleeve 46. Advantageously, the web is ribbed.

The same thinking can apply in FIGS. 2 and 3, the carrier piece being replaced by a web while the sleeve 46 would be fixed onto the engine casing 62, the spacer 61 being dispensed with.

The rotor can thus be carried by a web integral with the engine flywheel in order to surround the stator. The said web being [sic] C-shaped overall like that of FIGS. 2 and 3.

In these FIGS. 2 and 3, the carrier piece 134 is deformed locally by stamping in order to create a clearing for the chignons 8.

Thus, clearance means are provided for the chignons and consist either of a reduction in the thickness of the reaction plate 4 or in deformations of the carrier piece 134.

In a variant, a groove can be created in the reaction plate in order to form a clearance for the chignons 8.

Likewise, cooling means are provided in order to cool the machine. The cooling means can be carried by the stator 5 FIGS. 7 and 8, or by the flywheel by means of fins 1200, 1201 of FIG. 5 or of fins integral with the rotor as described below.

In a variant, the support piece or the web forms a thermal screen.

It will be noted that the arrangements of FIGS. 2,3 and 12 are advantageous, since the flow of the heat by conduction from the reaction plate 4 to the sleeve 46 follows a long path which is advantageous for the electric machine 2.

Likewise, the flow path of the heat by conduction between the reaction plate 4 and the stator 5 is very long, having regard to the configuration of the carrier piece (FIGS. 4, 5, 6 and 12).

The through-holes 545 further enhance the cooling.

Needless to say, a heat-carrying fluid may advantageously pass through the spacers 61 of FIGS. 1 to 6, 9 and 12 in order to cool the stator 5 surrounding the rotor 6.

Equally, this same fluid may also pass through the pack of metal plates 10 of the stator 5 as represented in FIGS. 7 and 8.

Figure 13:
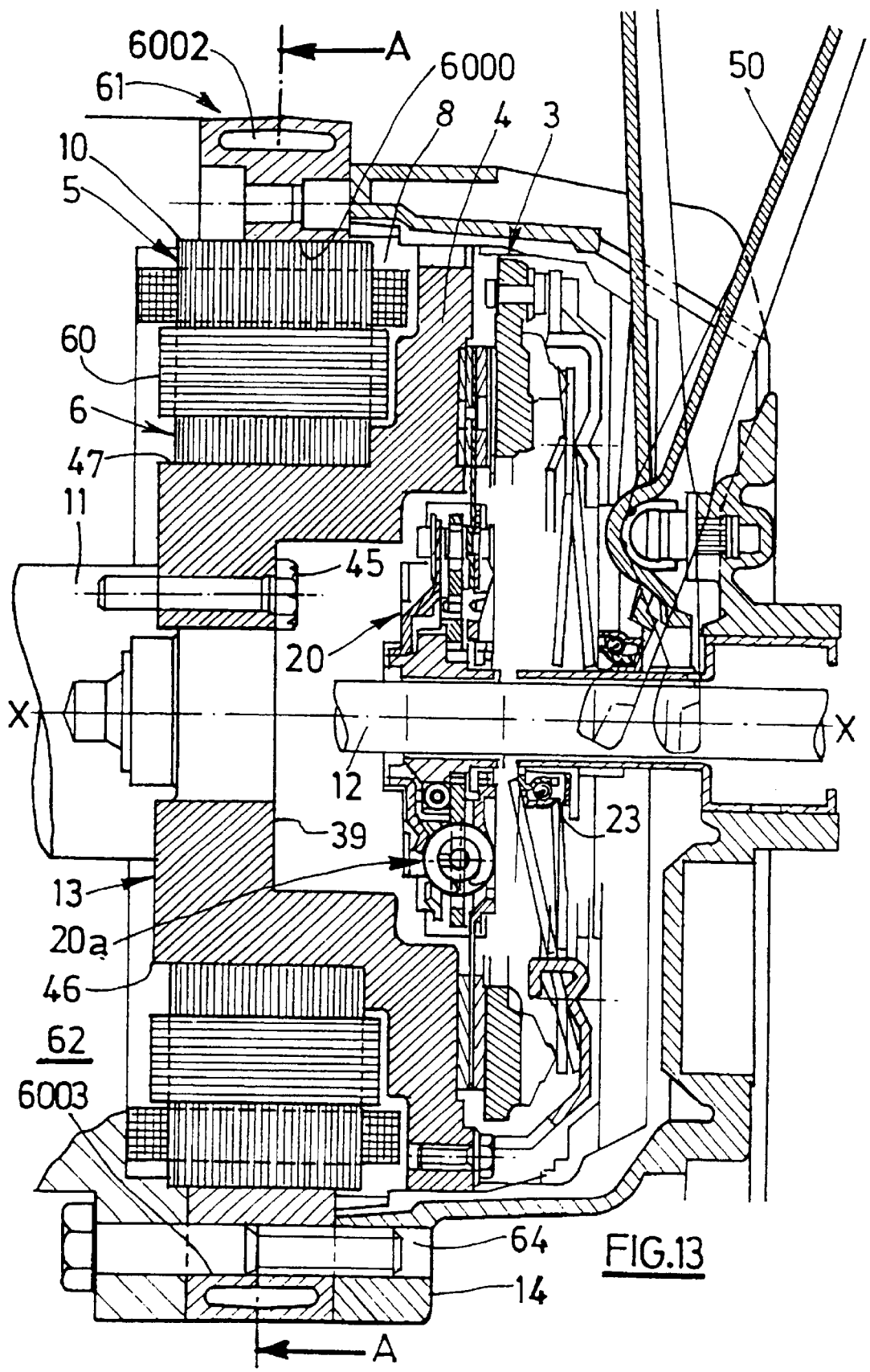
FIG. 13 is a sectional view similar to FIG. 1, along the line C—C of FIG. 14 for yet another embodiment example.

Hence, in the embodiment of FIGS. 13 to 15, the spacer 61 has an annular shape and is made of mouldable material, here based on aluminium. This spacer 61 features a cylindrical inner periphery 6000 onto which the pack of metal plates 10 is hooped, as in FIG. 1. In FIG. 14 is seen one of the metal plates, of annular shape, of this pack 10, featuring recesses at its outer periphery for weld beads 6001 to pass through, making it possible to perfect the integration of the pack of metal plates to the spacer 61 surrounding the drive flywheel 13, except for the reaction plate 4 thereof.

In practice, FIG. 13 differs from FIG. 1 only in the spacer 61, such that the same reference signs will be repeated.

Each annular metal plate of the stator 5 features notches, at its inner periphery, dedicated to the winding of the stator.

The spacer 61 features two opposing faces, in its thickness, defining a cooling chamber 6002 receiving a heat-carrying fluid, here a cooling liquid. This liquid makes it possible rapidly to remove the heat produced by the operation of the electric machine. In this cooling method, the stator transfers its heat to the inner periphery 6000 of the spacer 61 by contact. Next, this heat is transmitted by forced convection, from the inner periphery 6000 to the cooling liquid, in motion, here in the cooling-water circuit of the combustion engine of the vehicle.

The cooling chamber 6002 is of oblong shape axially, in order to cool the spacer and the stator to the maximum and, circumferentially has the shape of a tortuous channel making it possible to remove the heat well and to get round the passage for the holes 6003 which are intended for the elements 64 (here screws) for fixing the spacer 61 to the engine block 62 and to the clutch bell housing 14 between which the spacer 61 is interposed.

The clutch bell housing surrounds the clutch 3.

In a variant, the chamber 6002 circumferentially has the shape of a cylindrical channel.

The outer periphery 6004 of the spacer has an overall undulating shape with protuberances or bulges 6005, 6006, 6007 and 6010 produced by moulding.

These protuberances make it possible to reduce the weight of the spacer.

The bulges 6005, of semi circular shapes, are each provided with a through-hole 6003 for the fixing elements 64. It will be noted that the holes 6003 may be arranged on either side of the chamber 6002 as can be seen in FIG. 14.

The boss-shaped bulge 6006 carries the inlet and outlet ducts 6008 of the chamber 6002 of the circuit for cooling the alternator/starter.

These ducts 6008 are connected to the cooling circuit of the internal-combustion engine of the vehicle.

These abovementioned connecting means may rely on hoses and/or rapid leaktight unions as described, for example, in the document FR 2756608, such that the chamber 6002 can be pre-filled.

Each duct 6008 is associated with a widened, respectively inlet and outlet, orifice 6009 formed in the bulge 6006.

In a variant, the inlet and outlet ducts 6008 can be dispensed with, and the orifices 6009 can be connected directly to second orifices opposite, formed on the engine block 62 with sealing means such as O-rings acting between the engine block 62 and the spacer 61.

These second orifices communicate with the cooling circuit of the engine.

In all cases, the chamber 6002 extends the cooling circuit of the engine of the vehicle.

Needless to say, angular-indexing means are provided between the spacer and at least the engine block 62. Hence, a bulge can be seen at 6010, with, on either side of the chamber 6002, a hole 6003 for a fixing element 64 to pass through, and a hole 6011 for an indexing rod to pass through, the rod being carried, for example, by the block 62 and penetrating into the spacer.

The chamber 6002 is obtained by moulding using a substance which is removed after moulding such as sand. Hence, means can be seen at 6012 for removing the sand during the mould-removal operation.

These means include at least one through-hole to the outer periphery of the spacer 12, this hole being closed off finally by a leaktight plug.

Needless to say, a linking channel 6013 exists between the 2 orifices 6009 in order to allow for the moulding operation.

The bulge 6007 is provided at the lower part and internally features a piercing 6014, here threaded, opening out into the chamber 6012.

This piercing 6014 allows for a screw 6015 to be screwed in, with a sealing gasket 6016, here an O-ring, interposed between the head of the screw 6015 and the crest of the bulge 6007.

As will have been understood, by unscrewing the screw 6015, it is possible to empty the chamber 6002 of its cooling liquid.

Advantageously, the piercing 6014 is situated in the lowest part of the chamber 6002.

Needless to say, the positioning of the piercing 6014, in the lower position of the chamber 6002 also makes it possible to empty the cooling circuit of the internal-combustion engine of the vehicle as well as the cooling circuit of the main radiator of the vehicle.

This possibility for emptying the complete cooling circuit of the vehicle is made possible by the fact that the chamber 6002 for cooling the alternator/starter passes through at least one point placed at the lowest point of the cooling circuit of the vehicle.

It is thus possible to save on at least the emptying plug of the cooling circuit provided on the internal-combustion engine.

Needless to say, it is also possible to save on the emptying plug of the main cooling radiator of the vehicle.

In all cases, the piercing 6014 should be placed at least lower than the lowest position of the cooling circuit of the internal-combustion engine comprising the main cooling radiator.

Needless to say, the screw 6015 can be replaced by any other removable closure element, such as a threaded plug, for example, of the type generally provided for emptying the oil circuit of the vehicle.

The piercing 6014 may therefore be partly threaded.

The spacer 61 is therefore provided with means for emptying its chamber.

In a variant, the spacer 61, equipped with its cooling chamber 6002 and internally carrying the stator 5, may be a single piece with the engine block 62 or with the clutch bell housing 14.

Needless to say, all the arrangements for cooling the electric machine 2 are independent of the fact that the torsion damper 20a does or does not penetrate into the central recess of the reaction plate 4.

In a general way, many characteristics described in the present application are independent of the fact that the torsion damper 20a does or does not penetrate into the central recess of the reaction plate 4. The same goes, for example, for the presence of the carrier piece 134, of the bearing means 132, of the various sensors, of the means of clearance for the chignons, of the balancing means or of the machine type of the electric machine, etc.

Needless to say, in a variant, the torsion damper 20a may penetrate entirely into the central recess 39 in order further to reduce the axial bulk of the assembly 1.

Figure 16:
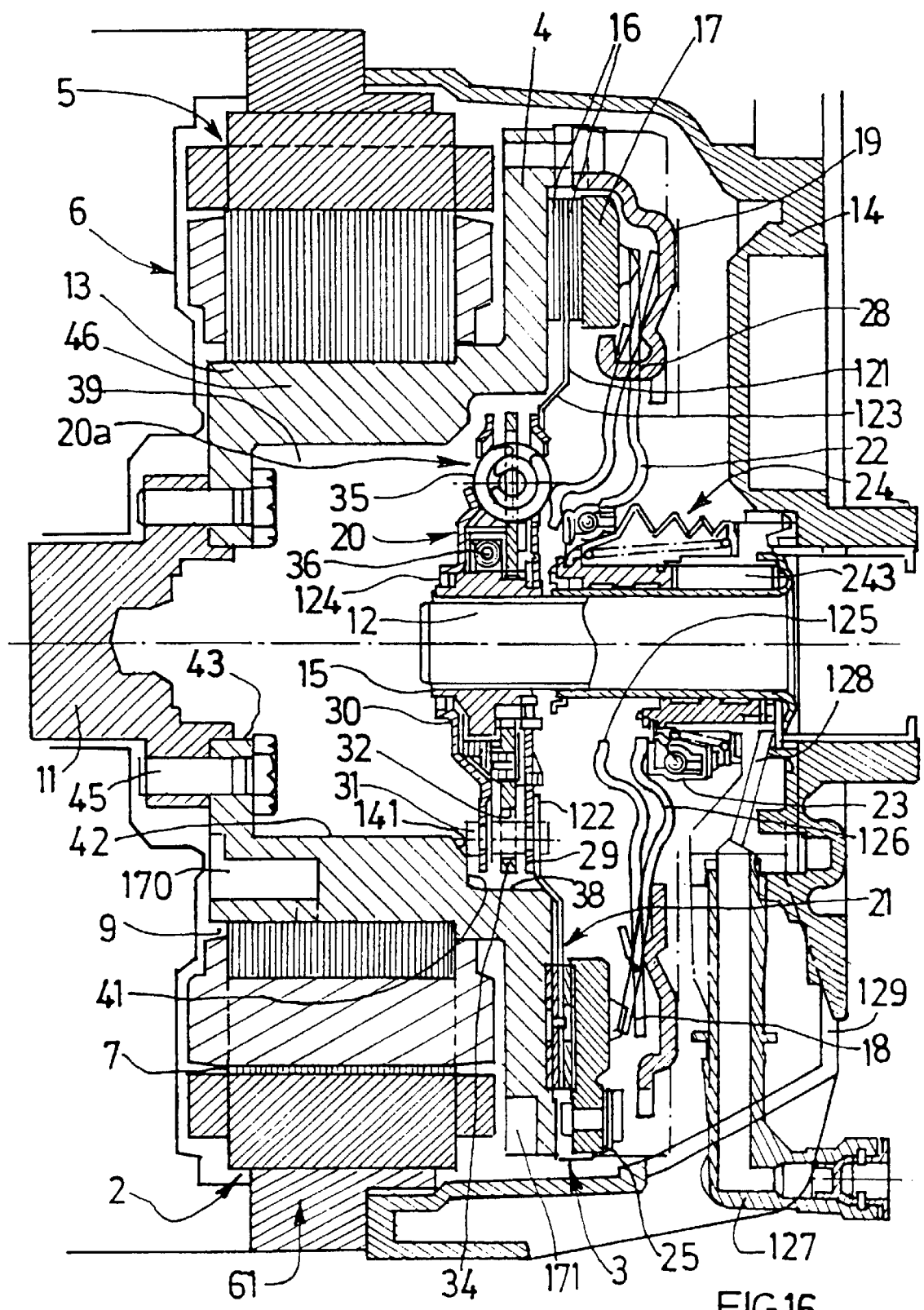
FIGS. 16 and 17 are views similar to FIG. 1 for two more embodiment examples.

Thus, in the embodiment of FIG. 16, an axial offset exists between the outer 121 and inner 122 peripheries of the support 21. More precisely, the inner periphery 122 of the support 21 is offset axially with respect to the outer periphery 121 of the support 21 in a direction opposite to the friction face 37, that is to say towards the fixing screws 45. To that end, a bend 123 links together the peripheries 121, 122. The inner periphery 122 is fixed by the use of distance rods 31 onto the first guide washer 29, which thus penetrates into the central recess 39 in order to reduce the axial bulk between the friction face 37 and the back of the casing 14. The guide washers 29, 30 therefore penetrate within the first portion of axial orientation 38, while a shoulder 141 links the transverse shoulder 41 to the second annular portion of axial orientation 42 of the recess 39. The chamfer 141 is a clearance chamfer which avoids interference between the distance rods 31 and the shoulder 41, which makes it possible to reduce the axial bulk without profoundly altering the flywheel 13. The torsion damper 20a is identical to that of FIG. 1 and is of the type described in the document WO-96/14521 (FIG. 8). It thus features a bearing 124 featuring notches for accommodating springs 36 of low stiffness also mounted in notches produced in the hub 15 splined internally for rotational linking with the driven shaft 12. The springs 36 belong to a pre-damper installed between the second guide washer 30 and the web 34 featuring, at its inner periphery, a female toothing for meshing, with circumferential clearance, with a male toothing present on the hub 15 at its outer periphery. Friction washers and washers with axial elasticity act between the first guide washer 29 and the web 34. The pieces 30, 34, 29 are equipped with windows for mounting elastic elements 35 of higher stiffness than the springs 36. The elastic elements 35 thus belong to the main damper. For further details, refer to the abovementioned document, knowing that the bearing 124, here of frustoconical shape, as in FIG. 1, penetrates more deeply within the recess 39 and that this bearing 24 is linked in rotation, here by the use of pins, to the web 34. Here the fingers 22 of the diaphragm 18, 22 feature, at their inner periphery, a portion 125 offset axially with respect to the Belleville washer 18 of the diaphragm 18, 24 in such a way that it is possible to reduce the axial bulk, the declutching release bearing 23 penetrating under the main part of the fingers of the diaphragm, given that the portion 125 is connected to the main part of the fingers 22 by a S-shaped segment 126. The release bearing 23 therefore extends under the portion 126, given that the main part of the fingers 22 extends in the same plane as the Belleville washer 18. The creation of the portion 125 is achieved by virtue of the fact that the damper 20a penetrates more deeply into the central recess, the portion 125 being more offset axially in the direction of the damper 20a without interfering with it when the clutch is disengaged as can be seen in the upper part of FIG. 16. Thus the axial bulk of the assembly 1 is further reduced by here having a declutching device 24 of the hydraulic type as in FIG. 3. In this FIG. 16 can be seen, at 127, a rigid supply duct for connecting the supply inlet 128 of the cavity 243 to a sender driving the declutching device 24 of the concentric type since it is traversed by the driven shaft 12. The duct is L-shaped and is in two parts, extending on either side of a passage 129 formed in the clutch bell housing 14. More precisely, the duct 127 comprises an internal part extending transversely within the bell housing 14 so as to come into engagement with the head of the internal-channel supply inlet 128 for linking with the cavity 243 and an external part extending outside the bell housing 14, perpendicularly to the internal part. For further details, refer to the document FR 2,753,772 filed on Sep. 26, 1996. The external, axially oriented part features a union for connecting it to a hose originating from the sender, not visible. By virtue of the rigid duct 127, it is also possible to reduce the axial bulk due to the fact that it is easier to mount the rigid duct 127 onto the supply inlet 128 in advance while subsequently having no risk of interference between the rigid duct 127 and the cover 19 which can thus be very close to one another. This arrangement also facilitates rapid connecting of the sender to the declutching device 24 because the connection of the hose, coming from the sender, is made outside the bell housing 14. Needless to say, the duct 127 may equip the declutching device 24 of FIG. 3.

Figure 17:
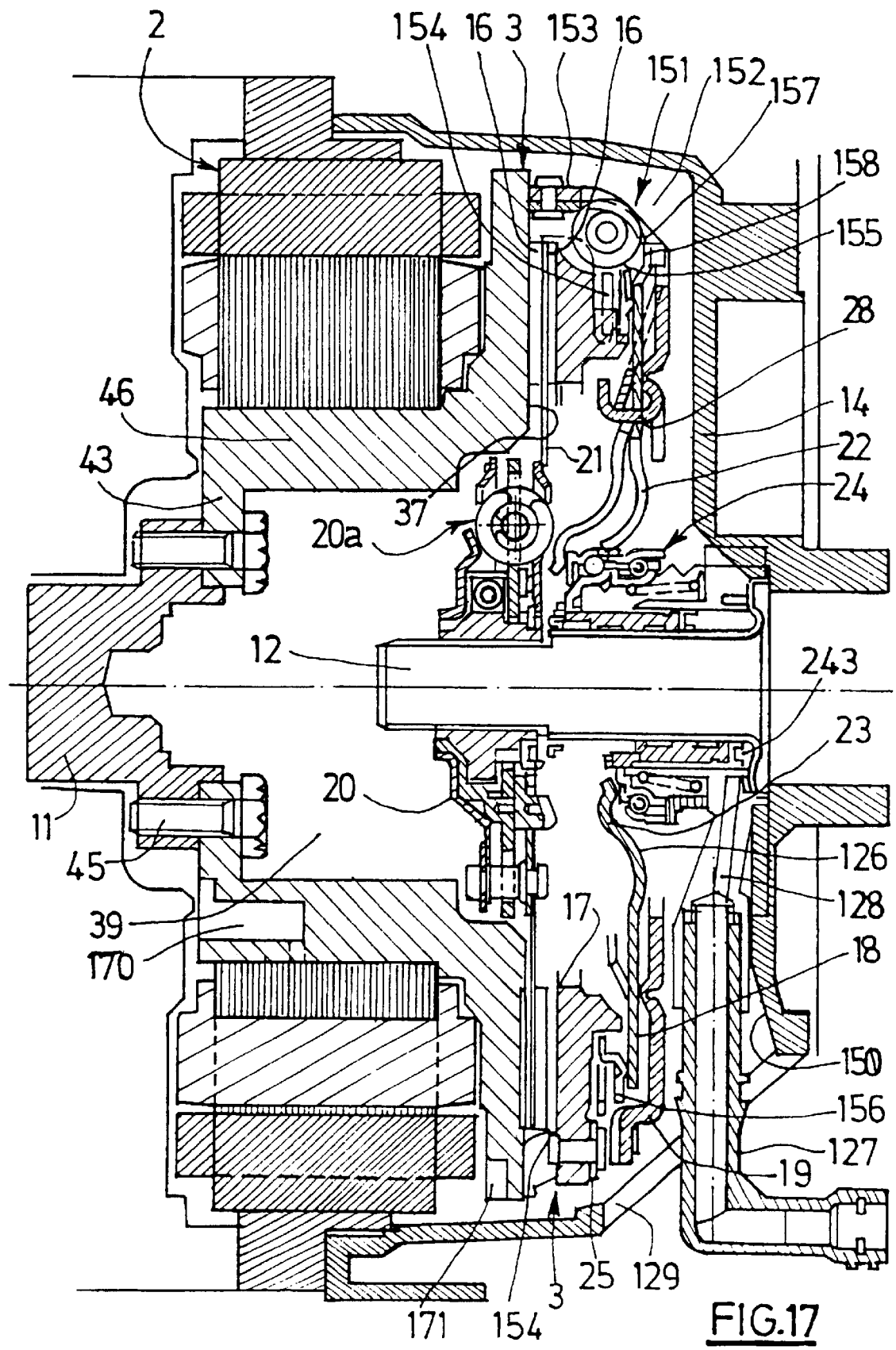

As can be seen in FIG. 17, the back of the bell housing 14 may be shaped in order locally to create a clearing 150 for the internal part of the rigid tube 127 to pass through, such that the axial space required between the back of the cover 19 and the back of the bell housing 14 is further reduced, which also makes it possible to reduce the axial bulk of the assembly 1. In this case, the supply inlet 128 of the cavity 243 features a less inclined channel than that of FIG. 16. The rest of the declutching device is identical to that of FIG. 16 and the same is true for the diaphragm 18, 22. It will be noted, nevertheless, that the S-shaped segment 126 is less accentuated. In this FIG. 17, the clutch 3 is equipped with a device called wear-take-up device 151 for compensating for the wear on the friction linings 16 and, to a lesser extent, the wear on the friction face 37 and the wear on the friction [sic] opposite the pressure plate 17. This wear-take-up device, in a known way, makes it possible to hold the diaphragm 18, 22 in the same position when the clutch 3 is engaged, for the lifetime of the clutch. The travel of the declutching device 24 is therefore constant all through the lifetime of the clutch, which makes it possible to reduce the axial bulk of the clutch 3, and therefore the axial bulk between the friction face 37 and the back of the clutch bell housing 14. In clutch-engaged position, the load exerted by the diaphragm 18, 22 on the friction linings 16 is therefore substantially constant throughout the lifetime of the clutch. Hence, the support 21 may be flat. Here, the wear-take-up device is of the type described in the document FR 2,753, 503 which should be referred to for further details. This wear-take-up device therefore includes a cartridge carried by the cover 19 featuring a worm-screw and ratchet-wheel assembly 152. This assembly 152 is installed thanks to a local deformation 153, U-shaped overall, present on the cover 19 at its outer periphery. The worm screw meshes irreversibly with a toothing carried by an intermediate piece 154 linked in rotation by tabs 155, of the same type as the lugs 25, to an inclined ring 156, the said inclined ring being centred by the pressure plate 17 and featuring a fragmented bead (not referenced) for contact with the outer periphery of the Belleville washer of the diaphragm 18, 24 mounted so as to pivot on the cover 19 by the use of lugs 28 as in FIG. 1. The pressure plate 17 features studs forming counter-inclines for co-operating with the inclines of the inclined ring 156. The intermediate piece 154 is keyed axially in one direction by projections, not visible, integral with the cover. In the other axial direction, the intermediate piece 154 is keyed axially by virtue of the tabs 155. The cartridge features a control tab 157 able to be manoeuvred by an actuator 158 consisting of a radial appendage which the Belleville washer 18 features at its outer periphery. The cartridge also features a take-up spring of the coil-spring type acting on the assembly 152. In the event of wear on the friction linings 16, the take-up spring is tensioned, and the spring, after a certain number of declutching and clutching operations, is made, in relaxing, to shift the worm screw and to turn the intermediate-piece 154/inclined-ring 156 assembly, in order to compensate for the wear on the friction linings. The arming of the wear-take-up spring is achieved by virtue of the control tab 157 manoeuvred by the appendage 158. For further details on the operation refer to the abovementioned document FR 2,753,503, remembering that the inclined ring 156 may, in a variant, be of a single piece with the intermediate piece 154 such that the presence of the tabs 155 is not mandatory.

Figure 19:
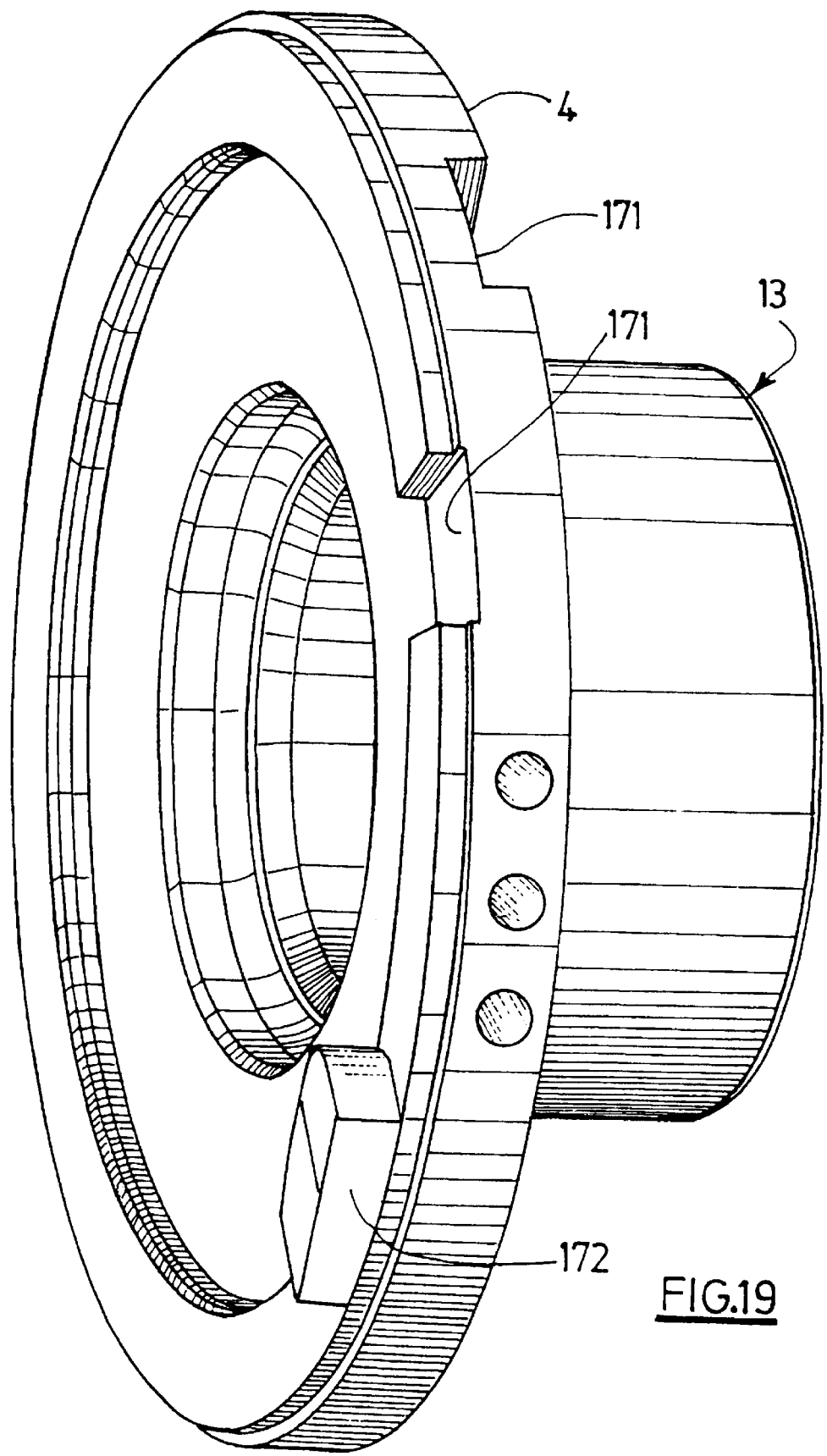
FIG. 19 is a view in perspective of the flywheel only of FIG. 18.
Figure 20:
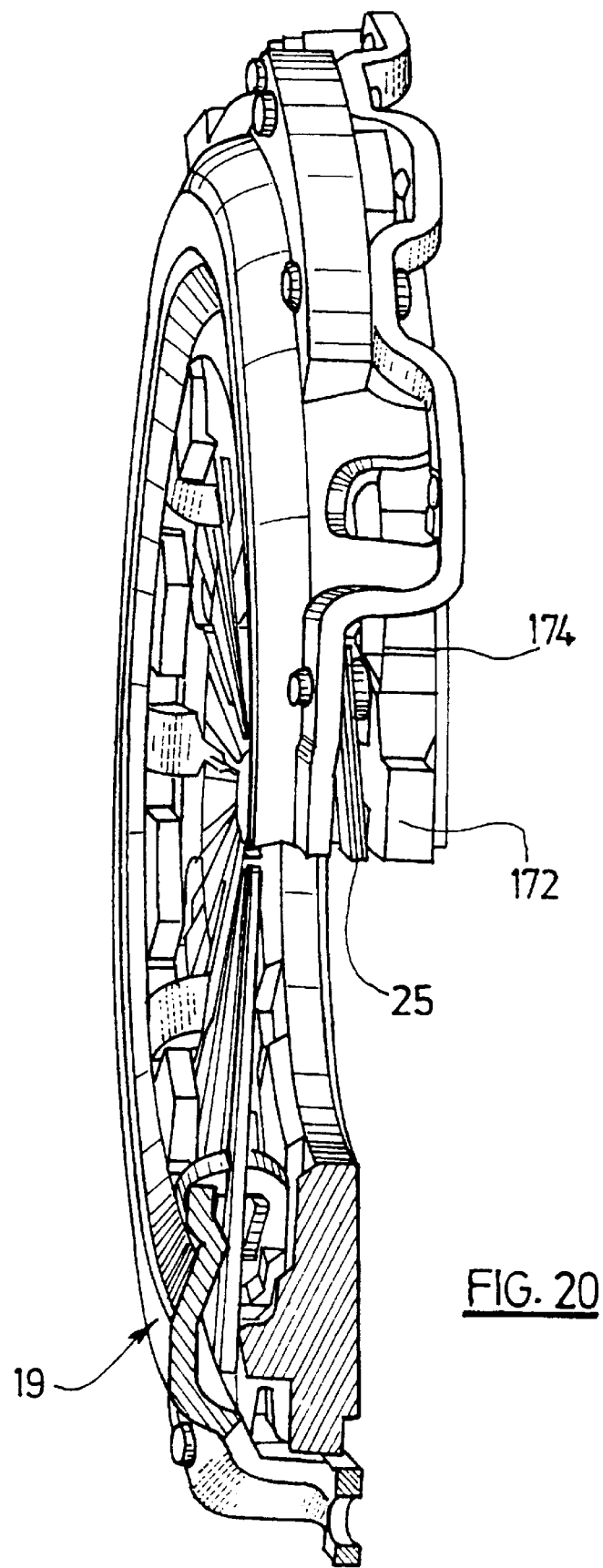
FIG. 20 is a view in perspective, with local cutaway, showing the clutch mechanism of FIG. 17.
Figure 25:
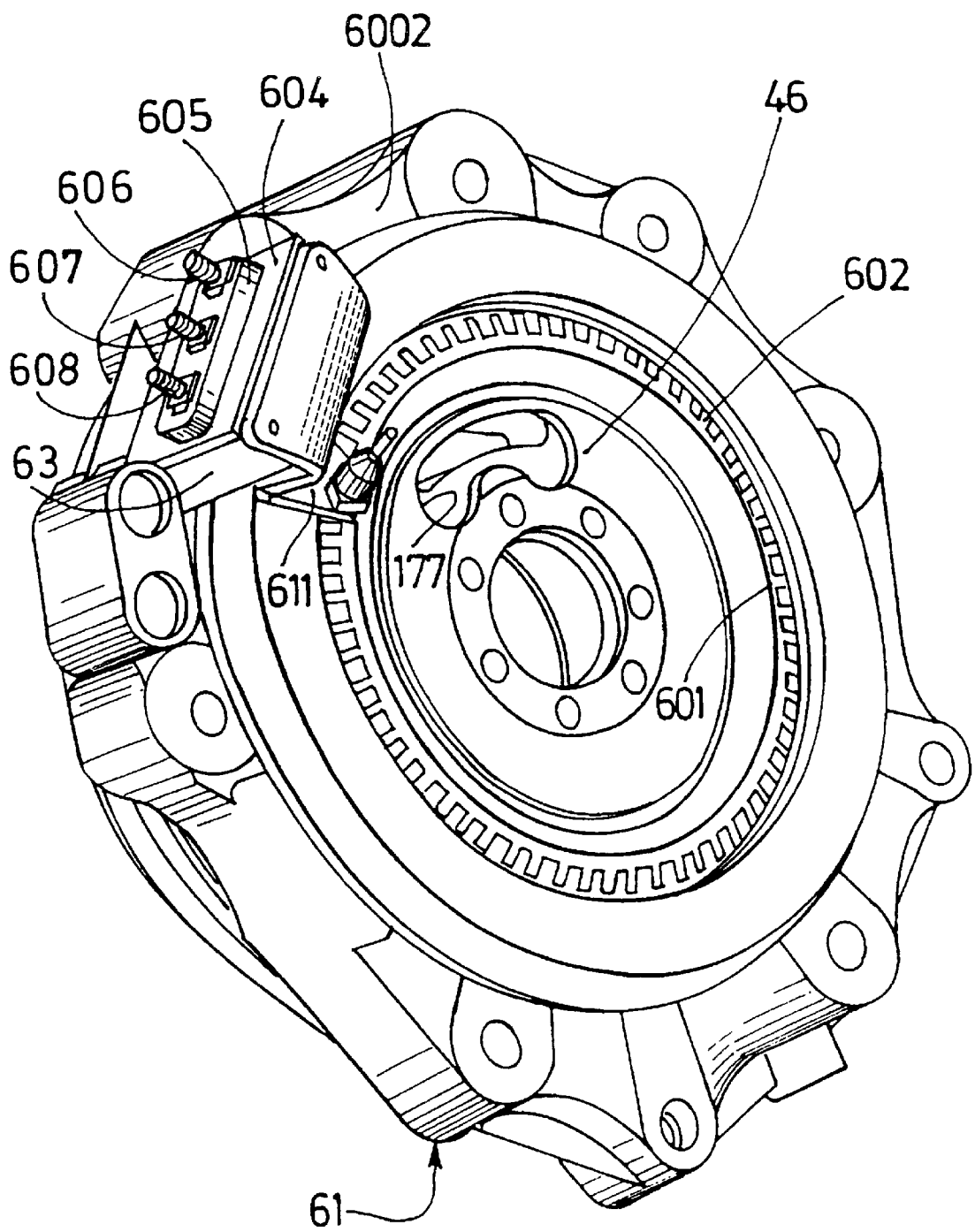
FIG. 25 is a view in perspective of the flywheel of FIG. 24 equipped with its spacer.
Figure 26:
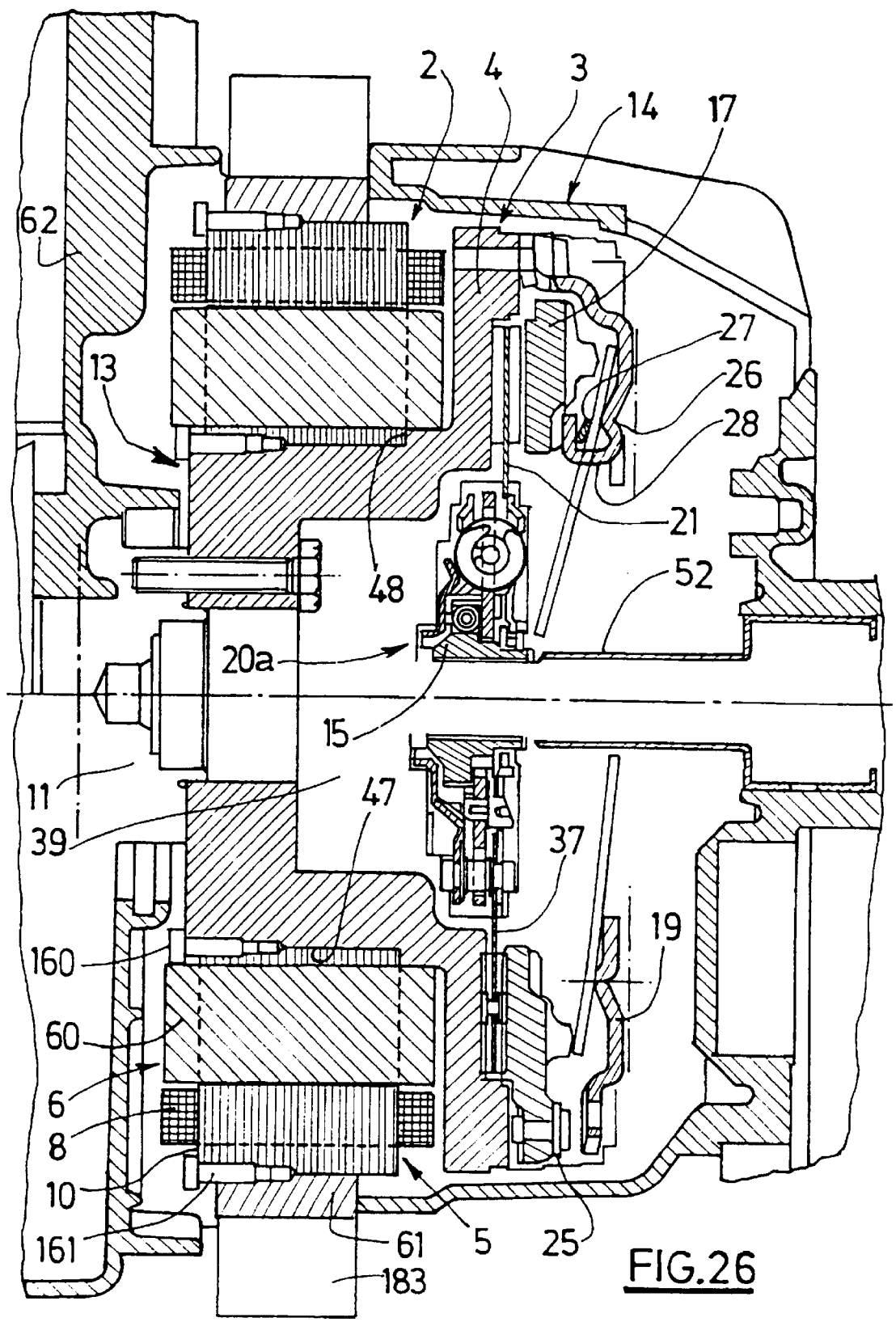
FIG. 26 is a view similar to FIG. 1 with fixing screws into the thickness behind the outer surface for fixing of the stator and of the rotor.

In FIGS. 16 to 18, blind holes are seen at 170, produced in the sleeve 46, at 171, notches open radially outwards produced in the reaction plate 4 and, at 172, additions of material formed in the reaction plate 4 in order, as mentioned above, to correct for the out-of-balance of the heat engine, especially for a vehicle with a three-cylinder engine. It will be noted that the notches 171 may be formed on the two faces of the reaction plate as can be seen better in FIG. 19. The notches 171 are preferably formed at the outer periphery of the reaction plate in order to be as effective as possible. The material 172 is added in projection on the face of the reaction plate 4, the said face being turned towards the cover 19. In FIG. 18, the horizontal x, vertical y and longitudinal z axes have been marked in order better to show the orientation of the figure. The addition of material 172 is preferably carried out in the region of the tangential lugs 25 linking the lugs 173 of the pressure plate 17 to the cover 19. These lugs 25, distributed into several sets of tabs, here superimposed, have one of their extremities fixed, here by riveting, to a lug 173 of the pressure plate and have their other extremity fixed by riveting to a region 174 belonging to the radial rim 175 which the cover 19 features at its outer periphery, here in the overall shape of a hollow dish. The regions 174 are offset axially with respect to fixing regions 176 which the rim 175 features for fixing the cover 19 to the reaction plate 4 here, in a known way, by the use of screws, not visible. Hence, the additional material 172 features an inclined face, parallel overall to the lugs 25 and extends circumferentially between a lug 173 and a region 174 as can be seen better in FIGS. 17 and 19. Thus, the additional material 172 may be a maximum without increasing the axial bulk of the assembly 1. The addition of material 172 is masked by the regions 174 and carried out at the outer periphery of the reaction plate 4 which is very effective. It is thus possible to use every possible combination so that the machine and the heat engine rotate under good conditions. As will have been understood, the out-of-balance in the region of the flywheel 13 makes it possible to balance the rotation of the heat engine. By virtue of the holes 170, the notches 171 and the additions of material 172, the out-of-balance of the crankshaft of the heat engine is counteracted. Needless to say, all possible combinations can be used. It is thus possible to balance the flywheel 13 by the use of holes 170, notches 171, then, the out-of-balance of the crankshaft of the engine can be counteracted by the use of additions of material 172 or, in a variant, as can be seen in FIGS. 25 and 26, by forming apertures 177 for example in the sleeve 46 of the flywheel 13. These apertures 177 may be kidney shaped in order to remove the maximum amount of material. It is therefore possible, at will, to carry out functions of balancing of the assembly 13 as well as a function to counteract the out-of-balance of the crankshaft of the engine. Needless to say, it is also possible to remove material from the pressure plate.

Needless to say, the spacer 61 of FIG. 1 may be of a single piece with the stator 5 which makes it possible to avoid hooping of the metal plates 10 of the stator 5 in the spacer 61 conventionally of aluminium for weight reduction. It is not therefore necessary to provide means to prevent rotation of the metal plates 10 with respect to the spacer 61, especially when the metal plates 10 are fixed by hooping onto the spacer 61. Moreover, the process of machining of the through-holes for the fixing screws 64 and for the centring holes is simplified by virtue of the fact that the spacer is of a single piece with the pack of metal plate [sic] 10.

Equally, the piercings of FIGS. 7 and 8 are easier to produce since there is more material, such that the mechanical behaviour of the stator is better.

Hence, in FIG. 21, the stator 5 consists of a pack of magnetic metal plates consisting respectively of a first series of standard metal plates 180 and of a second series of spacer metal plates 181 of different outer diameter. These metal plates, here magnetic, have the same configuration at their inner periphery and therefore exhibits [sic] notches 182 dedicated to accommodating the stator winding. The notches 182 of each of the metal plates are aligned in such a way as to constitute axial grooves for accommodating the winding of the stator. The first series of metal plates is of cylindrical shape at its outer periphery. The second series of metal plates 181, acting as a spacer, extends radially projecting above the outer periphery of the first series of metal plates in order to form cooling fins 183 some of which are holed at 184 for fixing screws to pass through, represented at 64 in FIG. 1, making it possible to fix the clutch bell housing 14 onto the engine block 62. Two diametrically opposite holes 185 are formed in some of the fins in order for centring pins carried by the engine block 62 to pass through. These centring holes 185 also make it possible, on mounting, to index the spacer metal plates of the second series 181 with respect to one another. Holes can be seen at 186 allowing mounting of the connector or terminal board referenced at 63 in FIG. 1. Such a connector 63 can be seen better in FIG. 25. The fins 183 are segmented into several annular sectors separated from one another by grooves 187 the bottom of which will accommodate the weld beads 188. An isolated lug can be seen at 189, provided with an aperture 184. The said lug 189 is due to the configuration of the engine block and makes it possible to reach a remote fixing point. In a general way, the shape of the second series of metal plates 181 depends on the applications, and especially on the shape of the engine block and of the clutch bell housing. The second series of metal plates 181 does not necessarily include fins, especially when the fluid-circulation piercing [sic] of FIGS. 6 and 7 are produced in it. In one embodiment, the first series of metal plates 180 extends axially on either side of the second series of metal plates 181 symmetrically or not symmetrically depending on the applications. In a variant, the first series of metal plates 180 extends on a single side of the second series of metal plates 181 depending on the application. In all cases, the metal plates of the first series 181 have a standard shape and communicate with the grooves 187. Hence, by the use of weld beads 188, it is possible to link together the first and second series of metal plates. The weld bead 188 extending [sic] over the entire total axial length of the series of metal plates. In a variant, the weld beads 188 are replaced by a shape-interlocking link such as a buttoning. In a variant, the standard metal plates may be of different diameter on either side of the second series of metal plates 181 in such a way that two series of standard metal plates are provided. As will be understood, the welding operation is easy to carry out by virtue of the notches 182. It suffices, on assembly, to pile the metal plates on a centring device equipped with at least one longitudinal axial strip onto which is threaded a notch of each of the metal plates. Hence, by virtue of this arrangement, welding with the use of the beads 188 is easy to carry out since the metal plates have identical notches 182 and are indexed in angle with respect to one another. The number of beads 188 depends on the applications, this number possibly being less than or equal to the number of grooves 187. By virtue of the second series of metal plates 181, forming fins 183, better heat removal is obtained by comparison with a spacer equipped with fins and separate from the metal plates of the stator 5, since the thermal conduction is better because of the absence of stator-spacer separation, which separation creates a thermal resistance. Moreover, as the spacer consists of metal plates 181, here ferromagnetic, there is an increase in the average value of the thickness of the magnetic stator yoke. Furthermore, a saving in mass is obtained since, although the magnetic metal plates have a density greater than that of aluminium, the volume of the one-piece stator/spacer assembly is less than that of a stator separate from the spacer since the fins can come as close as possible to the metal plates of the stator because of the fact that the bearing surface for hooping the metal plates of the stator has been dispensed with. There is, moreover, the possibility of cooling the stator as well as its chignons and of lowering the temperature within the electric machine by blown fresh air and/or absorbed hot air.

Needless to say, fins and a circulation of cooling fluid can be provided, as in FIGS. 7 and 8.

With this one-piece device, the problems of machining are simplified and reduced and the manufacturing tolerances are reduced. It is also possible to vary the depth of the notches 182 without impairing the performance of the electric machine. This confers the advantage of facilitating automatic winding while reducing the height of the chignons. The thickness of the spacer can be altered.

As can be seen in FIGS. 22 and 23, recesses 191 with a contour 192 make it possible to match the contours 192 of the ribs of the cylinder casing as well as of the oil sump of the engine block referenced at 62 in FIGS. 1, 12 and 13 and in the lower part of FIG. 22. The projections 194 of the engine block 62 penetrate into the recesses, the shape of which depends on applications. This geometry makes it possible to limit the axial bulk of the electric machine 2 and, at the very least, to stay within the same axial bulk as an electric machine mounted cantilevered as represented, for example, in FIG. 1 or in FIG. 16, in such a way that it is possible to increase the size of the electric machine and/or of the clutch.

These recesses 191 are produced in a radial carrying flange 193 which replaces the carrier piece 134 of FIG. 6. To do this, this flange 193 features a skirt 190 for the bearing means and is of a piece with the spacer 61 which internally carries the stator 5. This spacer 61 could be water-cooled (as represented, for example, in FIG. 13) or air-cooled. Here, the spacer features fins 183 with holes 184 to 186 as in FIG. 21, but the fins here are of a single piece with the flange 193, in a tortuous shape, with a semi-toroidal portion 195 in order to create a housing for the rotor 6, the stator 5 and the sleeve 46. The fins 183 are connected to the outer periphery of this portion 195 the inner periphery of which is connected to a ribbed web 196 carrying the bush 432 and featuring the piercings 545.

This radial flange 193, at its centre, carries the bearing means 132 centred axially on the X—X axis of the electric machine 2 and of the same type as that of FIG. 6. These bearing means 132 include at least one ball bearing 132 and can be mounted on the flange in two different ways.

According to a first embodiment, the outer ring of this bearing 132 is simply fitted, not clamped, into the bush 432 so as to take up the tolerance gaps, while the inner ring is mounted clamped, for example by hooping, onto the shaft 430 with a splined front end so as to come into engagement with internal splines of the fixing pedestal 431 fixed by the screws 345 to the crankshaft of the engine.

In a second embodiment, the two outer and inner rings of the bearing 132 are mounted clamped, for example by hooping, respectively on the bush 432 and on the shaft 430. The centring of the electric machine 2 is carried out in the region of the bearings 132 which then act as a centring device and, consequently, the spacer 61 no longer carries out this centring function. Needless to say, in this second method of clamped fixing of the bearings, it is necessary, in order to avoid over-stiffness, for the fixing elements 64, as represented in FIG. 1, to be able to pass freely through the fixing holes 184 of the spacer 61 thus allowing positioning of the gearbox with respect to the engine block.

This configuration allows better control of the gap.

The removal of the heat energy from the bearing means 132 will be carried out very advantageously by conduction by the flange 193 which forms a unit with the said bearings, as well as by the holes 545 acting as ventilation holes.

Needless to say, in another embodiment, the bearings 132 may be replaced by a smooth bearing such as a self-lubricating journal or by a bearing with a double row of balls or by a bearing with a single row of balls or by a needle bearing.

As will easily be understood, this spacer carrying the bearing means 132 makes it possible, by comparison with cantilever-mounted machines, as represented, for example, in FIG. 1, significantly to reduce the range of dynamic movement set up by the crankshaft, thus enhancing control of the gap 7.

As will easily be understood, the radial flange 193, forming a single piece with the spacer 61, makes it possible to stiffen the latter.

Advantageously, this spacer consisting of the flange 193 carrying the bearing means 132 makes it possible to close off the hole left free by the absence of the conventional starter.

As can be seen in FIG. 23, because of the tortuous shape of the flange, the rotor 6 and the stator 5 can be axially longer by comparison with the embodiment of FIG. 6.

The back of the portion 195 serves as support for a detection means 610 such as a speed or position sensor.

This detection means 610 is opposite a target 601, also called coder wheel. This target is ring-shaped, featuring, at its periphery, a multiplicity of radial lugs 602 intended to cross in front of the detection means 610. The target is carried here by the non-magnetic overmoulded ring forming a squirrel cage, made of copper, of the rotor 6. In order to reduce the axial bulk, the squirrel cage features an inclined face 603 carrying the lugs 602 of the coder wheel 601. The inclination of the face 603 may vary from 0 to 45° with respect to a plane transversal to the machine.

Figure 24:
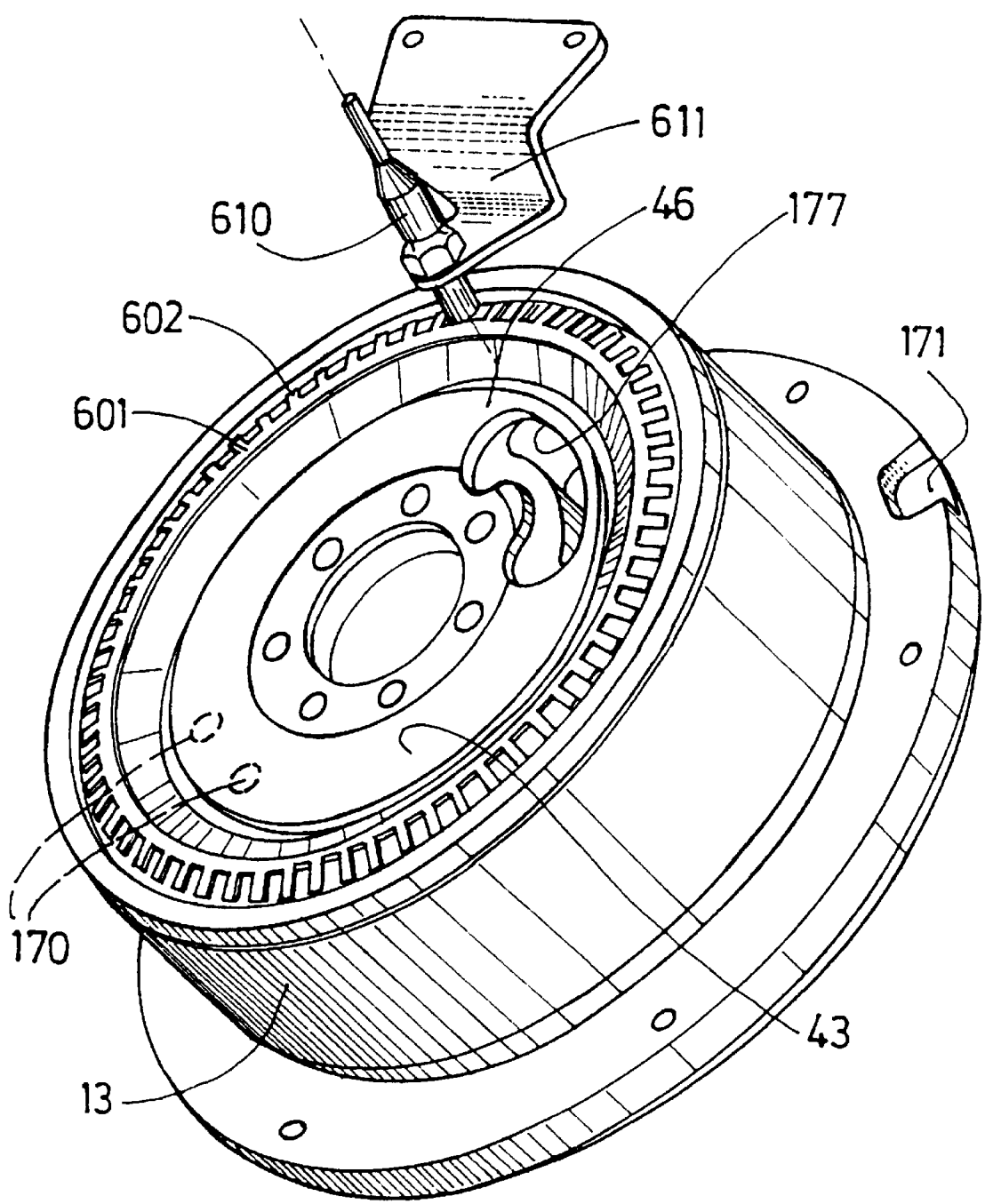
FIG. 24 is a view in perspective of a flywheel only of the electric-machine/friction-clutch assembly, equipped with a coder wheel forming a target for detection means.

Hence, the sensor 610 and the coder wheel are not parallel to the X—X axis of the electric machine 2, which makes it possible to reduce the axial length thereof. In the case of a squirrel-cage asynchronous machine, there is therefore a detection means present in the form of a speed sensor. The coder wheel is carried by a non-magnetic support. In a variant, the support of the coder wheel is the flange of a fan of the rotor 6. Needless to say, the coder wheel may be replaced by a film of ferromagnetic paint lying between 5/100 mm and 1 mm deposited by printing or sprayed through a mask. In a variant, the coder wheel may consist of an adhesive magnetic film with. notches. In a variant, a resin plug with a dust paste can be used, in such a way that, on passing through a furnace, polymerisation of the resin will occur, fixing the dust. In all cases, the support of the coder wheel is non-magnetic. Needless to say, this coder wheel may be carried by the fixing bush 43 of FIG. 1 as can be seen in FIGS. 24 and 25. The sensor is then carried by a flange 611 fixed to the housing 604 of the connector 63. This housing 604, in its upper part, carries a support 605 of three electrical connection terminals 606, 607 and 608 allowing three phase wires coming from the stator to be connected with the outside. Obviously, a fourth connection terminal, not represented here, may be added in order to take out the neutral point coming from the stator. These terminals allow connection to power electronics.

The sleeve 46 is provided with a hole 177 described above.

Needless to say, the cooling circuit of the spacer 61 may be entirely independent and, especially, independent of the cooling circuit of the internal-combustion engine. This independence makes it possible to get round problems of connection to the cooling circuit of the internal-combustion engine, and also to have a cooling temperature which is not dependent on that of the heat engine, which is of benefit each time the vehicle is started up.

As will be understood, the torsion damper 20a can be turned round, the second guide washer then no longer penetrating into the recess 39, especially in the embodiments of FIGS. 16 and 17, making it possible to reduce the axial bulk.

In FIG. 26, the spacer 61 is provided with cooling fins 183. Screws can be seen at 160 and at 161, fitted into the thickness behind the outer surface, for mounting the rotor 5 on the bearing surface 47 and the stator 6 on the inner periphery of the spacer 61, in the abovementioned way. The torsion damper 20a penetrates inside the recess 39 identical to that of FIG. 1. The engine block 62 is represented in a more detailed way than in FIG. 1. For simplicity, the declutching fork and the declutching release bearing have not been represented in this figure, nor has the driven shaft 12, in order better to show the hub 15 and the guide tube 52. The same is true in FIG. 27.

Figure 27:
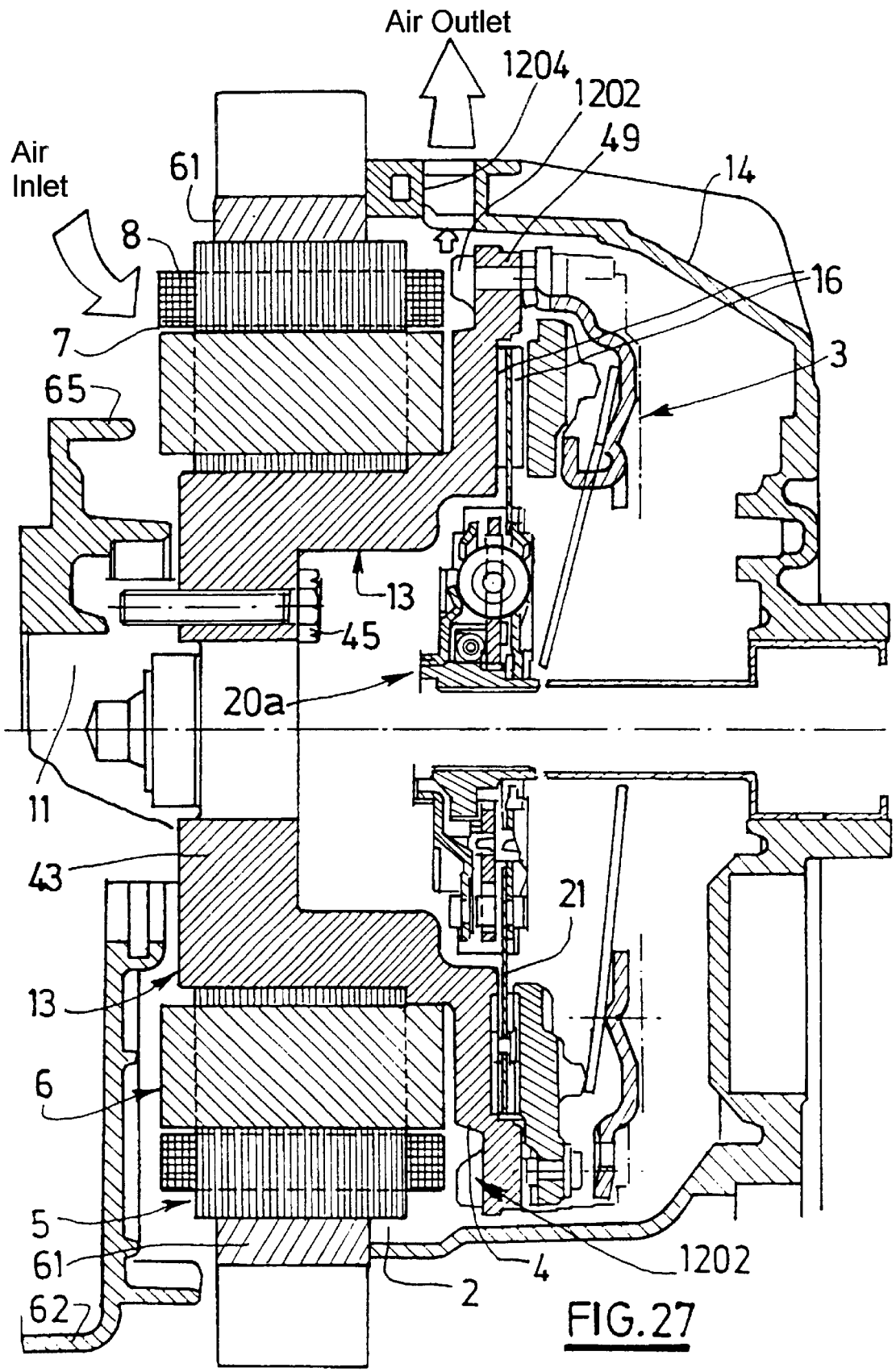
FIG. 27 is a view similar to FIG. 1 with air inlets and outlets for ventilation.

In this FIG. 27, the reaction plate 4 features, at its outer periphery, radially above the friction linings 16, a portion 49 offset axially in the opposite direction to the stator 6, with respect to the transverse part of the reaction plate 4. The portion 49 extends radially above the friction linings 16. On the face of this portion 49, turned towards the stator 6, ventilation fins 1202 are formed, in the form of fan blades. These blades 1202 extend partly radially above the chignons 8. Thus ventilation of centrifugal type is achieved.

A clearing 65 is formed in the engine block 62. This clearing 65 may correspond to the old location of a separate starter of conventional type. As can be seen in this figure, the fins 1202 extend radially above the gap 7 and the same is true of the portion 49. At least one aperture 1204 is produced in the bell housing 14 radially above the fins.

Figure 28:
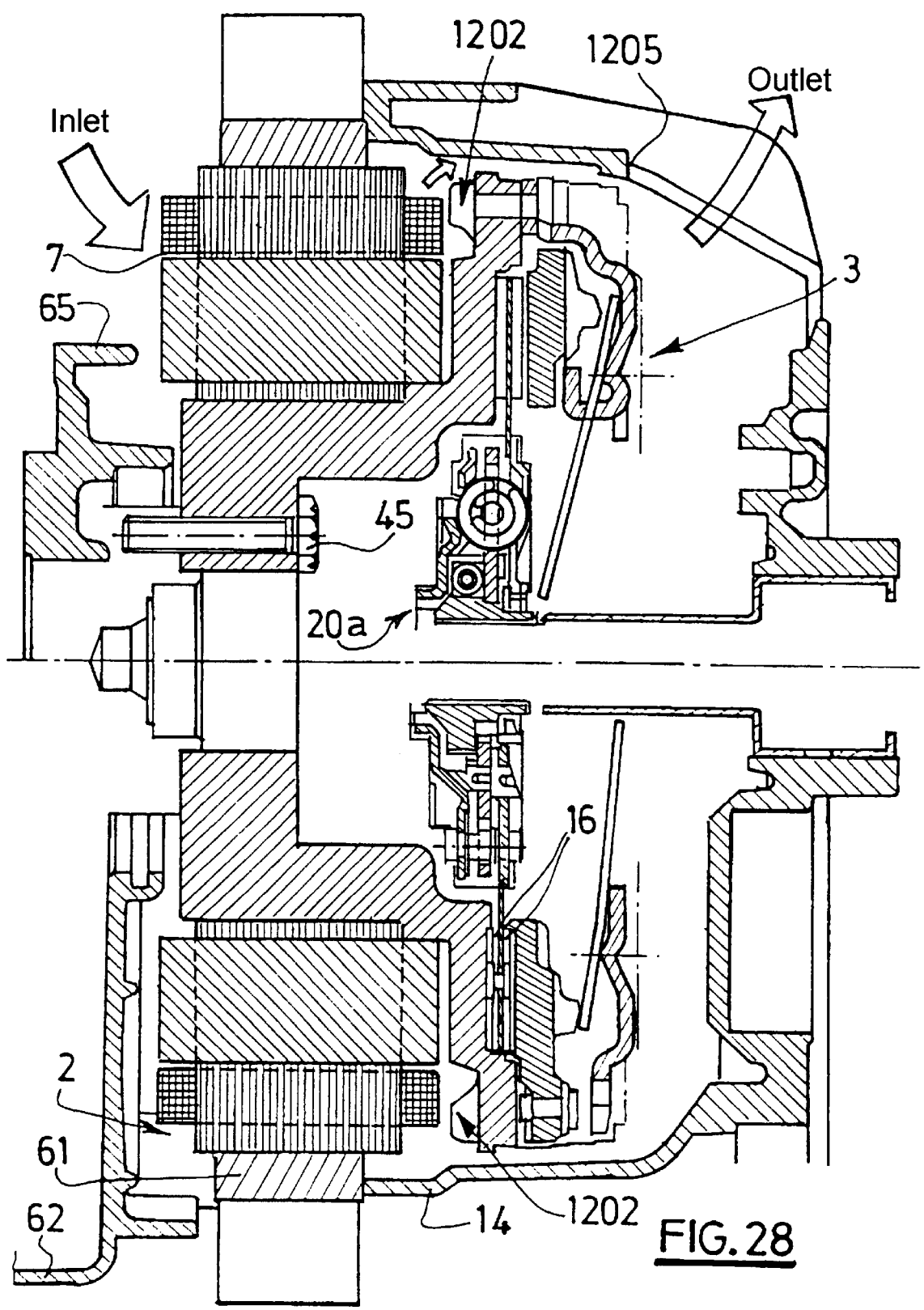
FIG. 28 is a view similar to FIG. 27 in another embodiment.

In FIG. 28, the aperture 1204 is dispensed with to be replaced by the through aperture 1205 of the declutching fork. The fins or blades 1202 are of radial orientation or propeller-shaped. Air enters at the clearing 65 on the engine block 62 side. Air leaves either through the aperture 1204 of FIG. 27, or through the aperture 1205 of FIG. 28. Air circulates via the gap 7. By virtue of the fins 1202, integral with the reaction plate 4, a fan is created making it possible to draw in air through the electric machine 2 and to eject this air radially, creating a depression at its centre. Depending on the shape of the fins, the fan 4, 1202, is either of the centrifugal and/or helicocentrifugal type. This fan is dimensioned to have a good thermal and acoustic compromise. The same is true in FIG. 5. This ventilation makes it possible to cool the rotor and the stator by virtue of the gap 7, the chignons 8, as well as the reaction plate 4 and therefore the friction linings 16 which increases the reliability of the clutch 3. The outlet is at the reaction plate 4 in FIG. 27 or beyond the clutch 3 (FIG. 28) so as to expel the dust originating especially from the friction linings 16. In all cases, ventilation is created without modifying the spacer 61 which in this figure is made of aluminium. The engine block is modified to form the clearing 65. In FIG. 27, the bell housing 14 is modified to create at least one aperture 1204, advantageously several apertures. The result of this is that this arrangement is economical since it leads to the clutch bell housing 14 and the engine block 62 not being profoundly modified. Moreover, this makes it possible to use fitting by hooping of the pack of metal plates of the stator 6 on the spacer 61.

Figure 29:
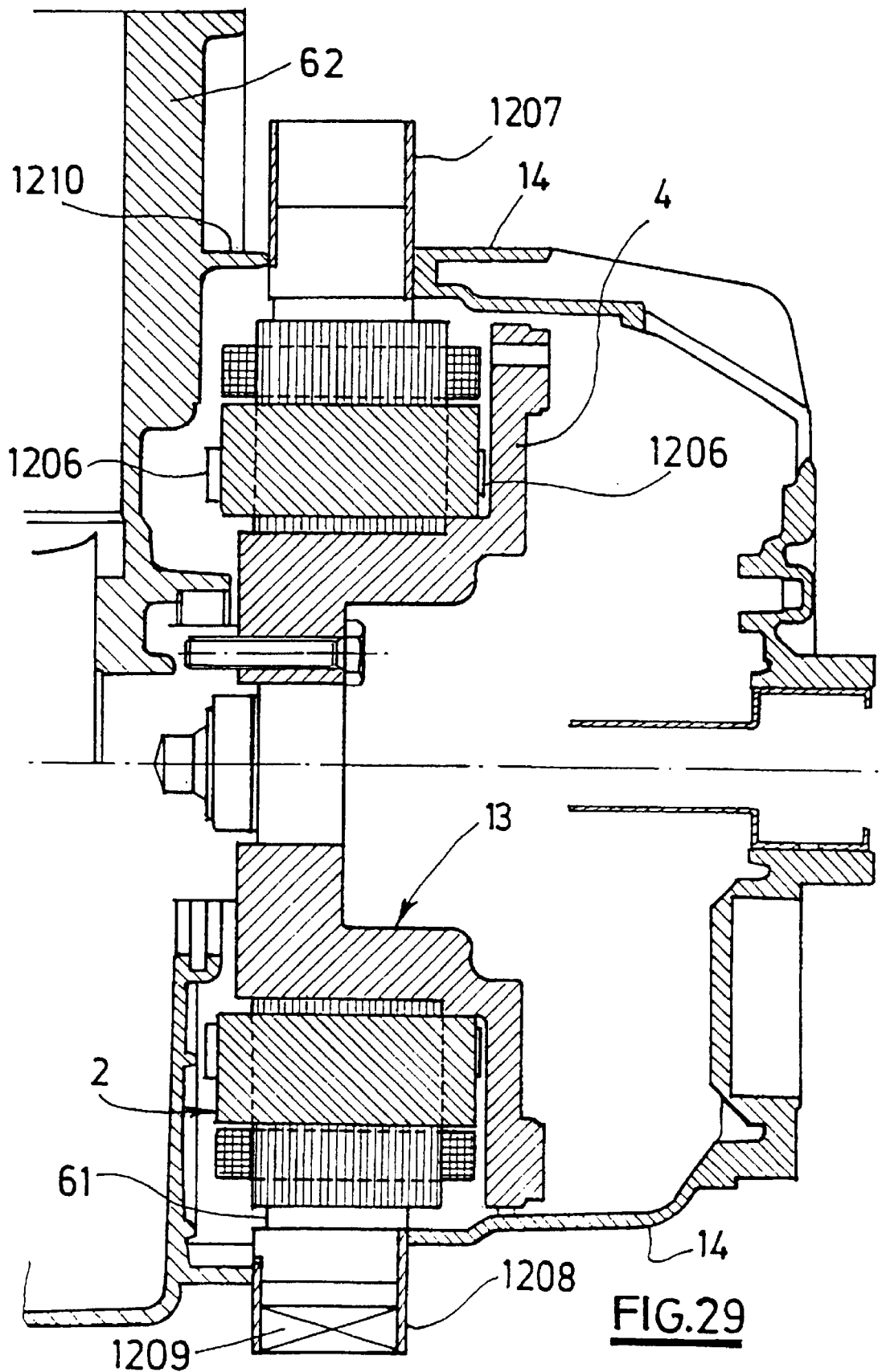
FIG. 29 is a view similar to FIG. 27 in yet another embodiment.

In a variant, as represented in FIG. 29, fins or fan blades 1206 are carried by the rotor 5 at at least one of its axial ends. Here, fins 1206 are provided on each axial extremity of the rotor 5. In this embodiment, the fins 1206 are integral with the squirrel cage. An air inlet 1208 and an air outlet 1207, of tubular shape, are carried locally by the spacer 61. The inlet 1208 is situated in the lower part of the spacer 61 and the outlet 1207 in the higher part of the spacer, such that, by virtue of the fins 1206, ventilation of tangential type is created within the electric machine 2, the air penetrating into the duct 1208 so as to emerge through the duct 1207. Needless to say, the presence of the fins 1206 is not vital, ventilation possibly taking place naturally between the inlet 1208 and the outlet 1207. This type of ventilation is less noisy.

Needless to say, it is possible to fit, in the air inlet 1208, in the form of a duct like the outlet 1207 overall, a motor-driven fan unit shown diagrammatically at 1209, allowing forced air circulation between the inlet 1208 arid the outlet 1207. This method of ventilation makes less noise at high speed and allows the ventilation to be stopped on demand. By virtue of the motor-driven fan unit 1209, performance is good in terms of throughput, and the ventilation makes it possible to withstand heavy losses of pressure head. Needless to say, another motor-driven fan unit can be placed in the outlet duct 1207, either in supplement to the one placed at the inlet, or on its own. By motordriven fan unit 1209 is understood here an electric motor assembly driving a turbine disc. This assembly is fixed within the duct or ducts constituting the inlet 1208 and the outlet 1207.

Advantageously, a temperature sensor is placed in the vicinity of the reaction plate or of the chignons 8, being carried, for example, by the bell housing 14. This sensor controls the turning-on of the electric motor, and thus of the turbine as a function of temperature in order to create the forced ventilation via a channel delimited axially by the engine block 62 and by the reaction plate 4 and, radially, by the spacer 61, the bell housing 14 and a crown ring 1210 of the engine block 62.

Needless to say, it is evident from this FIG. 29, that it is possible not to modify the engine block 62 and the bell housing 14, only the spacer 62 being modified.

In this FIG. 29, the spacer 61 advantageously having [sic] the shape of the finned spacer of FIG. 21 and thus includes a pack of magnetic metal plates consisting of a first series of standard metal plates and of a second series of spacer metal plates of different outer diameter, these metal plates having the same configuration at their inner periphery.

Figure 30:
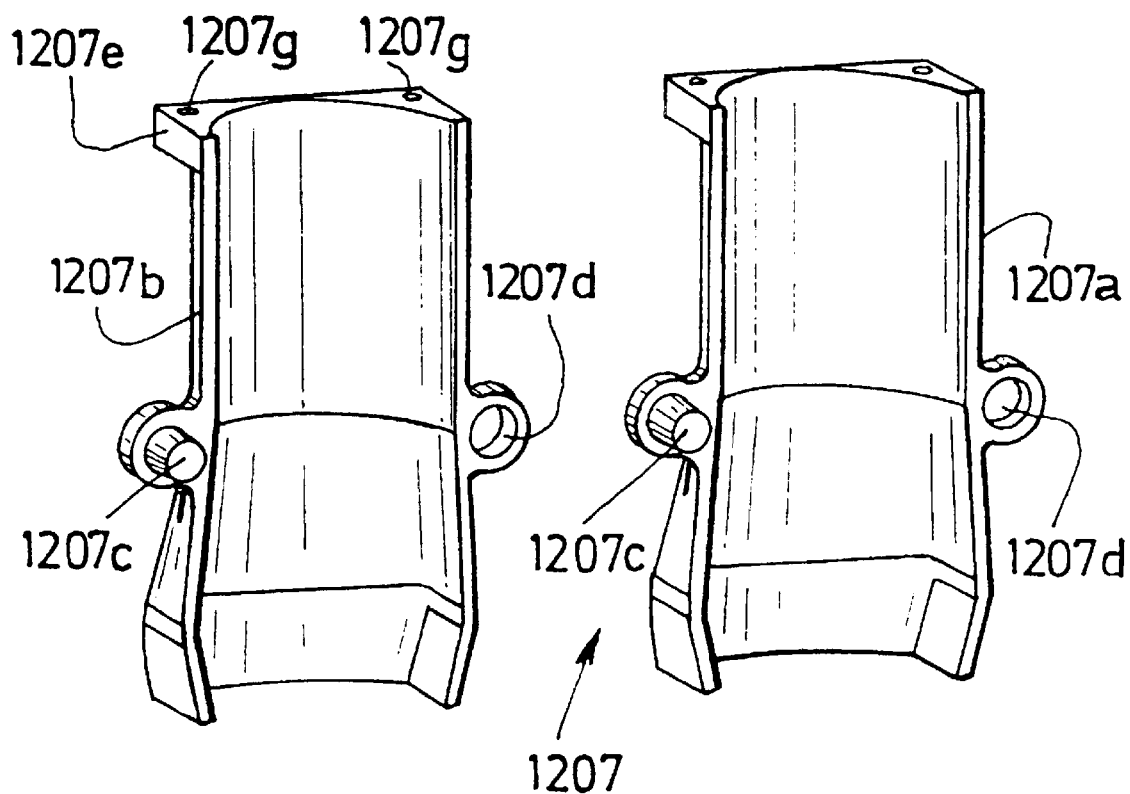

The shape of the duct 1207 or 1208 can be seen in FIG. 30. Each duct 1207, 1208 including two half-casings. Thus, in FIG. 30, the duct 1207 is seen formed from two half-casings 1207*a*, 1207*b* assembled together by the use of pins 1207*c*, each pin 1207*c* being inserted into a corresponding associated hole 1207*d* formed in the other casing. The end of each casing features a half-base 1207*e*, each half-base includes two holes 1207*g* for fixing the motor-driven fan unit, for example by the use of screws or of rivets.

Figure 31:
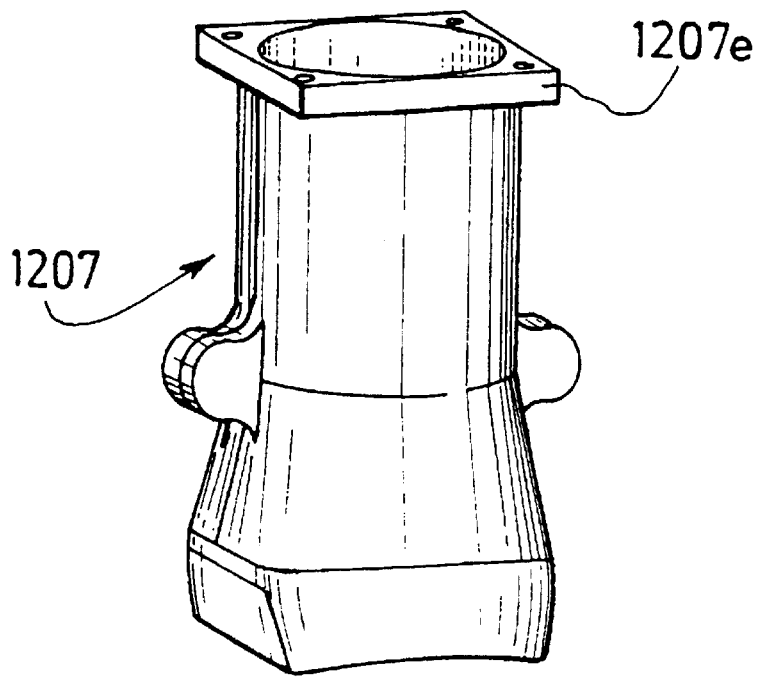

FIG. 31 shows this duct after the two half-casings have been locked together.

Figure 32:
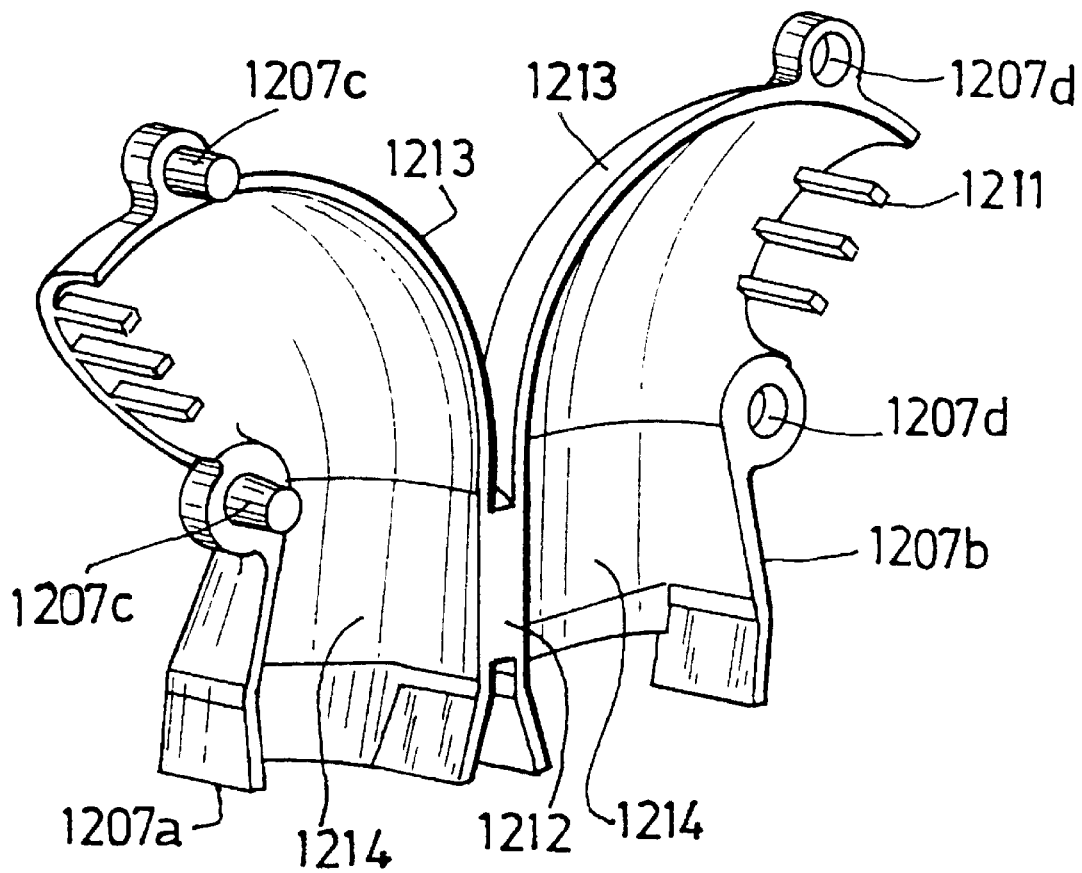
Figure 33:
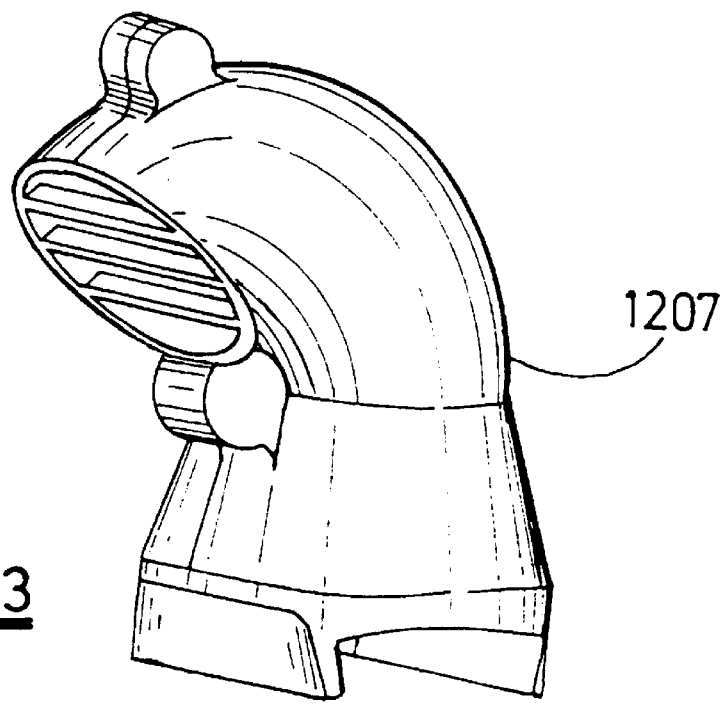

Needless to say, the ducts may have a different shape as can be seen in FIGS. 32 and 33. The two half-casings 1207*a* and 1207*b* being [sic] linked together by a thin hinge 1112 made of synthetic material, like the casings 1207*a*, 1207*b*. The pins 1207*c* are carried by the half-casing 1207*a* and the holes 1207*d* by the half-casing 1207*b*. Each half-casing features an upper part 1213, here bent at at least 90 degrees, of rounded shape, the free extremity of which terminates in a grille 1211. After the two half-casings have been closed, a complete grille is formed serving especially to avoid penetration by external agents. The motor-driven fan unit is housed, for example, in the cavity 1214 formed in the lower part of each casing.

Figure 34:
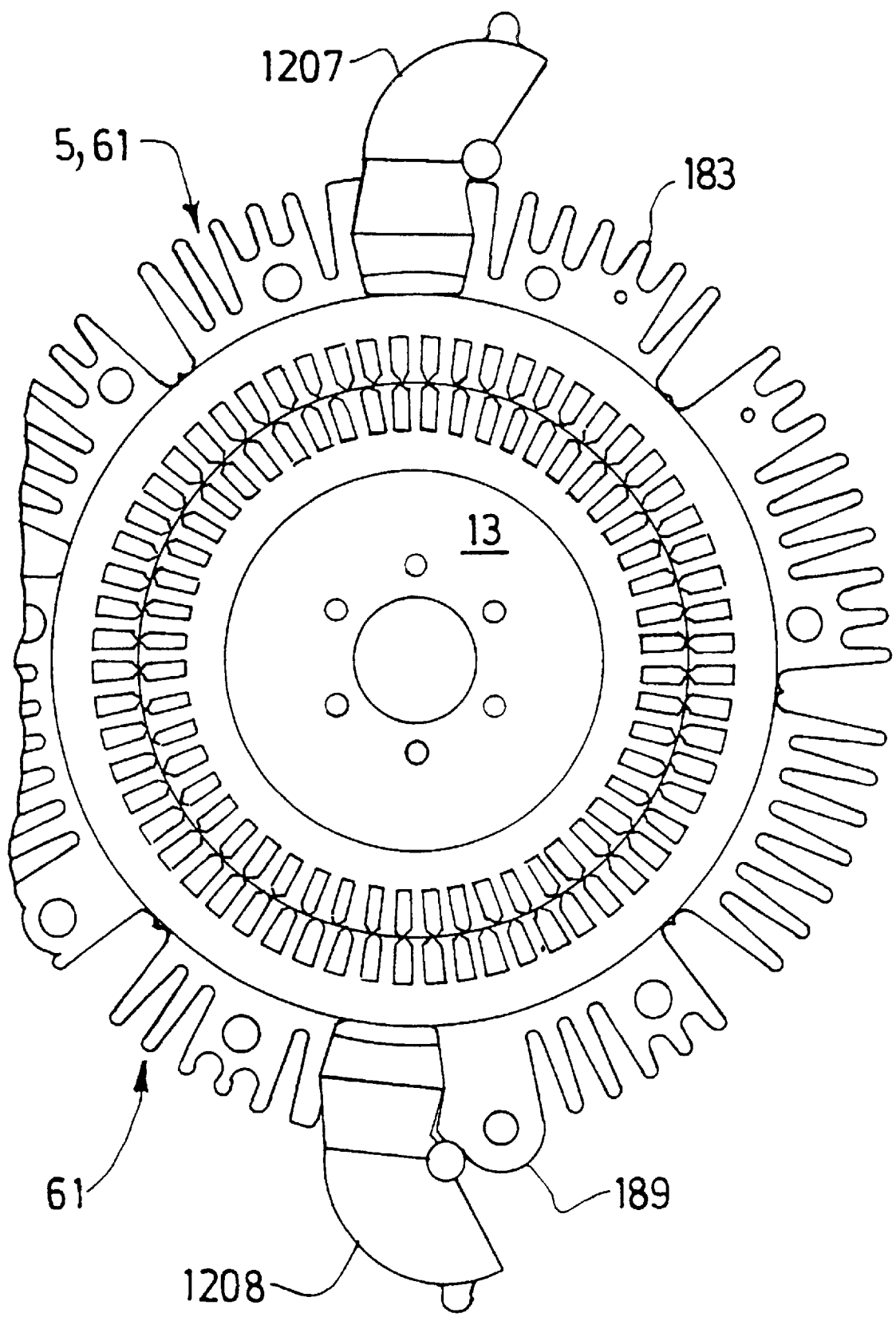
FIG. 34 is a sectional view along the line A—A of FIG. 13 in another embodiment.

The spacer 61/inlet 1208/outlet 1207 configuration is seen diagrammatically in FIG. 34. There is no need of screws to hold the air inlet and outlet ducts, since the said ducts 1208, 1207 are held sunk into the fins 183 and held pinched between the engine block and the clutch bell housing.

Figure 35:
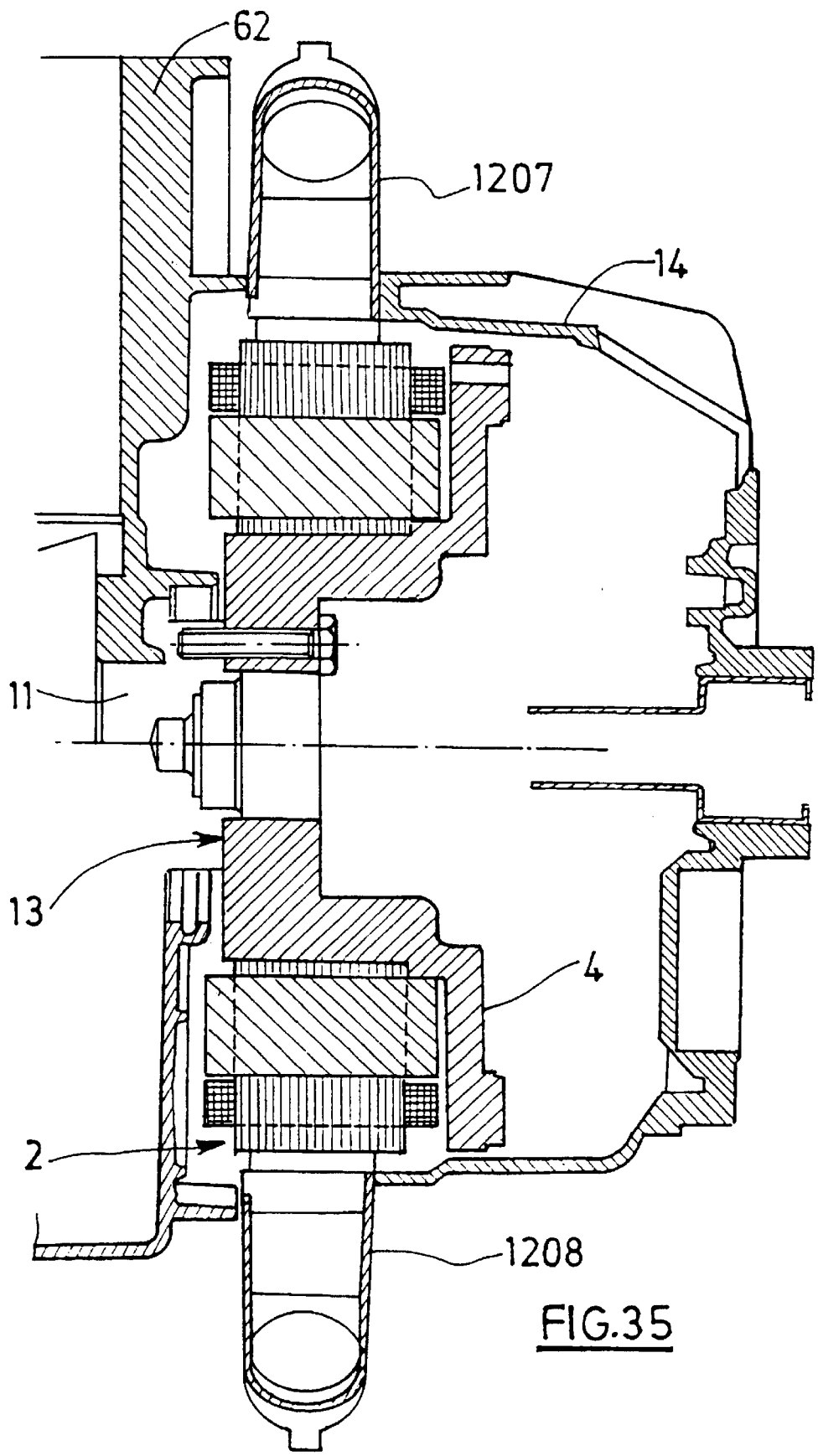
FIG. 35 is a view similar to FIG. 27 in yet another embodiment.

The mounting of the spacer 61 with its inlet 1208 and its outlet 1207 within the rotating electric machine, between the engine block 62 and the clutch bell housing 14, can be seen in FIG. 35.

Thus a configuration is created allowing forced ventilation without affecting the engine block 62 and also without affecting the bell housing 14. The air inlet 1208 and the air outlet 1207 are therefore formed in the thickness of the spacer 62. From the performance point of view, it is desirable to have an outer diameter of the stator which is as high as possible. By virtue of the spacer of FIG. 31, an outer diameter of the stator is obtained which is as high as possible while having good mechanical behaviour of the spacer by virtue of the fact that it consists of two series of metal plates, namely a first series of standard metal plates 180 for forming the stator proper and a second series of metal plates 181 of different external diameter. It suffices to remove fins locally from the second series of metal plates 181 to accommodate the inlet 1208 and the outlet 1207.

The fresh air will thus lap the stator and the chignons.

As will have been understood, the inlet 1208 and the outlet 1207 of FIGS. 34 and 35 are oriented perpendicularly to the direction of movement of the vehicle.

Needless to say, it is possible to orient the parts 1213 in such a way that the grilles 1211 are oriented in the direction of movement of the vehicle. In this case, a filter is provided within the grille 1211 in order to prevent penetration by impurities, by dirt or other into the electric machine 2. This arrangement enhances the cooling of the machine in the case where it does not include a motor-driven fan.

Figure 36:
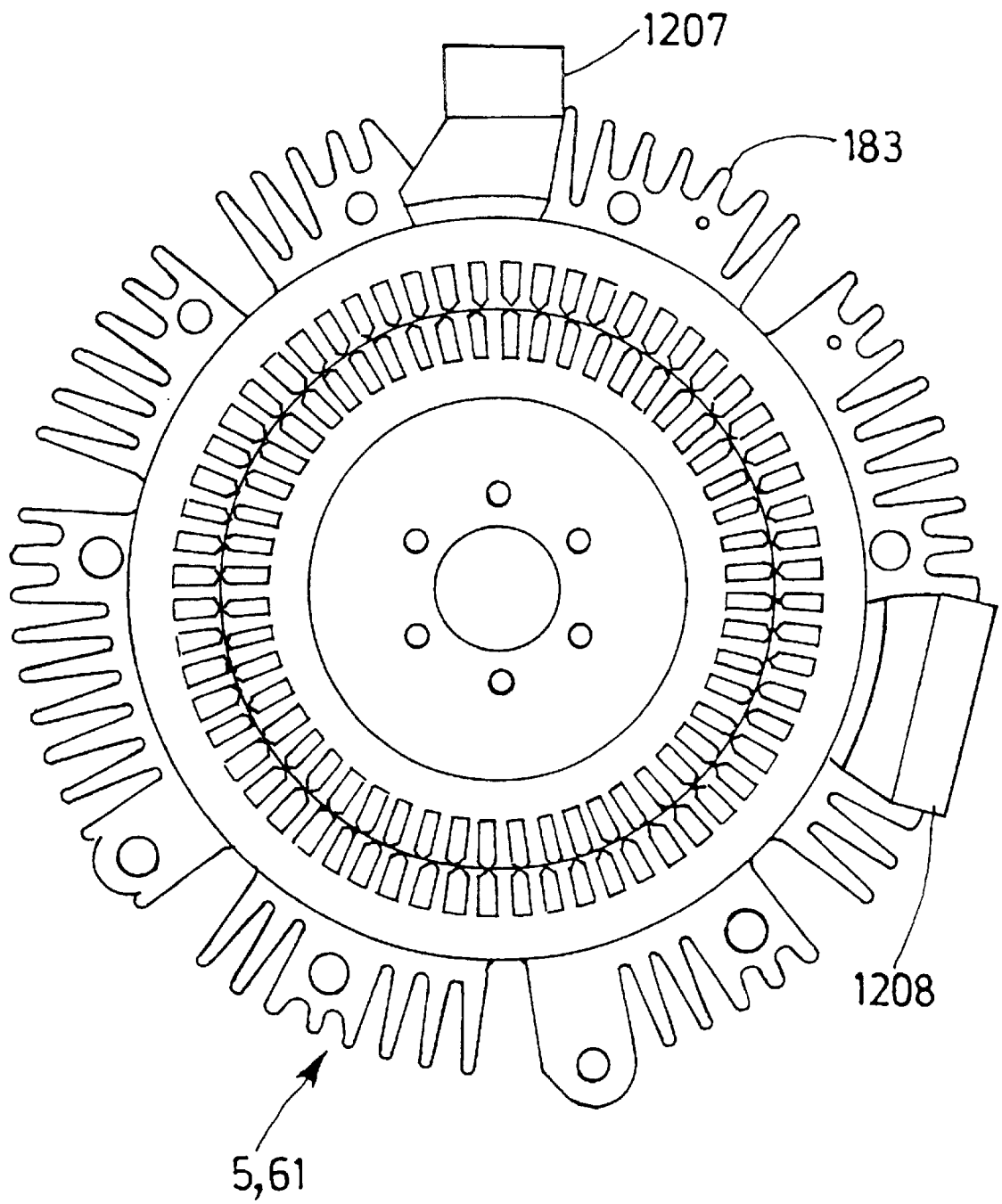
FIG. 36 is a view similar to FIG. 34 in yet another embodiment.

Needless to say, as can be seen in FIG. 36, the inlet [sic] 1208 and 1207 are not necessarily diametrally opposite as in the preceding figures. For example, the inlet 1208 may be installed in proximity to the motor-driven fan unit associated with the cooling of the heat engine of the vehicle. The inlet 1208 is therefore remote from the contamination coming from the road and it is well ventilated.

In the light of FIG. 36, it is seen that, by orienting the inlet 1208 and the outlet 1207 overall at 90 degrees with respect to one another, it is possible to create ventilation of the tangential type.

The inlet and the outlet are chosen so as to limit the vortex-field regions which are not cooled. The inlet can be directed towards the outlet in order to obtain an amplification effect. In order to avoid non-cooled vortex regions, tangential ventilation on two levels can be envisaged, the air inlets and outlets being placed side by side while being offset axially with respect to one another. It will be appreciated that it is advantageous for the inlet 1208 to be placed facing the motor-driven fan unit of the vehicle since, in the event of overheating of the heat engine, the motor-driven fan unit is turned on, which corresponds to the requirement for cooling the alternator/starter. This motor-driven fan unit of the vehicle is turned on by a thermostat placed in the vehicle cooling circuit. This thermostat can be used to control the turning-on of a turbine fan assembly placed in the air inlet and/or outlet 1207, 1208.

In the case of ventilation with fins placed on the flywheel 13 or on the rotor 5 in the abovementioned way, it is necessary to optimise the parameters for a good compromise between noise and the effectiveness of the ventilation. Hence, it is necessary to influence the dimension of the fins (height, width), the type of fins (convex, straight, concave), to reduce the outer diameter to the minimum necessary, to influence the number of fins and possibly the asymmetric angular distribution of the fins. These fins can be obtained as raw castings, result from overmoulding or be fixed by bonding, welding, screwing, hooping, etc.

Needless to say, with a spacer serving for fixing of the stator by hooping, it is possible to achieve ventilation thanks to apertures formed in local protuberances or bulges in the spacer. These apertures do not jeopardise the mechanical behaviour of the spacer.

In FIG. 23 can be seen a pin, at 201, engaged in a centring hole 185 of the spacer 61, and, at 202, a centring bush also engaged in the same hole 185. The pin 201 is integral with the engine block 62 while the centring bush 202 is integral with the clutch bell housing 14, also called clutch casing. By virtue of the bearing means 132, the relative movements between the rotor 6 and the stator 5 are limited, which guarantees a precise gap. Nevertheless, because of the presence of the pins 201 and of the bushes 202, radial static forces persist because of the axial misalignment of the engine block with respect to the nose of the crankshaft.

Moreover, the fact of pressing the spacer 61 against the engine block 62 entails axial static forces.

It is proposed to minimise these static forces. In order to minimise the static radial forces, the pins 201 of FIG. 23 are dispensed with and the bushes 202 are retained. Rotation is prevented by the through screws 64.

The axial static forces are minimised by the use of rings 1462 on which the spacer 61 may slide. The length dictated between the engine casing 62 and the clutch casing is dictated by these centring rings 1462.

Hence, the fixing elements 64, in the form of screws, pass through the spacer 61 (FIG. 37) and link the engine block 62 to the clutch bell housing 14 shouldered at its free end for the heads of the fixing screws to bear on. These screws pass through the centring rings 1462, themselves passing through a passage 461 of the spacer. These rings 1463 are longer axially than the spacer 61, that is to say that they extend in axial projection out of the spacer 61 and therefore form a spacer or separating element between the engine block 62 and the clutch bell housing 14. Rings made of elastic material 1463, such as elastomer, are placed at each end of the spacer. The spacer 61 can thus slide axially along the rings 1462 in such a way that the static forces are minimised.

Needless to say, as can be seen at the top of FIG. 37 and in FIG. 38, the fixing elements 64 may consist of bolts, the engine block then being shouldered, as can be seen in the top part of FIG. 37. The ring 1462 then being [sic] extended at 1464 in order to form a centring pin for the bell housing 14.

Needless to say, the casing 14 includes at least one stepped hole 1465 for accommodating respectively the pin 1464 and the head of the screw of the bolt. Needless to say, the number of pins 1464 depends on application and, in practice, a reduced number of rings 1462 is equipped with such pins 1464. These rings 1462, forming a spacer, are made of rigid material, such as steel, for example. The spacer 61, at each of the axial extremities of a passage 461, features a widening in diameter for accommodating the elastic ring 1463. The rings 1463 are therefore carried by the spacer.

In a variant, the engine block 62 and the bell housing 14 are hollowed locally in order to accommodate elastic rings 1463. These rings may be linked together to form a crown ring and thus create leaktightness.

In a variant, these elastic rings are mounted individually around a centring ring 1462.

In a variant (FIG. 38), the centring pins 1467 are separate from the ring 1462. These pins 1467 consist of bushes engaged on the heads of the screws of the bolts and are each individually engaged in a stepped hole 1465 of the bell housing 14 and in a countersink 1466 formed in the ring 1462. This countersink 1466 is, needless to say, face-to-face with the hole 1465 and is formed by virtue of a widening in the internal diameter of the ring 1462 at its free extremity in question. The rings 1462 make it possible to filter vibration.

Thus the centring, on the cylinder casing side, takes place via the bearing means 132, centring on the gearbox side by pins 1464 or 1467, and the axial forces are compensated for by the degree of axial freedom which the centring rings 1462 procure.

Needless to say, the blind holes 170 of FIG. 17 can be linked to vertical channels opening out at the outer periphery of the spacer 46 in order to allow easy separation of the holes 170 and the mould.

Needless to say, the air inlets and outlets 1208 [sic], 1208 may consist of holes when the spacer is very thick.

As emerges from the description and from the figures, the central recess 39 allows access to the heads of the screws for fixing the drive flywheel 13 onto the output shaft 11 (crankshaft) of the heat engine of the vehicle.

In the figures, the spacer 61 is shorter axially than the flywheel 13.

The carrier piece, for example, the flange 193 has a hollow shape in order partly to accommodate the stator and the rotor.

This carrier piece may, at its inner periphery, carry the stator, the rotor, carried by the flywheel 13, then surrounding the stator. It is thus possible to reverse the structures in FIG. 12.

The torsion damper may not penetrate into the central recess.

Needless to say, the rotors of FIGS. 1 and the following figures may be provided with at least one series of fins 1206. The flywheel 13 of these figures may be provided with fins and/or with holes as in FIGS. 5 and 27. This type of cooling may be combined with that of FIGS. 13, 14. All combinations are possible.

In a variant, the support 21 is coupled rigidly to the hub 15 such that the presence of a torsion damper is not mandatory.

What is claimed is:

1. Friction clutch device including, on the one hand, a rotational drive flywheel (13) featuring a front extremity intended to be fixed to a drive shaft (11), consisting of the output shaft of an internal-combustion engine of a motor vehicle including an engine-block (62), and a rear extremity in the form of a hollow-shaped reaction plate (4) with a central recess (39) delimited externally by a friction face (37), and, on the other hand, a friction disc (20) comprising, at its outer periphery, at least one friction lining (16) for contact with the friction face (37) of the reaction plate (4), the said friction lining (16) being integral with a support (21) coupled to a central hub (15) tended to be fastened in rotation with a driven shaft consisting of the input shaft of a motion gearbox including a clutch bell housing (14) at least partly surrounding the reaction plate (4), characterised in that the drive flywheel (13), between its front and rear extremities, carries the rotor (6) of a rotating electrical machine (2) comprising a fixed stator (5); in that the reaction plate (4) extends in a radial direction with respect to the inner periphery of the rotor (6) and is offset axially with respect to the rotor (6); and in that a spacer (61) internally carries the stator, the said spacer being intended to be fastened with at least one of the engine-block (62)/clutch bell-housing (14) elements.

2. Device according to claim 1, characterised in that the spacer (61) carries means for cooling the electric machine (2).

3. Device according to claim 2, characterised in that the cooling means consist of fins (183) carried by the spacer (61).

4. Device according to claim 2, characterised in that the spacer (61) carries an air inlet (1208).

5. Device according to claim 4, characterised in that the spacer (61) carries an air outlet (1207).

6. Device according to claim 5, characterised in that the inlets (1208) and the outlets (1207) consist of ducts.

7. Device according to claim 6, characterised in that an electric-motor/turbine-disc assembly is mounted within at least one of the ducts.

8. Device according to claim 6, characterised in that at least one of the ducts (1207, 1208) features a part of rounded shape.

9. Device according to claim 1, characterised in that the spacer (61) is of a single piece with one of the engine (62)/clutch bell-housing (14) units.

10. Device according to claim 1, characterised in that the spacer (61) is interposed between the engine block (62) and the clutch bell housing (14) and is provided with features means for fixing to the engine block (62) and to the clutch bell housing (14).

11. Device according to claim 10, characterised in that the spacer (61) is of a single piece with the stator (5).

12. Device according to claim 11, characterised in that the single-piece spacer (61) and stator comprises a first (180) and of a second (181) series of metal plates of different outer diameters, and in that the second series of metal plates (181), forming the spacer (61), is of larger diameter than the first series of metal plates (180).

13. Device according to claim 12, characterised in that the second series of metal plates features a plurality of fins separated by grooves (187) allowing access to the first series of metal plates.

14. Device according to claim 13, characterised in that the metal plates of the two series are linked together by weld beads (188) produced in the bottoms of at least some of the grooves (187).

15. Device according to claim 12, characterised in that the first series of metal plates (180) extends axially on either side of the second series of metal plates (181).

16. Device according to claim 15, characterised in that the two series of metal plates have the same configuration at their inner periphery, which features notches dedicated to accommodating a winding which the stator includes.

17. Device according to claim 1, characterised in that bearing means (132) act between the drive flywheel (13) and a carrier piece (134, 193) which are integral with the spacer (61).

18. Device according to claim 17, characterised in that the bearing means (132) consist of a ball bearing (132).

19. Device according to claim 17, characterised in that the ball bearing (132) is instrumented.

20. Device according to claim 17, characterised in that the carrier piece consist [sic] of a flange (193) provided with recesses into which penetrate projections of the engine block (62).

21. Device according to claim 17, characterised in that the rotor (5) carries a ring-shaped target intended to pass across in front of a detection means (610) integral with the carrier piece (193).

22. Device according to claim 21, characterised in that the detection means (610) is inclined with respect to the axis (X—X) of the electric machine (2).

23. Device according to claim 1, characterised in that the drive flywheel (13) carries cooling means for cooling the electric machine (2).

24. Device according to claim 23, characterised in that the cooling means (1200, 1201, 1202) consist of fins.

25. Device according to claim 24, characterised in that a gap (7) is formed between the stator (5) and the rotor (6) and in that the fins are carried by the reaction plate (4) and extend radially above the gap (7) present between the rotor (6) and the stator (5).

26. Device according to claim 25, characterised in that a clearing (65) is formed in the engine block for an air inlet and in that an air outlet is formed in the clutch bell housing (14).

27. Device according to claim 24, characterised in that the fins are carried by the rotor (5).

28. Device according to claim 1, characterised in that the clutch bell housing (14) is centred by the spacer (61) and in that the spacer (61) is integral with a carrier piece (134, 193) and in that bearing means (132) act between the carrier piece and the drive flywheel for centring of the spacer by the drive flywheel.

29. Device according to claim 28, characterised in that the spacer (61) is traversed by a centring ring (1462) and in that the centring ring (1462) is longer axially than the spacer (61).

30. Device according to claim 29, characterised in that rings made of elastic material (1463) are placed at each end of the spacer (1462).

31. Device according to claim 30, characterised in that some of the centring rings (1462) are extended in order to form a centring pin (1464) engaged into a stepped hole (1465) of the bell housing (14).

32. Device according to claim 30, characterised in that centring bushes (1467) are engaged in a stepped hole (1465) of the bell housing (14) and in a countersink of the centring ring (1462).

33. Device according to claim 1, characterised in that it includes a wear-take-up device (151) for compensating for at least the wear on the said friction lining (16).

34. Device according to claim 33, characterised in that it includes a diaphragm (18, 22) interposed between the pressure plate (17) and a cover (19) integral with the reaction plate (4), and in that the diaphragm bears on the inclined ring, and in that the said wear-take-up device includes a cartridge carried by the cover (19) and featuring a worm-screw and ratchet-wheel assembly (152) able respectively to drive the inclined ring (156) in rotation and to be driven by a control lug (157) subjected to the action of an actuator (158) consisting of a radial appendage which the diaphragm (18, 22) features at its outer periphery.

35. Device according to claim 33, characterised in that the friction clutch includes a diaphragm (18, 22) and in that the diaphragm (18, 22) features fingers (22) manoeuvred by a declutching device (24) of the hydraulic type including a cavity (243) provided with a supply inlet (128) linked to a rigid duct (127) comprising an internal part extending transversely within the clutch bell housing (14) so as to come into engagement with the supply inlet (128), and in that the said bell housing features a clearing (150) for the rigid duct (127) to pass.

36. Device according to claim 1, characterised in that the drive flywheel features additions of at least one of material (172) and notches (171) for counteracting the out-of-balance of the crankshaft of the output shaft of the internal-combustion engine and/or for balancing the drive flywheel.

37. Device according to claim 1, characterised in that the support (21) is coupled elastically by means of a torsion damper (20*a*) to the hub (15) and in that the torsion damper (20*a*) penetrates into the central recess of the reaction plate (39).

38. Friction clutch device including, on the one hand, a rotational drive flywheel (13) featuring a front extremity intended to be fixed to a drive shaft (11), consisting of the output shaft of an internal-combustion engine of a motor vehicle including an engine-block (62), and a rear extremity in the form of a hollow-shaped reaction plate (4) with a central recess (39) delimited externally by a friction face (37), and, on the other hand, a friction disc (20) comprising, at its outer periphery, at least one friction lining (16) for contact with the friction face (37) of the reaction plate (4), the said friction lining (16) being integral with a support (21) coupled to a central hub (15) tended to be fastened in rotation with a driven shaft consisting of the input shaft of a motion gearbox including a clutch bell housing (14) at least partly surrounding the reaction plate (4), wherein the drive flywheel (13), between its front and rear extremities, carries the rotor (6) of a rotating electrical machine (2) comprising a fixed stator (5) and in that a spacer (61) internally carries the stator; wherein the spacer (61) is interposed between the engine block (62) and the clutch bell housing (14) and is provided with features means for fixing to the engine block (62) and to the clutch bell housing (14); wherein the spacer (61) is of a single piece with the stator (5); in that the single-piece spacer (61) and stator are comprised of a first (180) and of a second (181) series of metal plates of different outer diameters, and wherein the second series of metal plates (181), forming the spacer (61), is of larger diameter than the first series of metal plates (180).

39. Device according to claim 38, wherein the second series of metal plates features a plurality of fins separated by grooves (187) allowing access to the first series of metal plates.

40. Device according to claim 39, wherein the metal plates of the two series are linked together by weld beads (188) produced in the bottoms of at least some of the grooves (187).

41. Device according to claim 38, wherein the first series of metal plates (180) extends axially on either side of the second series of metal plates (181).

42. Device according to claim 41, wherein the two series of metal plates have the same configuration at their inner periphery, which features notches dedicated to accommodating the winding which the stator includes.

43. Friction clutch device including, on the one hand, a rotational drive flywheel (13) featuring a front extremity intended to be fixed to a drive shaft (11), consisting of the output shaft of an internal-combustion engine of a motor vehicle including an engine-block (62), and a rear extremity in the form of a hollow-shaped reaction plate (4) with a central recess (39) delimited externally by a friction face (37), and, on the other hand, a friction disc (20) comprising, at its outer periphery, at least one friction lining (16) for contact with the friction face (37) of the reaction plate (4), the said friction lining (16) being integral with a support (21) coupled to a central hub (15) tended to be fastened in rotation with a driven shaft consisting of the input shaft of a motion gearbox including a clutch bell housing (14) at least partly surrounding the reaction plate (4), wherein the drive flywheel (13), between its front and rear extremities, carries the rotor (6) of a rotating electrical machine (2) comprising a fixed stator (5) and wherein a spacer (61) internally carries the stator; wherein the spacer (61) is adapted to be fastened with at least one of the engine block (62) and the clutch bell-housing (14), wherein the clutch bell housing (14) is centered by the spacer (61) and wherein the spacer (61) is integral with a carrier piece (134, 193) and in that bearing means (132) act between the carrier piece and the drive flywheel for centering of the spacer by the drive flywheel, and wherein the spacer (61) is traversed by a centering ring (1462) and wherein the centering ring (1462) is longer axially than the spacer (61).

44. Device according to claim 43, wherein rings made of elastic material (1463) are placed at each end of the spacer (1462).

45. Device according to claim 44, wherein some of the centring rings (1462) are extended in order to form a centering pin (1464) engaged into a stepped hole (1465) of the bell housing (14).

46. Device according to claim 45, characterised in that centring bushes (1467) are engaged in a stepped hole (1465) of the bell housing (14) and in a counter sink of the centering ring (1462).

* * * * *